(12) United States Patent
Ando et al.

(10) Patent No.: US 7,054,545 B2
(45) Date of Patent: *May 30, 2006

(54) RECORDING, EDIT, AND PLAYBACK METHODS OF AUDIO INFORMATION, AND INFORMATION STORAGE MEDIUM

(75) Inventors: Hideo Ando, Hino (JP); Hideki Mimura, Yokohama (JP); Yasufumi Tsumagari, Yokohama (JP); Kazuhiko Taira, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 971 days.

This patent is subject to a terminal disclaimer.

(21) Appl. No.: 09/790,814

(22) Filed: Feb. 23, 2001

(65) Prior Publication Data

US 2001/0017975 A1    Aug. 30, 2001

(30) Foreign Application Priority Data

Feb. 24, 2000    (JP)    ............................. 2000-048250

(51) Int. Cl.
H04N 7/04    (2006.01)
H04N 5/85    (2006.01)

(52) U.S. Cl. .................... 386/96; 386/105; 386/125

(58) Field of Classification Search ................. 386/95, 386/125, 126, 124, 96, 105, 106, 104, 39, 386/40, 45, 46–52, 55
See application file for complete search history.

(56) References Cited

U.S. PATENT DOCUMENTS 6,556,774 B1 *   4/2003   Tsumagari et al. ............ 386/95
6,658,200 B1 *  12/2003   Ando et al. .................... 386/95
6,766,103 B1 *   7/2004   Kim et al. ..................... 386/96

FOREIGN PATENT DOCUMENTS

| JP | 7-284064    | 10/1995 |
| JP | 2000-611279 | 10/2000 |
| JP | 2001-52467  | 2/2001  |
| JP | 3569191     | 6/2004  |
| WO | WO 95/16990 | 6/1995  |
| WO | WO 00/62295 | 10/2000 |

* cited by examiner

Primary Examiner—Robert Chevalier
(74) Attorney, Agent, or Firm—Oblon, Spivak, McClelland, Maier & Neustadt, P.C.

(57) ABSTRACT

Audio information is recorded in units of tracks on an information storage medium on which audio information and management information that pertains to the audio information are recorded, and information indicating the playback sequence of the audio information is recorded in the management information. Furthermore, information indicating break positions of tracks with respect to the audio information is recorded in the information indicating the playback sequence.

5 Claims, 43 Drawing Sheets

WINDOW IMAGE UPON CREATION

| ORIGINAL TRACK 1 | | | |
|---|---|---|---|
| TRACK TITLE 3 | PICTURE 5 | DISPLAY MODE 7 | TIME CHART 11 |
| AUTOMATIC | 💻 | SLIDESHOW SEQUENTIAL | A B C D<br>0  45  68  107 130 |
| FIRST LOVE | 🕺 | SLIDESHOW SHUFFLE | A B<br>0  52  105 |
| IN MY ROOM | 📝 | BROWSABLE SEQUENTIAL | |
| ANOTHER CHANCE | ☕ | BROWSABLE RANDOM | A B C<br>0  108  214 |
| ...... | ...... | ...... | ...... |

FIG. 6A

| PLAY LIST #1 2 | | | | |
|---|---|---|---|---|
| NEW TRACK TITLE 4 | MIXING RATE 9 | DISPLAY MODE 8 | STILL 10 | PICTURE 6 |
| NEW TRACK No.1<br>(C1 #1 164<br>+C1 #1 165<br>+C1 #1 166) | AUTOMATIC A-B<br>ANOTHER CHANCE A-B<br>ANOTHER CHANCE B-C | SLIDESHOW SEQUENTIAL | ORIGINAL | 💻 |
| NEW TRACK No.2<br>(C1 #4 167) | IN MY ROOM | BROWSABLE RANDOM | NEWLY SET | 💿 |
| NEW TRACK No.3<br>(C1 #5 168<br>+C1 #6 169) | FIRST LOVE A-B<br>&<br>AUTOMATIC C-D | SLIDESHOW SEQUENTIAL | ORIGINAL | ☕ |
| ...... | ...... | ...... | ...... | ...... |

FIG. 6B

| COMPARISON OF INFORMATION CONTENTS RECORDED IN TRACK HEAD ENTRY POINT (PROGRAM INFORMATION) AND STILL PICTURE ENTRY POINT |||
|---|---|
| ENTRY POINT TYPE | INFORMATION CONTENTS IN VARIOUS KINDS OF ENTRY POINTS/PROGRAM INFORMATION |
| TRACK HEAD ENTRY POINTS 171 TO 173 OR PROGRAM INFORMATION 311 TO 314 | ◎ENTRY POINT TYPE INFORMATION (EP_TY)<br>　···IDENTIFICATION INFORMATION INDICATING TRACK HEAD ENTRY POINT OR STILL PICTURE ENTRY POINT<br>◎INFORMATION (EP_PTM & RA_DUR) OF DISPLAY RANGE OF REPRESENTATIVE AUDIO (ENTRY POINT FOR REPRESENTATIVE AUDIO) INDICATING CONTENTS OF CORRESPONDING AUDIO TRACK<br>　···DESIGNATED BY PLAYBACK START TIME AND PLAYBACK END TIME IN CORRESPONDING AUDIO TRACK<br>◎INFORMATION (REP_PICTI) FOR DESIGNATING THE SAVING LOCATION OF REPRESENTATIVE IMAGE THAT REPRESENTS CONTENTS OF CORRESPONDING AUDIO TRACK<br>　···DESIGNATED BY S_VOGI SEARCH POINTER NUMBER (STILL PICTURE VOB GROUP NUMBER) AND VOB ENTRY NUMBER THEREIN<br>◎INFORMATION FOR DESIGNATING THE SAVING LOCATION OF STILL PICTURE TO BE DISPLAYED FIRST UPON PLAYBACK OF CORRESPONDING AUDIO TRACK<br>　···DESIGNATED BY S_VOGI SEARCH POINTER NUMBER (STILL PICTURE VOB GROUP NUMBER) AND VOB ENTRY NUMBER THEREIN<br>◎TEXT INFORMATION (PRIMARY TEXT INFORMATION PRM_TXTI) UNIQUE TO CORRESPONDING AUDIO TRACK<br>　···TUNE NAME, PLAYER NAME/SINGER NAME, WRITER NAME, ETC.<br>◎ADDITIONAL COMMENT TEXT INFORMATION (IT_TXT_SRPN) (CENTRAL TEXT INFORMATION : ITEM TEXT 237, 238)<br>◎DISPLAY MODE OF STILL PICTURE IN CORRESPONDING AUDIO TRACK (DISPLAY MODE)<br>　···DISPLAY ORDER MODE/DISPLAY TIMING MODE<br>◎DISPLAY TIME RANGE INFORMATION (EP_PTM) OF CORRESPONDING STILL PICTURE<br>◎RELATIONSHIP BETWEEN CORRESPONDING STILL PICTURE CONTENTS AND ORIGINAL TRACK<br>　···WHETHER SAME STILL PICTURES AS THOSE IN ORIGINAL TRACK ARE DISPLAYED OR UNIQUE STILL PICTURES DIFFERENT FROM THOSE IN ORIGINAL TRACKS ARE DISPLAYED (NEWLY SET) |

FIG. 9A

| | |
|---|---|
| | ◎ERASE INHIBITION/PROHIBITION FLAG<br>⋯ERASE INHIBITION INFORMATION |
| STILL PICTURE ENTRY POINTS 21 TO 26 | ◎ENTRY POINT TYPE INFORMATION (EP_TY)<br>⋯IDENTIFICATION INFORMATION INDICATING TRACK HEAD ENTRY POINT OR STILL PICTURE ENTRY POINT<br>◎INFORMATION (ASVOB_ENTN) FOR DESIGNATING THE SAVING LOCATION OF STILL PICTURE TO BE DISPLAYED<br>⋯DESIGNATED BY S_VOGI SEARCH POINTER NUMBER (STILL PICTURE VOB GROUP NUMBER) AND VOB ENTRY NUMBER THEREIN<br>◎INFORMATION (EP_PTM) FOR DESIGNATING DISPLAY TIMING OF ABOVE STILL PICTURE<br>⋯DESIGNATES DISPLAY TIME INFORMATION OF CORRESPONDING AUDIO OBJECT TO ADJUST DISPLAY TIMING BETWEEN TWO OBJECTS<br>◎DISPLAY TIME RANGE INFORMATION (MAX_DUR & MIN_DUR) OF CORRESPONDING STILL PICTURE |

FIG. 9B

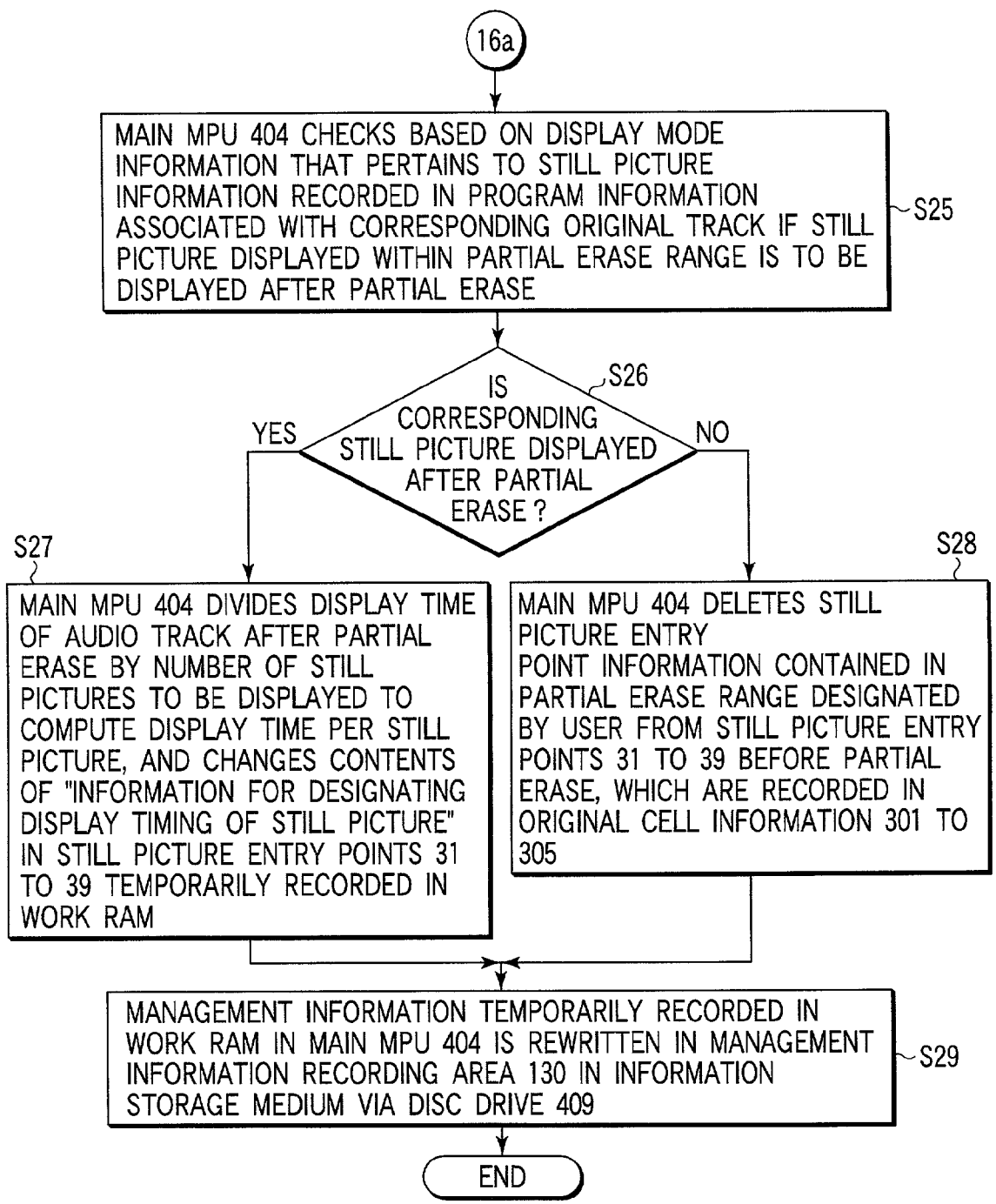
F I G. 18

C_EPI (TYPE A1) (DESCRIPTION ORDER)

| RBP | FIELD NAME | CONTENTS | NUMBER OF BYTES |
|---|---|---|---|
| 0 | EP_TY | ENTRY POINT TYPE | 1BYTE |
| 1 TO 6 | EP_PTM | PTM OF ENTRY POINTS | 6BYTES |
| 7 TO 134 | PRM_TXT | PRIMARY TEXT INFORMATION | 128BYTES |
| 135 TO 136 | IT_TXT_SRPN | IT_TXT SEARCH POINTER INFORMATION | 2BYTES |
| 137 TO 139 | REP_PICTI | REPRESENTATIVE PICTURE INFORMATION | 3BYTES |
| TOTAL | | | 140BYTES |

(RBP 0) EP_TY
DESCRIBES EP TYPE OF THIS ENTRY POINT

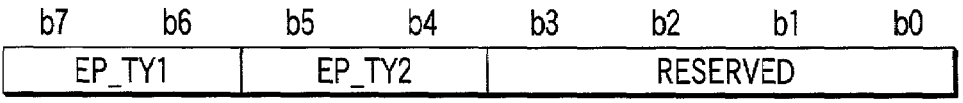

| b7 | b6 | b5 | b4 | b3 | b2 | b1 | b0 |
|---|---|---|---|---|---|---|---|
| EP_TY1 | | EP_TY2 | | RESERVED | | | |

EP_TY1 ··· '01b' SHALL BE DESCRIBED FOR TYPE A1 ENTRY POINT
EP_TY2 ··· '00b' SHALL BE DESCRIBED FOR TYPE A1 ENTRY POINT

EP_PTM
ALL BYTES SHALL BE SET TO '00h'

FIG. 29

AOBU_SZ ··· DESCRIBES THE SIZE OF THIS AOBU. THE SIZE IS SPECIFIED BY THE NUMBER OF PACKS IN THIS AOBU

ASVOB_ENT (DESCRIPTION ORDER)

| RBP | FIELD NAME | CONTENTS | NUMBER OF BYTES |
|---|---|---|---|
| 0 | ASVOB_ENT_TY | ASVOB ENTRY TYPE | 1BYTE |
| 1 | ASVOB_SZ | SIZE OF ASVOB | 1BYTE |
| TOTAL | | | 2BYTES |

ASVOB_ENT_TY
DESCRIBES TE IN THE FOLLOWING FORMAT

TE ... 00b: THIS ASVOB IS IN NORMAL STATE
01b: THIS ASVOB IS IN TEMPORARILY ERASED STATE

ASVOB_SZ
DESCRIBES THE SIZE OF ASVOB IN LBs (LOGICAL BLOCKS)

[STRUCTURE OF THE ASVOB]

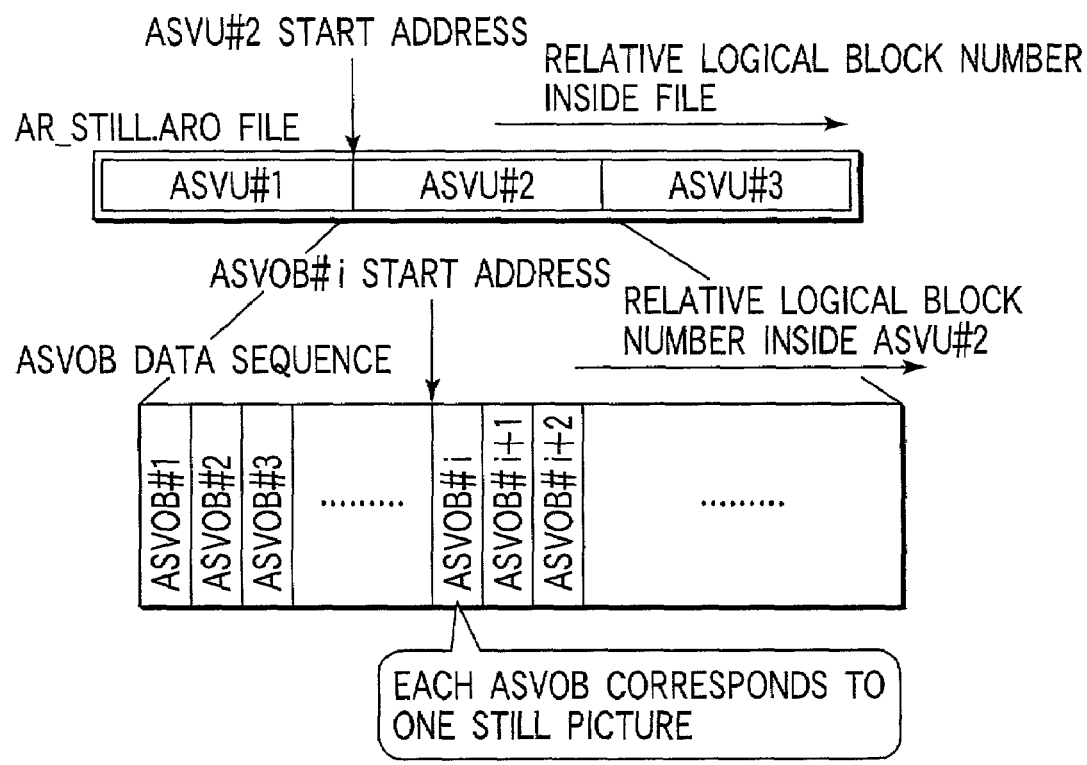
F I G. 37

AN EXAMPLE OF ENTRY POINT FOR REPRESENTATIVE AUDIO

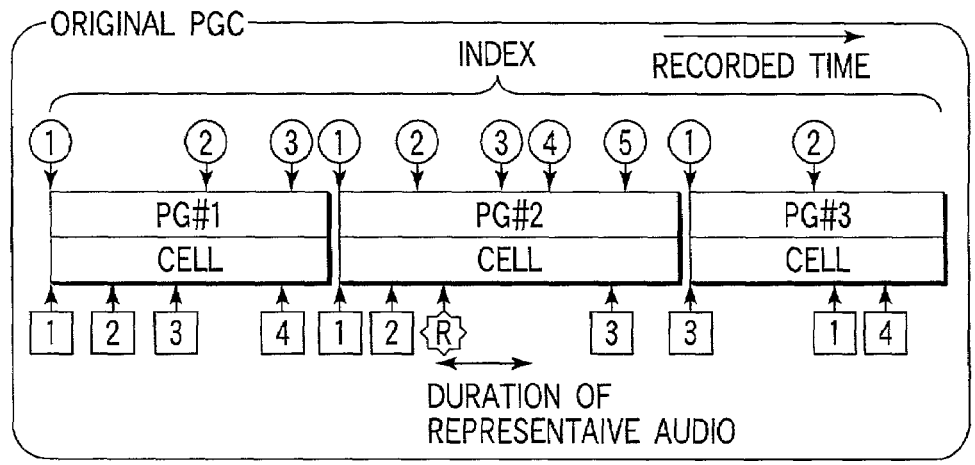

○ⁱ : ENTRY POINT FOR INDEX (i=1,2,3,···)
□ʲ : ENTRY POINT FOR DISPLAY LIST (j=1,2,3,···)
✹R✹ : ENTRY POINT FOR REPRESENTATIVE AUDIO

FIG. 43

C_EPI (TYPE D2)  (DESCRIPTION ORDER)

| RBP | FIELD NAME | CONTENTS | NUMBER OF BYTES |
|---|---|---|---|
| 0 | EP_TY | ENTRY POINT TYPE | 1BYTE |
| 1 TO 6 | EP_PTM | PTM OF ENTRY POINTS | 6BYTES |
| 7 TO 12 | RA_DUR | REPRESENTATIVE AUDIO DURATION | 6BYTES |
| TOTAL | | | 13BYTES |

EP_TY
DESCRIBES EP TYPE OF THIS ENTRY POINT

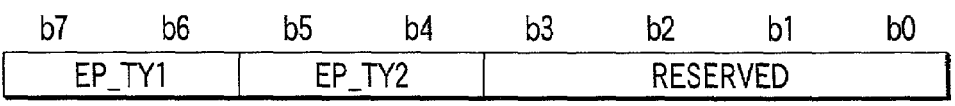

EP_TY1 ··· '00b' SHALL BE DESCRIBED FOR TYPE D2 ENTRY POINT
EP_TY2 ··· '11b' SHALL BE DESCRIBED FOR TYPE D2 ENTRY POINT

FIG. 44

C_EPI (TYPE B1) (DESCRIPTION ORDER)

| RBP | FIELD NAME | CONTENTS | NUMBER OF BYTES |
|---|---|---|---|
| 0 | EP_TY | ENTRY POINT TYPE | 1BYTE |
| 1 TO 6 | EP_PTM | PTM OF ENTRY POINTS | 6BYTES |
| 7 | IDXN | INDEX NUMBER | 1BYTE |
| 8 TO 135 | PRM_TXT | PRIMARY TEXT INFORMATION | 128BYTES |
| TOTAL | | | 136BYTES |

EP_TY
DESCRIBES EP TYPE OF THIS ENTRY POINT

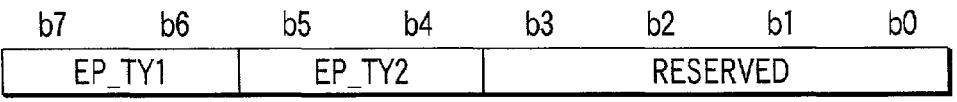

EP_TY1 ··· '01b' SHALL BE DESCRIBED FOR TYPE B1 ENTRY POINT
EP_TY2 ··· '01b' SHALL BE DESCRIBED FOR TYPE B1 ENTRY POINT

F I G. 45

C_EPI (TYPE B2) (DESCRIPTION ORDER)

| RBP | FIELD NAME | CONTENTS | NUMBER OF BYTES |
|---|---|---|---|
| 0 | EP_TY | ENTRY POINT TYPE | 1BYTE |
| 1 TO 6 | EP_PTM | PTM OF ENTRY POINTS | 6BYTES |
| 7 | IDXN | INDEX NUMBER | 1BYTE |
| TOTAL | | | 8BYTES |

EP_TY
DESCRIBES EP TYPE OF THIS ENTRY POINT

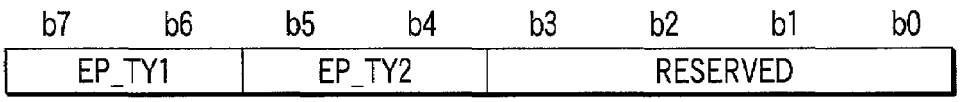

EP_TY1 ··· '00b' SHALL BE DESCRIBED FOR TYPE B2 ENTRY POINT
EP_TY2 ··· '01b' SHALL BE DESCRIBED FOR TYPE B2 ENTRY POINT

F I G. 46

C_EPI (TYPE C2) (DESCRIPTION ORDER)

| RBP | FIELD NAME | CONTENTS | NUMBER OF BYTES |
|---|---|---|---|
| 0 | EP_TY | ENTRY POINT TYPE | 1BYTE |
| 1 TO 6 | EP_PTM | PTM OF ENTRY POINTS | 6BYTES |
| 7 | ASVOB_ENTN | ENTRY NUMBER OF ASVOB | 1BYTE |
| 8 | HOME_DLISTN | HOME DLIST NUMBER | 1BYTE |
| 9 | S_EFFECT | START EFFECT | 1BYTE |
| 10 | E_EFFECT | END EFFECT | 1BYTE |
| 11 TO 12 | MAX_DUR | MAXMUM DURATION TIME | 2BYTES |
| 13 TO 14 | MIN_DUR | MINIMUM DURATION TIME | 2BYTES |
| TOTAL | | | 15BYTES |

EP_TY
DESCRIBES EP TYPE OF THIS ENTRY POINT

| b7 | b6 | b5 | b4 | b3 | b2 | b1 | b0 |
|---|---|---|---|---|---|---|---|
| EP_TY1 | | EP_TY2 | | RESERVED | | | |

EP_TY1 ··· '00b' SHALL BE DESCRIBED FOR TYPE C2 ENTRY POINT
EP_TY2 ··· '10b' SHALL BE DESCRIBED FOR TYPE C2 ENTRY POINT

FIG. 47

PGC_GI (DESCRIPTION ORDER)

| RBP | FIELD NAME | CONTENTS | NUMBER OF BYTES |
|---|---|---|---|
| 0 | RESERVED | RESERVED | 1BYTE |
| 1 | PG_Ns | NUMBER OF PGs | 1BYTE |
| 2 TO 3 | CI_SRP_Ns | NUMBER OF CI_SRPs | 2BYTES |
| TOTAL | | | 4BYTES |

PG_Ns
DESCRIBES THE NUMBER OF PGs IN THIS PGC
IN CASE OF USER DEFINED PGC, PG_Ns SHALL BE SET TO '0'
NOTE: THE MAXIMUM NUMBER OF PGs FOR THE ORIGINAL PGC IS '99'

CI_SRP_Ns
DESCRIBES THE NUMBER OF CI_SRPs IN THIS PGC
NOTE: THE MAXIMUM NUMBER OF CI_SRPs IS '999'

FIG. 48

PGI (DESCRIPTION ORDER)

| RBP | FIELD NAME | CONTENTS | NUMBER OF BYTES |
|---|---|---|---|
| 0 | RESERVED | RESERVED | 1BYTE |
| 1 | PG_TY | PROGRAM TYPE | 1BYTE |
| 2 TO 3 | C_Ns | NUMBER OF CELLS IN THIS PG | 2BYTES |
| 4 TO 131 | PRM_TXTI | PRIMARY TEXT INFORMATION | 128BYTES |
| 132 TO 133 | IT_TXT_SRPN | IT_TXT SEARCH POINTER NUMBER | 2BYTES |
| 134 TO 141 | REP_PICTI | REPRESENTATIVE PICTURE INFORMATION | 8BYTES |
| TOTAL | | | 142BYTES |

PG_TY
DESCRIBES PROGRAM TYPE OF THIS PG

| b7 | b6 | b5 | b4 | b3 | b2 | b1 | b0 |
|---|---|---|---|---|---|---|---|
| PROTECT | RESERVED | | | | | | |

PROTECT ⋯ 0b: THIS PG IS NOT IN PROTECTED STATE
　　　　　1b: THIS PG IS IN PROTECTED STATE

NOTE: WHEN A PG IS IN PROTECTED STATE, ALL THE AOBs REFERRED AND UTILIZED IN THE PRESENTATION OF THAT PG SHALL NOT BE TEMPORARILY OR PERMANENTLY ERASED.
PROTECT FLAGS SHALL NOT BE SET TO '1b' UNLESS ALL THE AOBs AND ASVOBs REFERRED BY THIS PG ARE IN NOMAL STATE

FIG. 49

REP_PICTI (DESCRIPTION ORDER)

| RBP | FIELD NAME | CONTENTS | NUMBER OF BYTES |
|---|---|---|---|
| 134 TO 135 | ASVUN | ASVU NUMBER | 2BYTES |
| 136 | ASVOB_ENTN | ASVOB_ENT NUMBER | 1BYTE |
| 137 TO 141 | RESERVED | RESERVED | 5BYTES |
| TOTAL | | | 8BYTES |

ASVUN
DESCRIBES THE ASVU NUMBER IN WHICH THIS REPRESENTATIVE PICTURE FOR TRACK EXISTS

ASVOB_ENTN
DESCRIBES THE ASVOB_ENT NUMBER IN WHICH THIS REPRESENTATIVE PICTURE FOR TRACK EXISTS

FIG. 50

RECORDING, EDIT, AND PLAYBACK METHODS OF AUDIO INFORMATION, AND INFORMATION STORAGE MEDIUM

CROSS-REFERENCE TO RELATED APPLICATIONS

This application is based upon and claims the benefit of priority from the prior Japanese Patent Application No. 2000-048250, filed Feb. 24, 2000, the entire contents of which are incorporated herein by reference.

BACKGROUND OF THE INVENTION

The present invention relates to recording, playback, and edit methods of audio information, and an information storage medium used in these methods.

More specifically, the present invention relates to recording, playback, and edit methods of audio related information with respect to an information storage medium that allows sound recording (or recording) and playback of audio related information, and a data structure recorded on the information storage medium.

Furthermore, the present invention relates to a technical field which pertains to a display method for displaying the contents of management information recorded on an information storage medium on which both playback sequence information used to sequentially play back information recorded on the information medium, and another playback sequence information that the user can designate are recorded as the management information, and to an edit method using the display result.

The DVD forum issued on September of 1999 "Part 3 VIDEO RECORDING DVD Specifications for Rewritable/Re-recordable Discs" as specifications that allow recording and playback of video information on an information storage medium.

In video information, large units such as "video recording units" or "titles corresponding to program units" which make up video contents are present. In the above specifications, a management unit called Video Object is present for "video recording unit", and a management unit called Program is present for "program unit or title".

The DVD forum is currently examining specifications that allows recording/playback of audio information and aims at high compatibility with the aforementioned Video Recording specifications as Audio Recording specifications.

In audio information, recording/playback is done using very small units called "tracks" corresponding to "tunes". If management information for audio information includes a management unit corresponding to "track", a new layer corresponding to "track" must be added to the hierarchical structure of the aforementioned Video Recording specifications, thus impairing high compatibility with the aforementioned Video Recording specifications.

BRIEF SUMMARY OF THE INVENTION

In order to combat the above problems, it is an object of the present invention to provide a data structure that can easily manage in units of tracks unique to Audio Recording while assuring high compatibility with Video Recording specifications, and optimal recording, playback, and edit methods of audio related information to be recorded on an information storage medium in association with the data structure.

The present invention is not limited to the above object, and has as another object to provide an "edit method of audio information alone which is optimal to manage in units of tracks", "edit method that combines audio information and still picture information which are optimal to manage in units of tracks", and "display method that makes the aforementioned edit processes very easy".

In order to achieve the above objects, according to the present invention:

1. PGC (Program Chain) information which is included in management information that pertains to audio information, and indicates the playback sequence can have break information of audio tracks.

That is, PGCI can record break information of audio tracks.

2. A program in original program chain information as management information that pertains to an original track can correspond to the original track.

3. Track head entry point information indicating break information of audio tracks is recorded in cell information in a user-defined PGC information table as management information that pertains to a play list, so that the track head entry point can have various kinds of information unique to audio tracks.

4. When the user designates still pictures which are to be displayed simultaneously upon playing back a given audio track, the display timings of respective still pictures upon playing back audio information are automatically computed on the basis of the playback time of the audio track and the number of designated still pictures, and that display timing information can be automatically recorded in management information.

5. An original list and play list can be simultaneously displayed on the screen (the same applies not only to Audio Recording but also to Video Recording).

6. In the present invention, a new track can be formed on a play list by collecting some original tracks in an original list. Alternatively, the contents of an original track can be partially erased.

In such case, the following mode (A) or (B) can be selected in accordance with the information contents of an original track display mode.

(A) All still pictures displayed upon playing back an original track are used as those to be displayed upon playing back a new track on a play list or all still pictures displayed before partial erase are also displayed after partial erase.

(B) Only still pictures, which fall within a specific range, of those displayed upon playing back an original track are used as those to be displayed upon playing back a new track on a play list or still pictures displayed within the partial erase range are not displayed after partial erase.

That is, upon playback, one of these modes (A) and (B) can be selected to set the corresponding still pictures as those for a new track on the play list.

7. An arbitrary scene of a movie object can be extracted as a still picture, and can be registered in a still-picture AV file information table as a still picture that can be displayed simultaneously with an audio object.

8. In the present invention, still pictures are designated in units of tracks, and designation information of a representative picture which indicates the track contents is provided to the management information, and is provided independently of designation information of still pictures displayed upon playing back audio tracks.

9. Display range information of a representative audio which indicates the contents of an audio track is assured in an area for recording information unique to each audio track.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 6A and 6B show screen images upon creating a play list according to the present invention;

FIGS. 9A and 9B are explanatory views comparing information contents recorded in track head entry points (program information) and still picture entry points according to the present invention;

FIG. 18 is a flow chart, continued from the flow chart of FIG. 17, showing the remaining steps of FIG. 17;

FIG. 29 shows an example of contents of cell entry point information (C_EPI of type A1; C_EPI# shown in FIG. 27);

FIG. 37 illustrates a concept of ASVOB accesses;

FIG. 43 is a view for explaining an example of an entry point for the representative audio;

FIG. 44 shows an example of contents of cell entry point information (C_EPI of type D2);

FIG. 45 shows an example of contents of cell entry point information (C_EPI of type B1);

FIG. 46 shows an example of contents of cell entry point information (C_EPI of type B2);

FIG. 47 shows an example of contents of cell entry point information (C_EPI of type C2);

FIG. 48 shows an example of contents of PGC general information (PGC_GI shown in FIG. 1(g) or FIG. 27);

FIG. 49 shows an example of contents of program information (PGI# shown in FIG. 27); and FIG. 50 shows an example of contents of representative picture information (REP_PICTI shown in FIG. 49).

DETAILED DESCRIPTION OF THE INVENTION

An embodiment of the present invention will be described in detail hereinafter with reference to the accompanying drawings.

Figure 1:
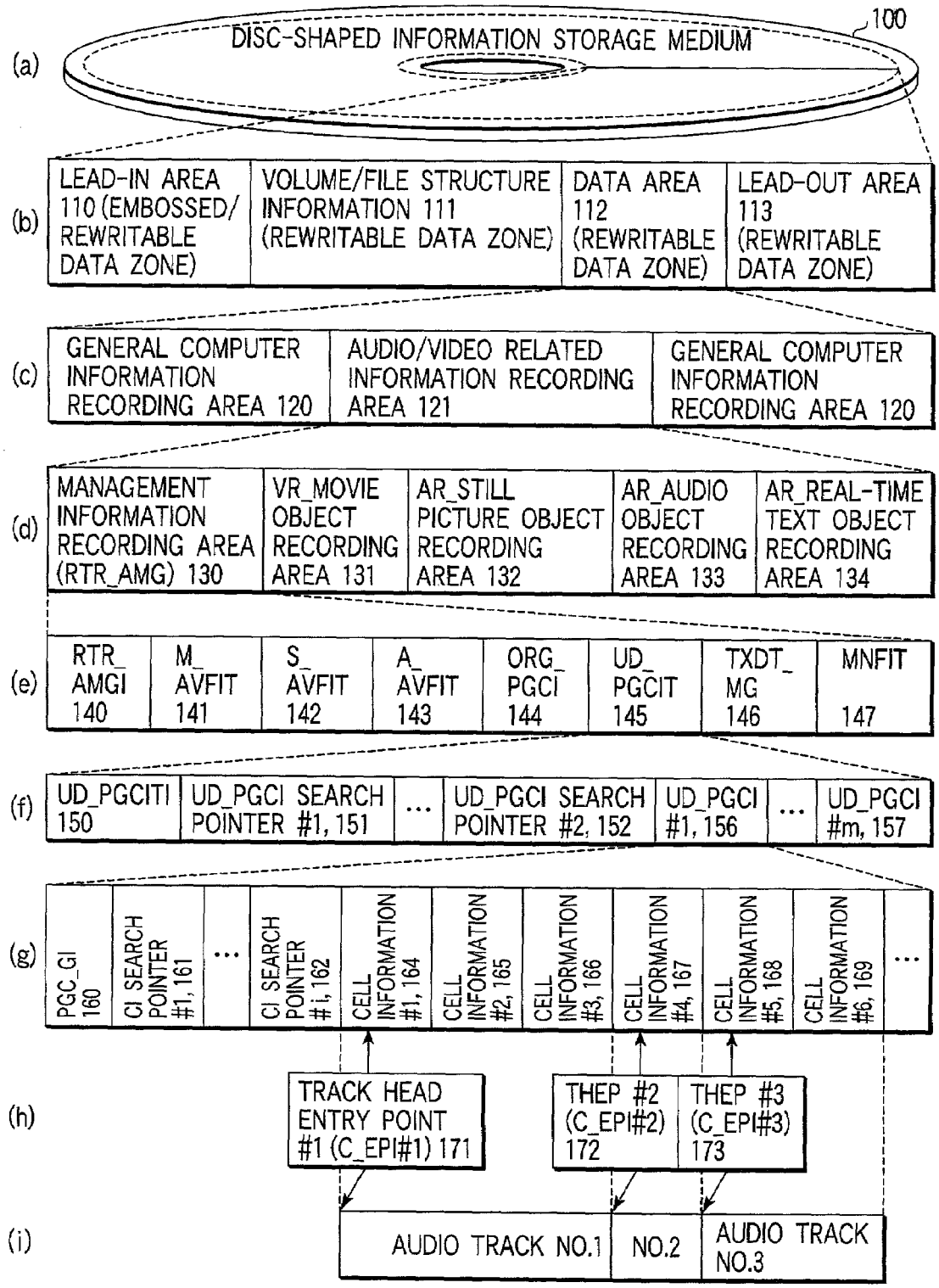
FIG. 1 shows an example of a management data structure that pertains to audio track information according to the present invention.

FIG. 1 shows an embodiment of the present invention. As shown by (a) and (b) of FIG. 1, lead-in area 110, an area for volume/file configuration information 111, data area 112, and lead-out area 113 are assured on rewritable disc-shaped information storage medium 100. As shown by (c) of FIG. 1, data area 112 as an area in which a user can record information in medium 100 has a format in which general computer information recording area 120 and audio/video related information recording area 121 can be present together. Audio/video contents information is called an Object. As shown by (d) of FIG. 1, video contents information is recorded in VR_movie object recording area 131, and audio contents information is recorded in AR_audio object recording area 133.

In the embodiment of the present invention, simultaneously with playback of audio information, not only still pictures can be displayed but also Real-Time Text information that changes in synchronism with audio information like a word card can be simultaneously displayed.

In the embodiment of the present invention, the still pictures are recorded in AR_still picture object recording area 132, and the Real-Time Text information is recorded in AR_RtText Object recording area 134.

In the embodiment of the present invention, the audio information, still picture information, and Real-Time Text information are generally called "audio related information". The contents, attribute information, display control information, and the like of such object information (contents information) are recorded together in management information recording area (RTR_AMG) 130 shown in (d) of FIG. 1.

As shown by (e) of FIG. 1, management information recording area 130 contains real-time audio management information (RTR_AMGI; audio general information such as an attribute and the like) 140, movie AV file information table (M_AVFIT; information such as a movie recording position and the like) 141, still picture AV file information table (S_AVFIT; information such as a still picture recording position and the like) 142, audio AV file information table (A_AVFIT; information such as an audio recording position and the like) 143, original PGC information (ORG_PGCI) 144, user-defined PGC information (UD_PGCI) 145, text data manager (TXTDT_MG) 146, and manufacture information table (MNFIT) 147.

One and only original PGC is present in information storage medium 100, and a plurality of user-defined PGCs can be set. As shown by (f) of FIG. 1, management information which pertains to such user-defined PGC is recorded in first user-defined PGC Information #1/156 to m-th user-defined PGC information #m/157.

These pieces of information are managed together in user-defined PGC information table 145. More specifically, user-defined PGC information table information (UD_PGCITI) 150 indicates tables recorded in this table. In order to search for PGC information, user-defined PGC information (UD_PGCI) search pointers 151 and 152 are recorded.

Each object information (contents information) mentioned above is recorded in an independent file in units of object contents.

Figure 2:
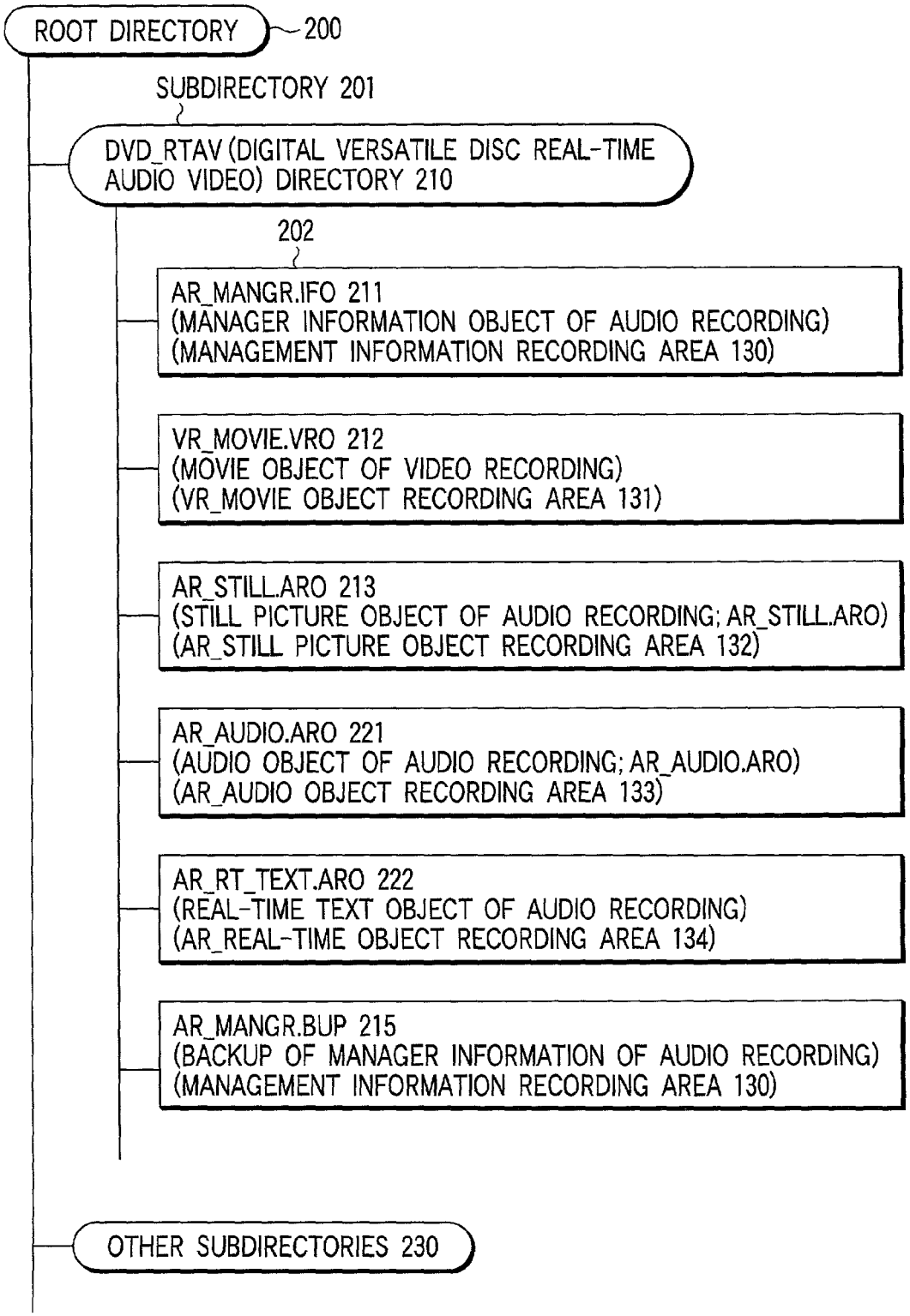
FIG. 2 shows an example of the directory structure of a still picture file, audio file, and text file which are associated with reproducible audio information recorded in an information storage medium (e.g., a DVD-AUDIO recording disc) according to the present invention.

More specifically, as shown in FIG. 2, all pieces of audio information are recorded together in file AR_AUDIO.ARO 221, all pieces of still picture information are recorded together in file AR_STILL.ARO 213, all pieces of Real-Time Text information are recorded together in file AR_RT_TEXT.ARO 222.

In the embodiment of the present invention, one scene of a video in a video information file defined on the Video Recording specifications is extracted as a still picture, and is displayed simultaneously with audio information. Video information file VR_MOVIE.VRO 212 used at that time is also recorded in single DVD_RTAV directory 210. Information in management information recording area 130 that systematically manages these object files is recorded in file AR_MANGR.IFO 211 and its backup file AR_MANGR.BUP 215.

The framework of the data structure of management information which is recorded on the information storage medium that allows sound recording (or recording) and playback of audio related information has the same structure as that in the Video Recording specifications constituted by the DVD forum for the sake of compatibility, as shown in (e) of FIG. 1.

As in the specifications "Part 3 VIDEO RECORDING DVD Specifications for Rewritable/Re-recordable Discs" constituted by the DVD forum on September of 1999, information indicating the playback sequence of audio related information is recorded in PGC (Program Chain) information 144 (original program chain) and PGC information 145 (user-defined program chain).

That is, upon playback, minimum basic units to be continuously played back in audio related information are called cells, and a PGC (Program Chain) is formed as a playback sequence indicating a linkage of the cells.

Figure 8:
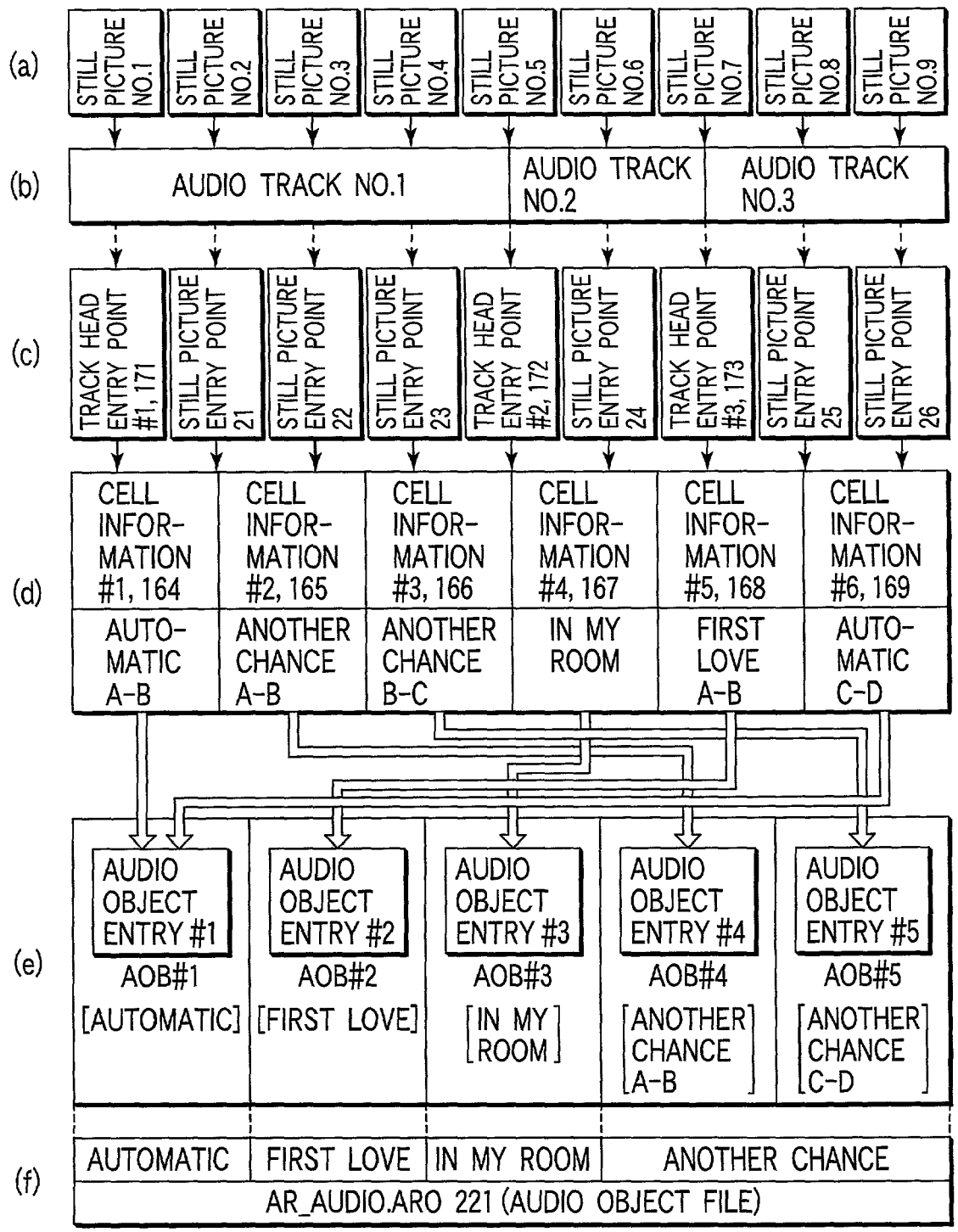
FIG. 8 is an explanatory view showing the relationship between the play list and audio object files according to the present invention.

All pieces of management information that pertain to cells are recorded in first cell information #1/164 to sixth cell information #6/169 ((g) of FIG. 1 and (d) of FIG. 8). The portion (i) of FIG. 1 shows the presence of audio tracks 1, 2, and 3 as a result of editing, and (h) of FIG. 1 shows that track head entry points (THEP; or C_EPI) 171, 172, and 173 that designate the heads of audio tracks are recorded. Each of these track head entry points (THEP; C_EPI) 171, 172, and 173 designates cell information for playing back objects of the corresponding track.

The data structure of management information which pertains to still picture information (still picture object) to be simultaneously displayed upon playing back audio information, and text information indicating unique information in units of tracks will be explained below using FIGS. 3 to 5.

Figure 3:
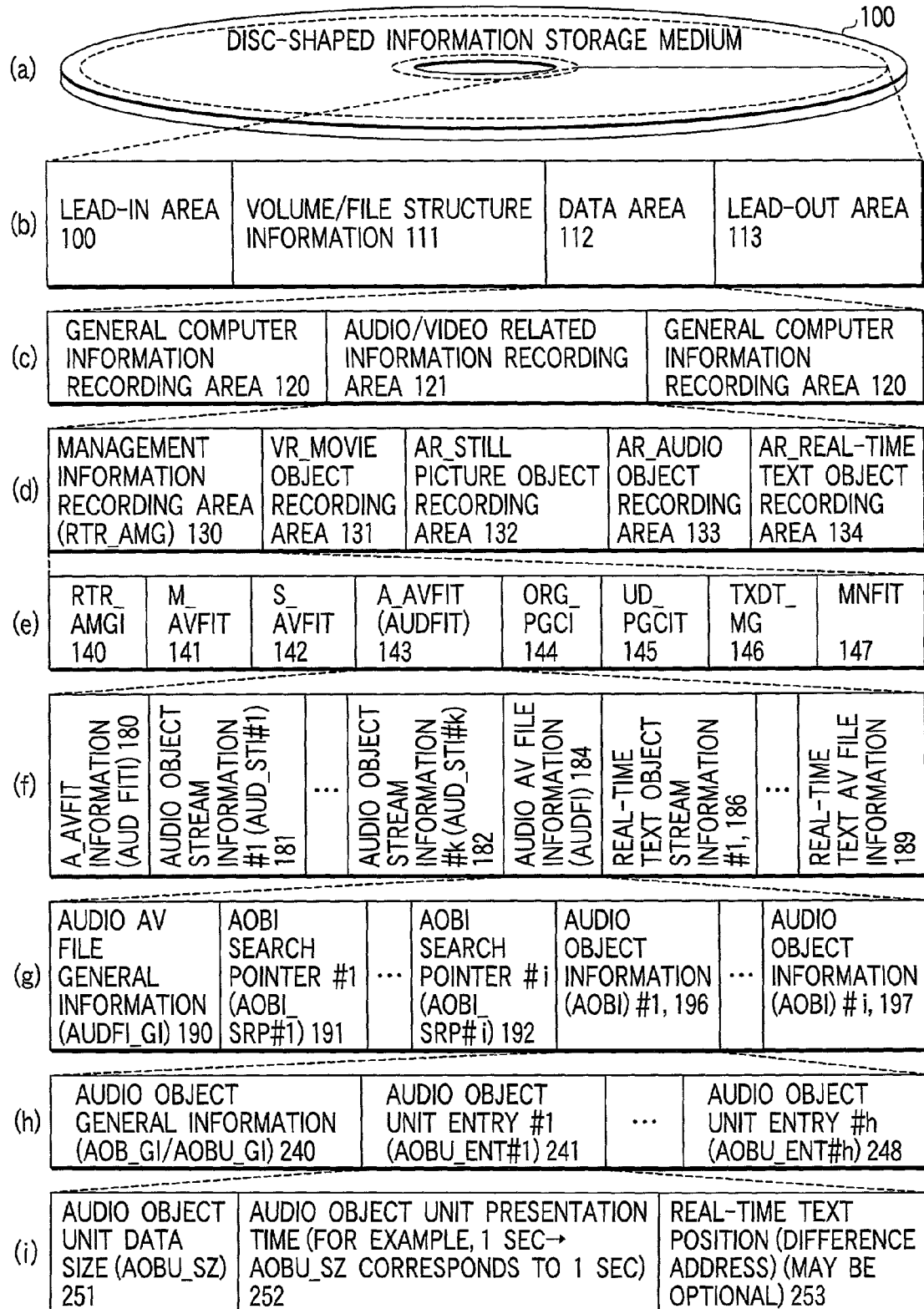
FIG. 3 shows an example of a management information data structure that pertains to audio information according to the present invention.
Figure 4:
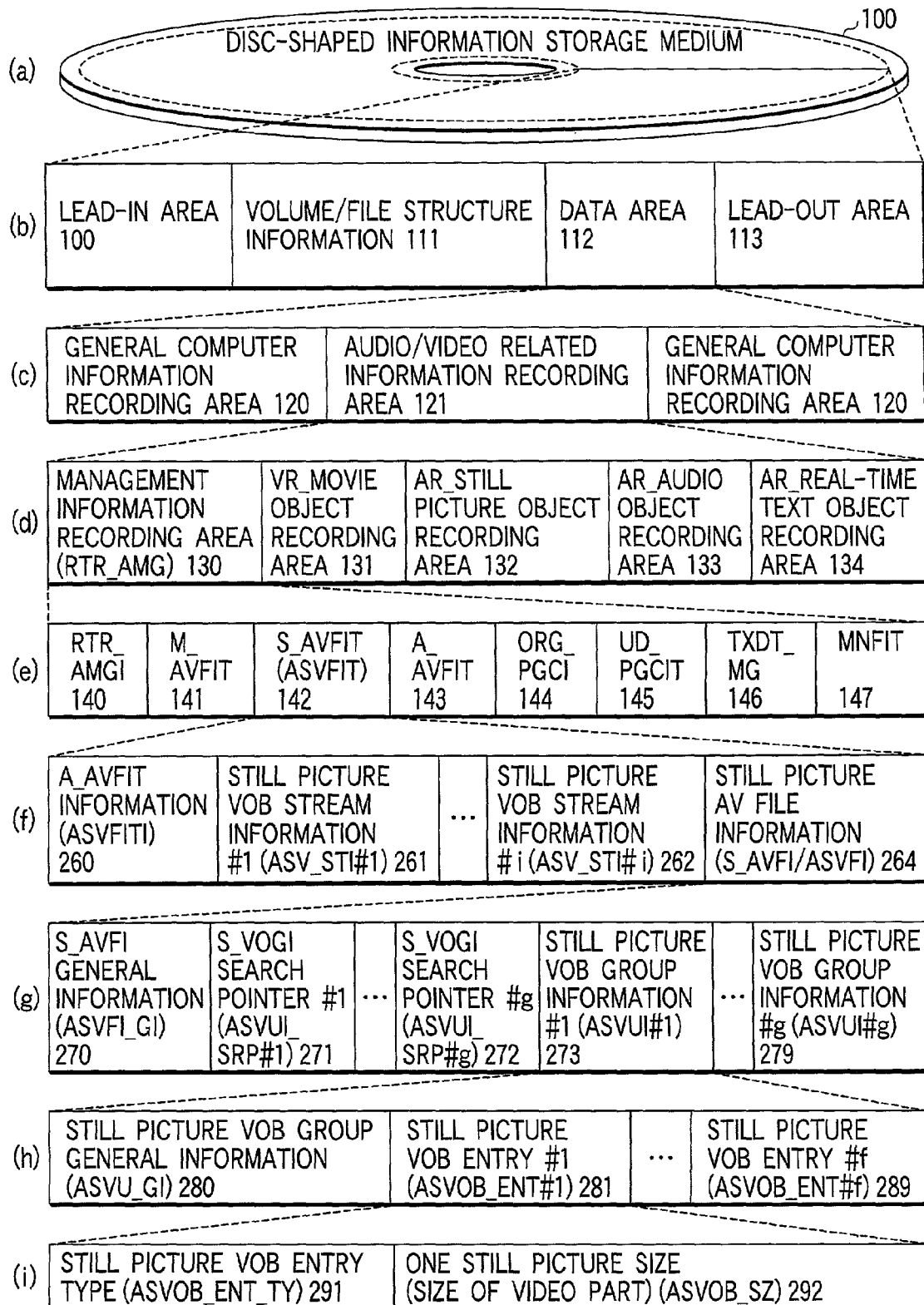
FIG. 4 shows an example of the management information data structure that pertains to still picture information recorded in the information storage medium according to the present invention.
Figure 5:
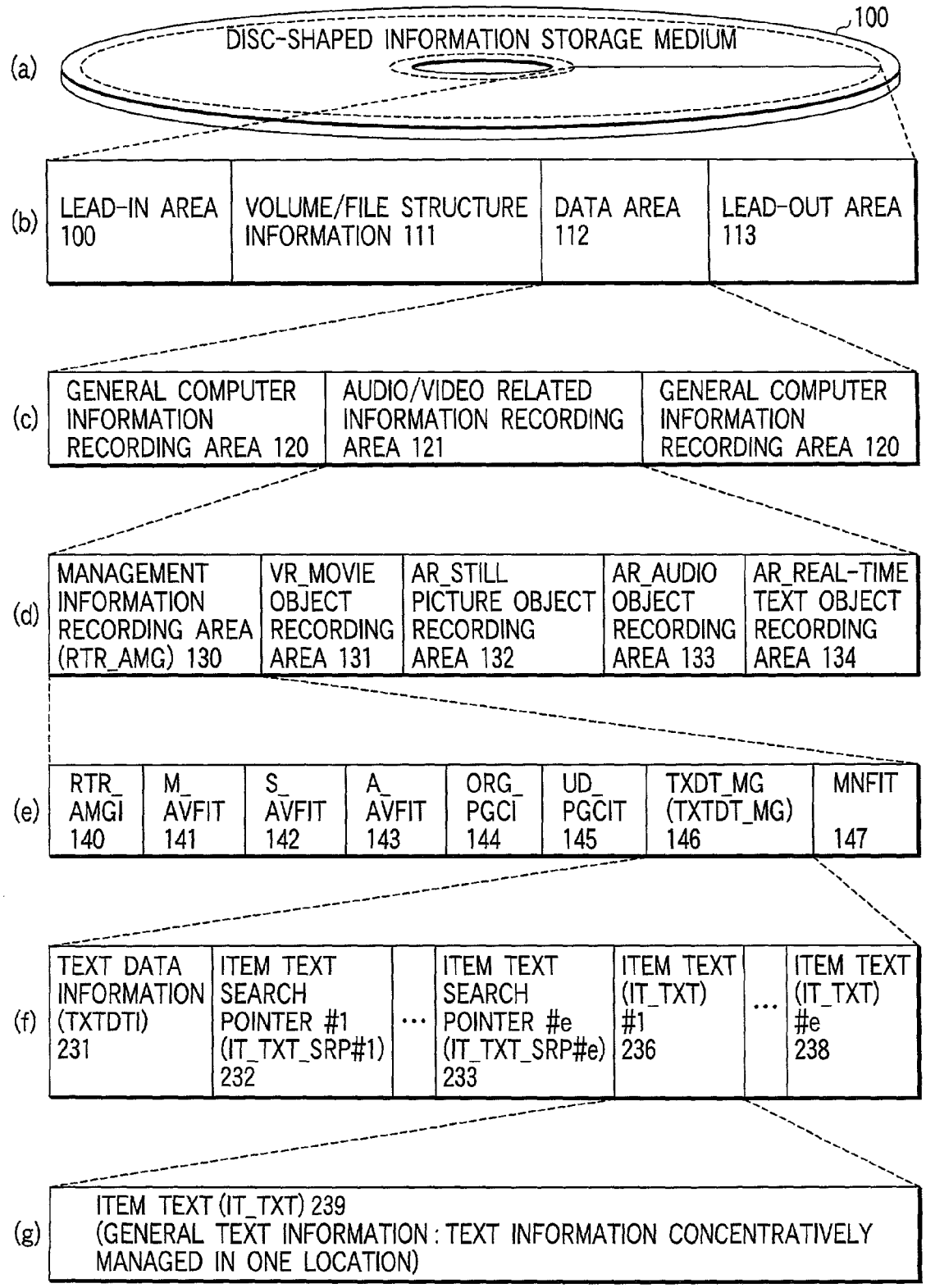
FIG. 5 shows an example of the management information data structure that pertains to text information recorded in the information storage medium according to the present invention.

The contents of (a) to (e) of FIG. 1 may respectively be identical to those of (a) to (e) of each of FIGS. 3 to 5.

Management information which pertains to audio information in file AR_AUDIO.ARO 221 shown in FIG. 2 is recorded in audio AV file information table (AUDFIT) 143, as shown in (e) of FIG. 3. Note that the same reference numerals in FIG. 3 denote the corresponding portions in FIG. 1.

The contents of (e) to (i) of FIG. 3 hierarchically show A_AVFIT (audio AV file information table) 143, i.e., management information that pertains to audio. As shown in (f) of FIG. 3, audio AV file information table 143 is comprised of A_AVFIT information (AUD_FITI) 180, a plurality of pieces of audio object stream information (AUD_STI) 181, . . . , 182, audio AV file information (AUDFI) 184, real-time text object stream information 186, and real-time text AV file information 189. As shown in (g) of FIG. 3, audio AV file information 184 is formed of audio AV file general information (AUDFI_GI) 190, audio object information search pointers (AOBI_SRP) 191, . . . , 192, a plurality of pieces of audio object information (AOBI) 196, . . . , 197, and the like.

As shown in (h) of FIG. 3, each audio object information is formed of audio object general information (AOB_GI/AOBU_GI) 240, and audio object unit entries (AOBU_ENT) 241, . . . , 248. As shown in (i) of FIG. 3, each audio object unit entry is made up of audio object data size (AOBU_SZ) 251, audio object unit presentation time (indicating, e.g., one second corresponding to AOBU_SZ) 252, real-time text position (indicated by, e.g., difference address) 253, and the like.

Management information for real-time text information (Real-Time Text Object) (information, the display contents of which change in synchronism with audio information) recorded in file AR_RT_TEXT.ARO 222 in FIG. 2 is also recorded in Real-Time Text Object Stream Information #1/186 ((f) of FIG. 3) and real-time text AV file information 189 ((f) of FIG. 3) in audio AV file information table 143 ((e) of FIG. 3).

Upon recording audio information on disc-shaped information storage medium 100, a plurality of tracks are often recorded together. In this case, an audio information unit recorded at one time is called an audio object (AOB).

Management information, i.e., audio object information (AOBI #1/196 to AOBI #i/197 in (g) of FIG. 3) is provided to each AOBs. In order to allow special playback of audio information such as Fast Front, Fast Reverse, time search, and the like, audio information is broken up (or divided) into units (audio object units) smaller than the AOB, and a plurality of sets of information of data sizes (audio object unit data size (AOBU_SZ) 251 in (i) of FIG. 3) and display times (audio object unit presentation time 252) of the respective units (audio object units) are recorded in the recording locations of audio object unit entries AOBU_ENT #1/241 to AOBU_ENT #h/248 shown in (h) of FIG. 3.

In the embodiment of the present invention, position (relative address) information in file AR_RT_TEXT.ARO 222 where real-time text information (Real-Time Text Object) to be displayed upon playing back audio information at the head position in each unit (audio object unit) is recorded is recorded in a corresponding one of audio object unit entries AOBU_ENT #1/241 to AOBU_ENT #h/248 ((h) of FIG. 3) as Real-Time Text Position information 253 ((i) of FIG. 3).

Note that a program chain (PGC) is a generic conceptual unit to represent a chain of track which corresponds to the track set, and to represent a chain of part of track which corresponds to a play list.

An original PGC (ORG_PGC) represents the track set which is a chain of tracks, and includes stream data stored in ".ARO" files (cf. FIG. 2). Only one original PGC shall exist in disc 100.

A user defined PGC (UD_PGC) is a chain of part of tracks. The UD_PGC contains only navigation data, and each part of track refers to stream data belonging to the ORG_PGC. Therefore, creating or deleting any UD_PGC does not affect the ORG_PGC at all.

An audio object (AOB) is audio stream data originated in one real time recording.

A basic unit of the AOB is called an audio object unit (AOBU) which is formed of one or more audio frames and padding data. One audio frame shall not be included in two AOBUs. Padding data shall not exist in the middle of AOBU but may exist at the end of AOBU.

In case of Linear PCM, however, padding data may exist in the middle of AOBU to align the unit of sample data into the boundary of the data pack of the AOBU. For the purpose of this alignment, the size of padding data in the middle of AOBU shall be smaller than the size of the unit of sample data.

In short, a data pack of AOBU can be filled with the padding data so that the pack does not cross from one sample data unit of Linear PCM to the next sample data unit thereof.

The presentation time period of AOBU has a fix value according to coding and sampling frequency of the audio elementary stream.

For example, when coding is Linear PCM and the sampling frequency is any of 48 kHz, 96 kHz, and 192 kHz, the presentation period of AOBU is just 1 second, or this AOBU has the size corresponding to the presentation time of 1 second.

An audio still video object (ASVOB) is audio still video stream data played back with presentation of AOB. ASVOB represents one still picture.

An audio still video unit (ASVU) is a collection of one or more (up to 99) ASVOB(s) which are presented while one or more tracks are played back. ASVU may be pre-loaded into a memory (buffer) before starting the presentation of the track(s).

A program (PG) is, from a user's point of view, a data structure corresponding to an original track. The PG is formed of one or more cells.

A cell is a data structure to represent a portion of a track. A cell in the original PGC is called an original cell, and a cell in the user defined PGC is called a user defined cell. A track in the track set is formed of one or more original cells. A part of track in a play list is formed of one or more user defined cells. The cell refers to a whole or a part of an AOB.

An entry point (EP) is data to specify the playback behavior within a cell. There are four types of entry point (EP for a user defined track, EP for an index, EP for a display list, and EP for a representative audio). Each cell has a set of entry points.

A program chain information (PGCI) is a data structure to represent a total presentation of a PGC. The PGCI is used both for the original PGC and user defined PGC. The user defined PGC has only PGCI, and the cells in the PGCI refer to AOBs in the original PGC. The total presentation of a PGC is described as a presentation sequence of cells defined in the PGCI.

An audio object information (AOBI) is a data structure to describe information regarding an AOB.

An audio still video unit information (ASVUI) is a data structure to describe information regarding an ASVU.

As shown in (f) of FIG. 4, still picture AV file information table 142 is formed of A_AVFIT information (ASVFITI) 260, one or more pieces of still picture VOB stream information (ASV_STI) 261–262, and still picture AV file information (S_AVFI/ASVFI) 264.

As shown in (g) of FIG. 4, still picture AV file information 264 is formed of S_AVFI general information (ASVFI_GI) 270, one or more S_VOGI search pointers (ASVUI_SRP) 271–272, and one or more pieces of still picture VOB group information (ASVUI) 273–279.

As shown in (h) of FIG. 4, still picture VOB group information 273 is formed of still picture VOB group general information (ASVU_GI) 280, and one or more still picture VOB entries (ASVOB_ENT) 281–289.

As shown in (i) of FIG. 4, still picture VOB entry (ASVOB_ENT) 281 includes information of still picture VOB entry type (ASVOB_ENT TY) 291, and the size of one still picture (or size of the corresponding video part) (ASVOB_SZ) 292.

A plurality of pieces of still picture information are often recorded together on disc-shaped information storage medium 100. Therefore, a plurality of pieces of still picture information to be recorded together are called a still picture VOB group, and management information associated with each still picture VOB group is recorded in corresponding still picture VOB group information (ASVUI #1/273 to ASVUI #g/279 shown in (g) of FIG. 4) so as to manage in units of still picture VOB groups.

Still picture VOB entries ASVOB_ENT #1/281 to ASVOB_ENT #f/289 ((h) of FIG. 4) in still picture VOB group information ASVUI #1/273 to still picture VOB group information ASVUI #g/279 are used to manage the data size per still picture (one still picture size 292).

A plurality of pieces of item text information are recorded together in text data manager (TXTDT_MG) 146 shown in (e) of FIG. 5.

As shown in (f) of FIG. 5, text data manager 146 is formed of text data information (TXTDTI) 231, one or more item text search pointers (IT TXT_SRP) 232–233, and one or more item texts (IT_TXT) 236–238. As shown in (g) of FIG. 5, each item text (IT_TXT) 239 includes general text information.

In this way, all the item text contents (IT_TXT #1/236 to IT_TXT #e/238 shown in (f) of FIG. 5) can undergo a search such as "text search" to help audio information search.

Note that the present specification hierarchically describes various data structures recorded on a storage medium (100), and these structures are described on a plurality of figures from various directions, but the same reference numerals denote the corresponding parts throughout the figures.

The playback sequence information that pertains to audio related information includes two types of sequences:

1a. a playback sequence that plays back in the order in which data was recorded on information storage medium 100; and 2a. a playback sequence that the user can arbitrarily designate.

1b. Management information which pertains to the playback sequence that plays back in the order data was recorded on information storage medium is called "original PGC", and is named "original track 1" for the user, as shown in FIG. 6A.

2b. Management information which pertains to the playback sequence that the user can arbitrarily designate is called "user-defined PGC", and is named "play list" for the user, as shown in FIG. 6B.

A CD (Compact Disk), MD (Magneto-Optical Disk), and cassette tape have management units called tracks which are set in units of tunes of popular music or in units of movements of classical music. Upon creating the play list (user-defined PGC), the user may often create new track "C" by combining portions of original tracks "A" and "B".

A column of picture 5 in FIG. 6A indicates "representative pictures" as still pictures indicating the contents of individual tracks. In the embodiment of the present invention, a still picture which is displayed first upon playing back audio information is often used as a representative picture. However, the present invention is not limited to such specific picture, and a representative picture can be designated independently of a still picture which is displayed first. Display mode 7 indicates the way still pictures to be displayed upon playing back audio information are switched, and their timings.

Display order modes include:

Sequential . . . still pictures to be displayed are switched in accordance with an order designated in advance;

Random . . . display order of still pictures is randomly set (an identical picture may often be successively displayed in the worst case); and Shuffle . . . display order of still pictures is rearranged with respect to an order designated in advance to display pictures (an identical still picture is displayed once per cycle).

Display timing modes include:

Slideshow . . . a still picture is switched to the next one at a predetermined timing; and Browsable . . . a still picture is switched to the next one when the user has pressed a switch (an identical still picture is kept displayed until the user presses the switch).

Display mode 7 is set in units of tracks, and never changes within a given track.

Time chart 11 visualizes a designation range when the user designates a portion of an original track upon creating a play list.

Note that an "original track" is a logical unit of contents which are consecutively recorded. An original track may correspond to one track when it is copied from a digital source (such as CD or DVD disc), and may correspond to a song (or tune) when it is recorded from an analog source (e.g., recorded from a microphone or via broadcasting). When part of a track is deleted, although the total presentation time of the original track is decreased, the original track remains. When an original track is modified or created as a result of editing the recorded contents, the original track is defined as a logical unit which is consecutively presented.

The entire recorded contents of a disc (100) consisting of all tracks are represented by a "track set". The track set corresponds to a model which abstracts sequential media such as audio tapes. Therefore, the presentation of the track set needs to be defined to simulate the sequential media. When the track set is played back, the presentation order of original tracks becomes the same as the recorded order of the original tracks, unless any original tracks have been edited so as to change the presentation order from the original recording. When an original track or part of an original track is deleted, the track set remains although the total presentation time is decreased. When a new original track is recorded, it is appended at the end of the track set. The track set corresponds to the data structure called an original PGC.

A specified segment of a track is called as an "index". Assume that a track corresponds to one symphony. Under this assumption, one movement of the symphony corresponds to an index. The start point of an index segment is indicated by an index point. An index point will be automatically set by an apparatus (or equipment) in recording time using given information such as index data of source contents, or set by user operation such as pausing or stopping of recording. The index may be inherited from the original track in the track set or may be defined in a play list.

A subunit of recorded contents within an original track is called as "part of track". A part of track is a consecutive part of an original track which is specified by a user. This abstraction is used only to define the play list itself. Therefore, there is no data structure directly representing the part of track.

A list of part of tracks is called as a "play list". A play list allows a user to define any playback sequences, each of which may be a filtered view of the track set. A play list is defined as a user defined PGC.

A user defined PGC is a chain of part of programs. A program is a logical unit of recorded contents, which are recognized or defined by a user. A program is formed of one or more original cells, and is defined only in the original PGC. The user defined PGC contains only navigation data, and each part of program refers to stream data belonging to the original PGC. Therefore, creating or deleting a user defined PGC does not affect the original PGC at all.

A specified segment in a play list is called as an "user defined track". A user defined track is a user specified segment in the play list. A user can add multiple part of track to the play list. Not all part of track will be the beginning of a song (or tune) from a user's point of view. Therefore, a user is allowed to define the beginning of a song (or tune) at the top of specified part of track.

Figure 7:
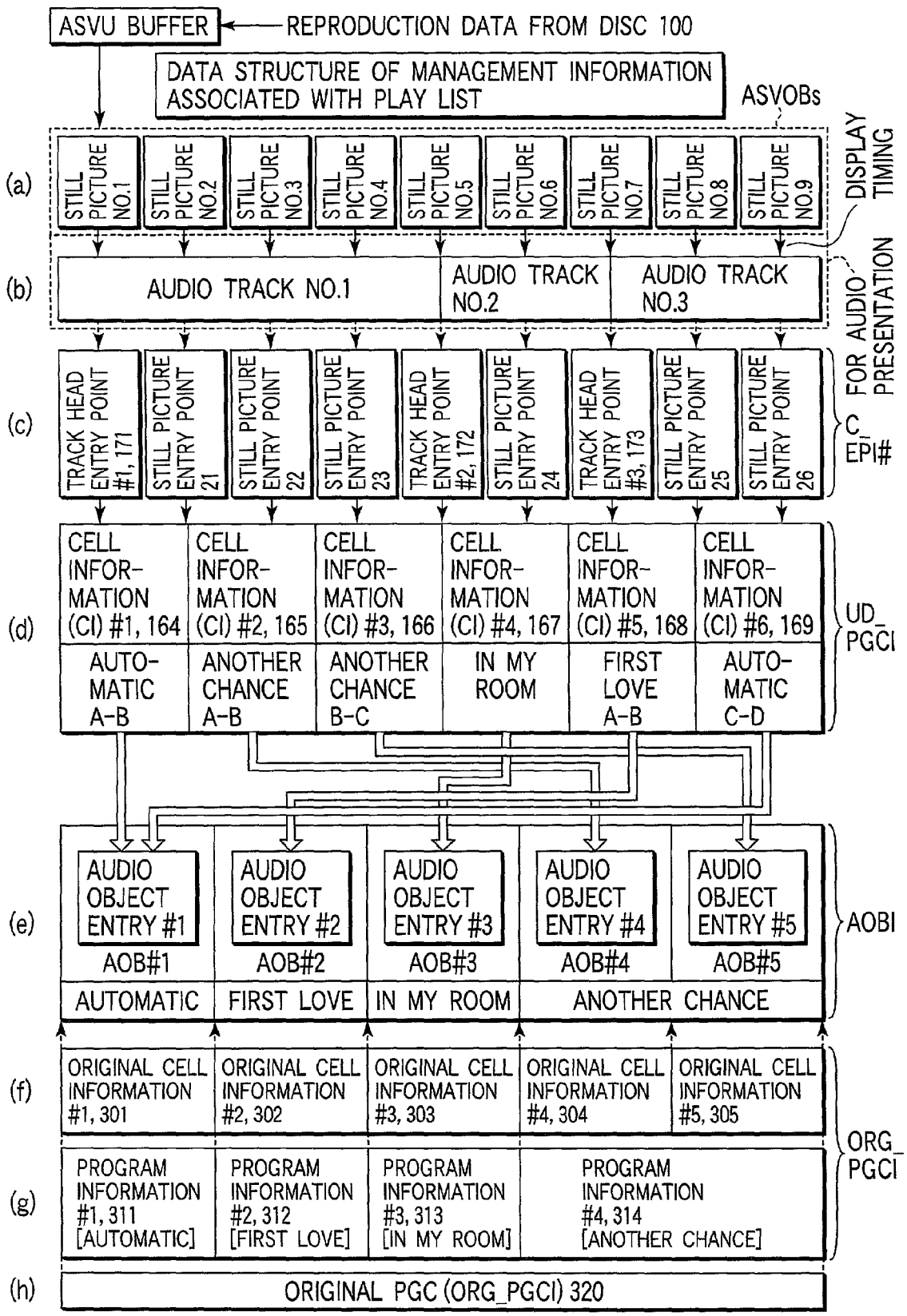
FIG. 7 shows the data structure of management information which is associated with the play list according to the present invention.

FIG. 7 shows the relationship between management information that pertains to the created play lists, and the original PGC, and FIG. 8 shows the relationship between the management information, and audio object file AR_AUDIO.ARO 221 shown in FIG. 2.

See the upper portion in the illustration of FIG. 7. Data (ASVOBS) reproduced from disc 100 is temporarily stored in a temporary storage (ASVU buffer). As shown in (a) of FIG. 7, the data in the ASVU buffer can include a plurality of still pictures (No. 1 to No. 9). In the example shown in (b) of FIG. 7, still pictures No. 1 to No. 4 pertain to audio track No. 1, still pictures No. 5 and No. 6 pertain to audio track No. 2, and still pictures No. 7 to No. 9 pertain to audio track No. 3. For instance, during the presentation of audio track No. 1, still pictures No. 1 to No. 4 can be displayed at given timings.

As shown by (c) of FIG. 7, audio track No. 1 is associated with track head entry point (C_EPI) #1/171 and still picture entry points 21 to 23. Similarly, audio track No. 2 is associated with track head entry point (C_EPI) #2/172 and still picture entry point 24, and audio track No. 3 is associated with track head entry point (C_EPI) #3/173 and still picture entry points 25 and 26.

As shown by (d) of FIG. 7, track head entry points (C_EPI) #1/171, #1/171, and #3/173 can indicate cell information (CI) #1/164, #4/167, and #5/168, respectively. Cell information (CI) #2/165 can be indicated by still picture entry points 21 and 22. Cell information (CI) #4/167 can be indicated by still picture entry point 24. Cell information (CI) #6/169 can be indicated by still picture entry points 25 and 26.

The portion (e) of FIG. 7 shows audio objects (AOB #1 to AOB #5) to explain the concept, and audio object entries #1 to #5 are recorded in audio object information (AOBI #1/196 to AOBI #i/197 in (g) of FIG. 3) which records management information that pertains to each AOB.

The portion (h) of FIG. 7 shows original program chain 320. The portion (g) of FIG. 7 shows first (#1) program information, second (#2) program information, third (#3) program information, and fourth (#4) program information corresponding to this program chain, and (f) of FIG. 7 shows a plurality of pieces of original cell information 301, 302, 303, 304, and 305 corresponding to this program information. These pieces of original cell information respectively correspond to tunes (objects) "Automatic", "First Love", "In My Room", and "Another Chance" in (e) of FIG. 7.

The portion (d) of FIG. 7 shows a case wherein first cell information #1/164 designates a portion of audio information with a track name (tune name) "Automatic", second cell information #2/165 and third cell information #3/166 designate audio information with a track name (tune name) "Another Chance", and fourth cell information #4/167 designates audio information with a track name (tune name) "In My Room" upon editing. In this case, upon playing back in accordance with the order these cell information #1/164 to cell information #6/169 are arranged, after a portion of "Automatic" is played back/displayed, "Another Chance" and "In My Room" are played back/displayed in turn.

The contents of (a) to (d) of FIG. 8 may be the same as those of FIG. 7.

Information indicating that range in file AR_AUDIO.ARO 221 (FIG. 2 or (f) of FIG. 8), which is to be played back by a single cell, is recorded in cell information (#1/164 to #6/169) ((d) of FIG. 8). The playback sequence of audio related information to be played back in accordance with one PGC information is set to play back/display in the order cell information #1/164 to cell information #6/169 which form that PGC information 156 are arranged, as shown in (g) of FIG. 1.

For example, as shown in (d) of FIG. 8, when cell information #1/164 designates a portion of audio information with a track name (tune name) "Automatic", cell information #2/165 and cell information #3/166 designate audio information with a track name (tune name) "Another Chance", and cell information #4/167 designates audio information with a track name (tune name) "In My Room", "Automatic" is partially played back/displayed and, after that, "Another Chance" and "In My Room" are played back/displayed in turn in accordance with the order cell information #1/164 to cell information #6/169 are arranged.

As shown in (e) of FIG. 8, in the embodiment of the present invention, since one cell can designate only a continuous playback range in AR_AUDIO.ARO 221 ((f) of FIG. 8) as an audio information file (in other words, stepped (discrete) playback ranges in AR_AUDIO.ARO 221 cannot be played back), the present invention is characterized in that a portion of original track "A" is designated as one (user-defined) cell #1 (first cell), and a portion of original track "B" is designated as another (user-defined) cell #2 (second cell) to define and manage new track ""C" as a combination of these cells #1 and #2.

Therefore, the embodiment of the present invention adopts a data structure in which one track is formed by a combination of one or more cells.

As shown in (d) of FIG. 8, and as described above, each cell information (#1/164 to #6/169) records an AOB (audio object) indicated by that cell and the cell start and end times as time information.

Upon playing back the designated cell, information within the designated time range in the designated AOB is played back. Using information of audio object unit entries AOBU_ENT #1/241 to AOBU_ENT #h/248 ((h) of FIG. 3) recorded in audio object information (AOBI #1/196 to AOBI i/197) ((g) of FIG. 3), this time information is converted into a relative address in AR_AUDIO.ARO 221 ((f) of FIG. 8) to play back desired audio information.

Note that playback start can be arbitrarily selected. When the user designates one of track head entry points 171, 172, and 173, playback can be started from any track (edited tune) "Automatic"+"Another Chance", "In My Room", or "First Love"+"Another Chance". In this case, edited tracks Nos. 1, 2, and 3 are exemplified. Still pictures can also be designated in association with audio tracks.

Management information for still picture information (still picture object) to be displayed simultaneously with playback of audio information is recorded in still picture AV file information table (S_AVFIT) 142 shown in (e) of FIG. 4.

Cell information (CI) #1/164 to cell information (CI) #6/169 correspond to portions of original tracks, and include still picture entry points 21 to 26 ((c) of FIG. 7 or (c) of FIG. 8) that record management information which pertains to the second and subsequent still pictures to be displayed in corresponding tracks. Each cell information (each of CI #1/164 to CI #6/169) records "designation information of corresponding audio object information (AOBI #1/196 to AOBI #i/197 in (g) of FIG. 3)" and "information that pertains to the start and end times of each object", and the access address on AR_AUDIO.ARO 221 can be detected with reference to audio object entries #1 to #5 in (e) of FIG. 7 (audio object unit entries AOBU_ENT #1/241 to AOBU_ENT #h/248 in (h) of FIG. 3) in corresponding audio object information (AOBI #1/196 to AOBI #i/197 in (g) of FIG. 3).

As a method of defining breaks of tracks unique to audio information while maintaining the aforementioned data structure so as to assure compatibility with the Video Recording specifications constituted by the DVD forum, the first major feature of the embodiment of the present invention lies in that "information indicating a break position of each track with respect to the audio information is recorded in PGC information as information indicating the playback sequence."

As a method of realizing this, in the embodiment shown in FIG. 1, information recording areas called first (#1), second (#2), and third (#3) track head entry points (or cell entry points C_EPI #1 to C_EPI #3) 171, 172, and 173 are set in cell information CI #1/164, cell information CI #4/167, and cell information CI #5/168 as management information of cells which are located at the playback start positions of the individual tracks, so as to record information unique to tracks shown in FIGS. 9A and 9B.

The contents recorded in track entry points C_EPI #1/171 to C_EPI #3/173 shown in (h) of FIG. 1 and still picture entry points 21 to 26 shown in (c) of FIG. 7 or (c) of FIG. 8 will be explained below using FIGS. 9A and 9B. "Information for designating the saving location of a still picture to be displayed" designates a corresponding still picture using number designation information of still picture VOB group information (ASVUI #1/273 to ASVUI #g/279 in (g) of FIG. 4) and a still picture VOB entry (ASVOB_ENT #1/281 to ASVOB_ENT #f/289 in (h) of FIG. 4) therein.

Figure 11:
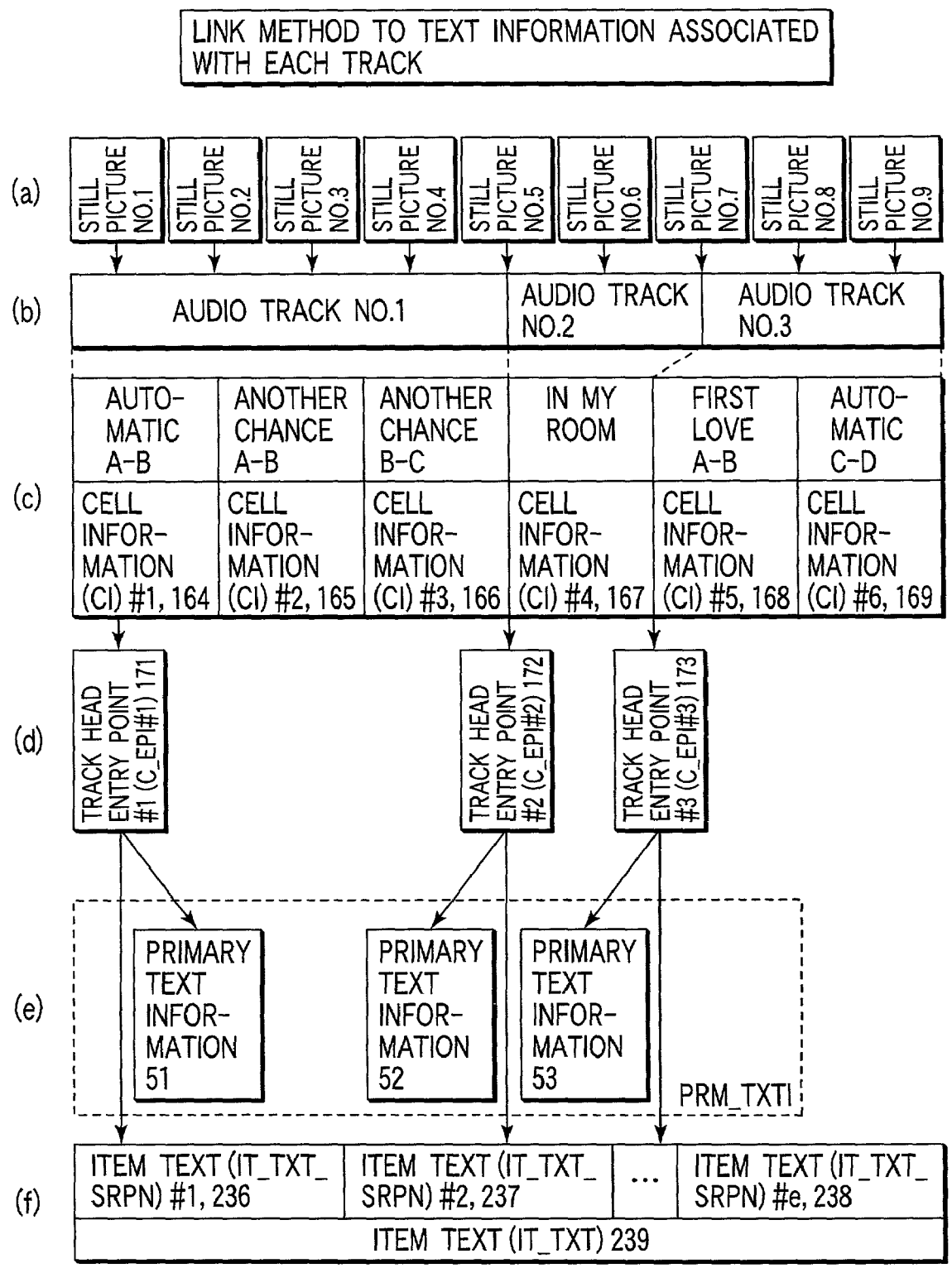
FIG. 11 is an explanatory view of a link method to text information which is associated in units of tracks according to the present invention.

As shown in FIGS. 9A and 9B, as the types of entry points, a track head entry point ((h) of FIG. 1 or (d) of FIG. 11) or program information ((g) of FIG. 7) is available. The contents of entry point information (C_EPI) of this entry point include entry point type information (EP_TY in FIG. 29, etc.; identification information indicating a track head entry point or still picture entry point), information (RA_DUR in FIG. 44) for designating the display range of a representative audio that indicates the contents of the corresponding audio track (designated by the playback start and end times in the corresponding audio track), and information (REP_PICTI in FIG. 29 or FIG. 50) for designating the saving location of a representative picture that represents the contents of the corresponding audio track [designated by an S_VOB search pointer number (still picture VOB group number) and a VOB entry number therein].

Furthermore, the contents of entry point information include text information (primary text information PRM_TXTI: tune name, player name, singer name, song writer name, or the like) unique to the corresponding audio track, additional comment text information (central text information; item text IT_TXT), a display mode (display order mode, display timing mode) of still pictures in the corresponding audio track, display time range information of the corresponding still picture, the relationship between the still picture contents to be displayed and an original track (whether the same still pictures as those in the original track are displayed or other unique (newly set) still pictures are displayed), an erase inhibition flag, and the like.

The still picture entry point contains entry point type information (identification information indicating a track head entry point or still picture entry point), information for designating the saving location of a still picture to be displayed [designated by an S_VOGI search pointer number (still picture VOB group number) and a VOB entry number therein], designation information of the display timing of the still picture of interest (to adjust the display timing between two objects by designating display time information of the corresponding audio object), display time range information of the corresponding still picture information, and the like. Note that other kinds of information may be added in addition to those described above.

The present invention is not limited to the specific embodiment shown in FIG. 1. In place of track head entry points (C_EPI) 171 to 173 ((h) of FIG. 1), a recording area of "flag information indicating if the corresponding cell is located at the head position of a track" (if "flag=1", the corresponding cell is located at the head position of a track; if "flag=0", the corresponding cell is located at the second or subsequent position of a track) may be set in cell information #1/164, #4/167, or #5/168 of a cell which is located at the head position of a track (although not shown). Furthermore, the embodiment of the present invention includes a method of recording information with the contents shown in FIGS. 9A and 9B in a general information recording area of each cell information #1/164, #4/167, or #5/168 ((g) of FIG. 1).

The display window of original track 1 in FIG. 6A and the data structure of corresponding management data will be described below using FIG. 7. All pieces of information which pertain to original track 1 in FIG. 6A are managed in original program chain information 144. Original PGC 320 shown in (h) of FIG. 7 depicts the concept of such structure. As for the original track, each program corresponds to one track, i.e., one original track=one program. Information that pertains to each original track shown in FIGS. 9A and 9B is described in program information (#1/311 to #5/305) as a management information recording area of this program.

One program consists of one or more original cells, and management information recording areas of original cell information #1/301 to original cell information #5/305 are assured for such original cells. In original track 1 (original PGC 320), AOBs #1 to #5 have one-to-one correspondence with all original cells #1/301 to #5/305, i.e., one cell=one AOB.

The correspondence among FIGS. 6A and 6B, FIG. 7, and FIG. 8 will be explained below. Audio information with a track name (tune name) "Automatic" in FIG. 6A is recorded in AOB #1 in file AR_AUDIO.ARO 221, management information that pertains to the original track is recorded in program information #1/311, and information that pertains to playback is recorded in original cell information #1/301. Likewise, audio information with a track name (tune name) "First Love" is recorded in AOB #2 in file AR_AUDIO.ARO 221, management information that pertains to the original track is recorded in program information #2/312, and information that pertains to playback is recorded in original cell information #2/302. Audio information with a track name (tune name) "Another Chance" is managed as one AOB immediately after recording, but since its track is partially erased, that audio information is broken up into two AOBs #4 and #5, and its cell information is broken up into two pieces of original cell information #4/304 and #5/305 accordingly ((e) of FIG. 7). However, since the track itself remains unchanged, program information #4/314 is maintained as a piece of information.

The user creates a new track in a play list he or she wants by an edit process using the window shown in FIG. 6B. For example, assume that the user creates play lists #1 and #2, as shown in FIG. 6B. That is, the user creates new track No. 1 by joining the range from A to B of "Automatic" and whole "Another Chance", and sets four still pictures No. 1 to No. 4 shown in (a) of FIG. 7 as those to be displayed during playback of this music. Then, the user creates new track No. 2 by changing still pictures to be displayed of "In My Room", and creates new track No. 3 by joining the range from A to B of "First Love" and the range from C to D of "Automatic" and setting three still pictures No. 7 to No. 9.

Figure 10:
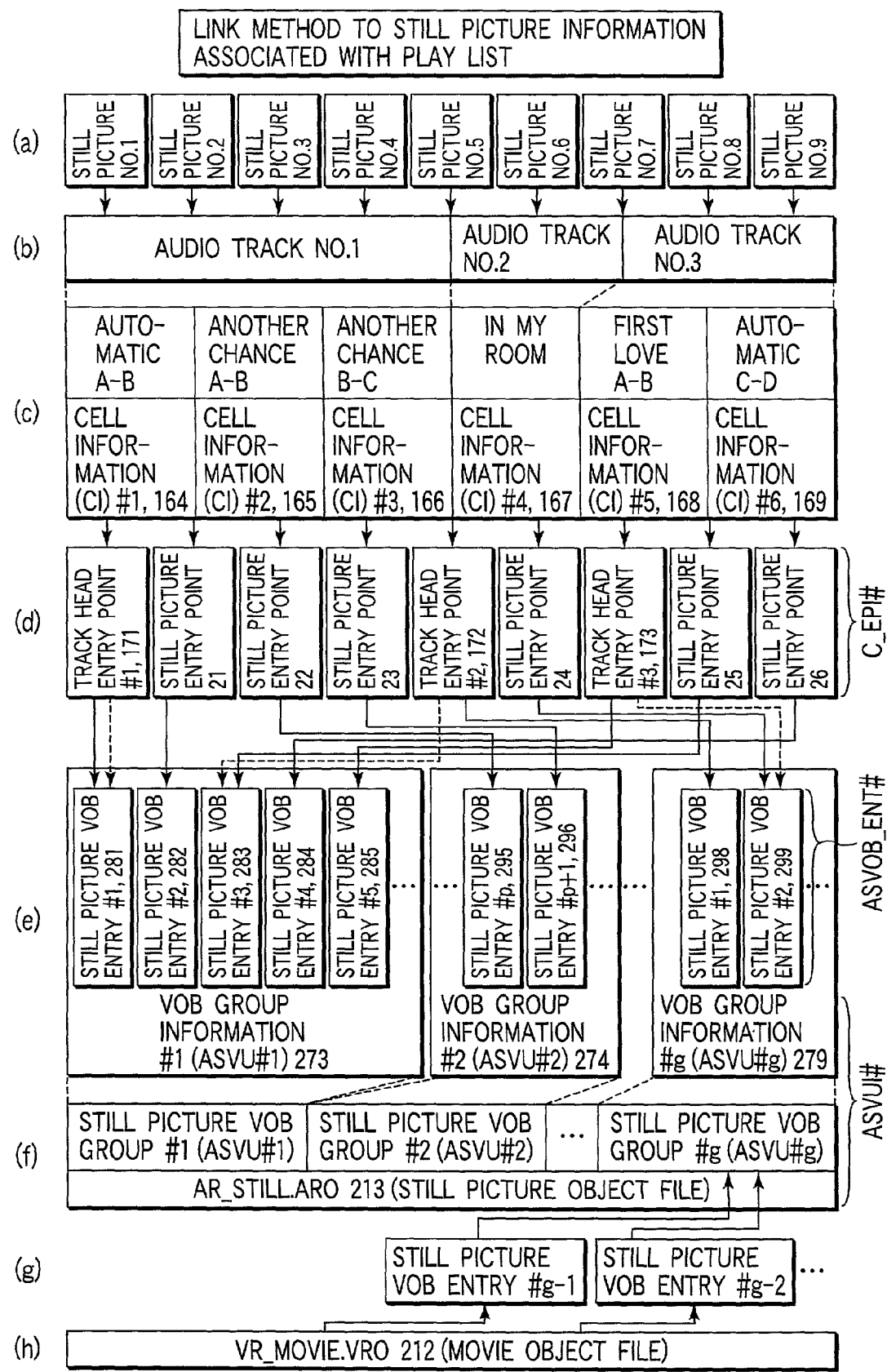
FIG. 10 is an explanatory view of a link method to still picture information which is associated with the play list according to the present invention.

FIG. 10 depicts the designation method of still picture information. The contents of (a) to (d) of FIG. 10 may be the same as those of FIG. 7.

In FIG. 10, all still pictures are recorded together in still picture object file AR_STILL.ARO 213 ((f) of FIG. 10) in units of still picture VOB groups (ASVU in (f) of FIG. 10 or in (e) of FIG. 10) #1 to #g, and management information of each still picture is recorded in a still picture VOB entry ((e) of FIG. 10) (ASVOB_ENT# 281 to 299) in still picture VOB group information (ASVUI #1/273 to ASVU #g/279 in (e) of FIG. 10). Cell information CI ((C) of FIG. 10) can refer to still picture VOB groups (ASVU in (e) and (f) of FIG. 10) via various entry points ((d) of FIG. 10).

Meanwhile, movie object file VR_MOVIE.VRO 212 ((h) of FIG. 10) can refer to a still picture VOB group (e.g., ASVU #g in (f) of FIG. 10) via given still picture VOB entries (e.g., #g-1, #g-2 in (g) of FIG. 10).

"Information for designating the saving location of a still picture to be displayed" in FIGS. 9A and 9B corresponds to each of "solid arrows" extending from track head entry points (C_EPI) #1/171 to #3/173 and still picture entry points 21 to 26 ((d) of FIG. 10) to still picture VOB entries 281 to 299 (ASVOB_ENT) in (e) of FIG. 10.

"Information for designating the display timing of a still picture" designated in FIGS. 9A and 9B is timing designation information which is enabled when "Sequential Mode" is designated as the display order mode, and "Slideshow" as the display timing mode, and means time information at which display is switched to a still picture designated by one of still picture entry points 21 to 26 corresponding to the already displayed still picture.

In the display mode, the designated still picture is kept displayed until the time designated by the next still picture entry point (21 to 26), or time at which the corresponding track comes to an end.

In the present invention, the display switching time information is expressed by presentation time information of audio information. However, the present invention is not limited to such specific information. For example, differential time information from the playback start time of the corresponding track to the display switching time of the designated still picture may be used. "Display time range information of the corresponding still picture" is enabled when "Browsable Mode" is designated as the display timing mode.

When the user has pressed a switch, a still picture displayed so far is switched to the one designated by the still picture entry point (21 to 26). After that, if the user does not press the switch, an identical still picture is kept displayed until the corresponding track comes to an end.

When a maximum display time is designated by the "display time range information of the corresponding still picture", if the user does not press the changeover switch of still pictures until that time, display of the corresponding still picture is automatically stopped, and the screen is automatically switched to a "blue back".

Conversely, when the user has inadvertently pressed the changeover switch continuously, still pictures are quickly switched in turn, and the user cannot watch still pictures at ease.

When a minimum display time is set by the "display time range information of the corresponding still picture", even when the user continuously presses the changeover switch, the still picture to be displayed is inhibited from being switched for the set minimum display time.

Since a still picture designated by the track head entry point (171 to 173) or program information (311 to 314) is displayed simultaneously with the beginning of playback of the corresponding track, the need for "information for designating the display timing of a still picture" can be obviated. In the present invention, a representative picture of each track can be independently set by "information for designating the saving location of a representative picture that represents the contents of the corresponding audio track" in addition to display simultaneously with the beginning of playback of the corresponding track.

Still pictures designated by the "information for designating the saving location of a representative picture that represents the contents of the corresponding audio track" shown in FIGS. 9A and 9B correspond to those shown in the columns of pictures 5 and 6 in FIGS. 6A and 6B. On the other hand, the "information for designating the saving location of a representative picture that represents the contents of the corresponding audio track" shown in FIGS. 9A and 9B corresponds to each of "broken arrows" extending from track head entry points #1/171 to #3/173 and still picture entry points 21 to 26 to still picture VOB entries 281 to 299 in FIG. 10.

As described above, since display mode 7 of still pictures is set in units of tracks, and never changes within a given track, it is recorded in the track head entry point (171 to 173) or program information (311 to 314) as information unique to that track. Display modes 7 and 8 in FIGS. 6A and 6B show the contents set by "display mode of still pictures in the corresponding audio track" in FIGS. 9A and 9B.

The contents of "text information (Primary Text information) unique to the corresponding audio track" in FIGS. 9A and 9B correspond to primary text information (51 to 53) in (e) of FIG. 11 mentioned above, and "tune name" information in that information is shown in the column of "track title 3" in FIG. 6A. "Additional comment text information" in FIGS. 9A and 9B corresponds to each "arrow" extending from the track head entry point (#1/171 to #3/173) to item text (#1/236 to #e/238) in (d) of FIG. 11, and has information contents indicating "item text number".

The information contents of the "relationship between the still picture contents to be displayed and original track" are shown in "still 10" in FIG. 6B. That is, identification information indicating whether still pictures displayed in new tracks No. 1 to No. 3 in FIG. 6B use those used in original track 1 ("original" in this case) or are uniquely set by the user independently of those used in original track 1 ("newly set" in this case) is given.

In the present invention, an erasable or non-erasable area is set in units of tracks. Therefore, an "erase inhibition flag" "1" is set for an audio track which is inhibited from being erased.

As shown in FIGS. 9A and 9B, information unique to each track such as "tune name", "singer name", "player name", or the like can be recorded in each of track head entry points (C_EPI) 171 to 173 shown in (h) of FIG. 1 or (d) of FIG. 11. As a location for recording text information with a relatively small data size such as "tune name", "singer name", "player name", or the like, recording areas named primary text information (51 to 53) are present in track head entry points (C_EPI) 171 to 173.

By contrast, information which is unique to each track but cannot be recorded in primary text information (51 to 53 in (e) of FIG. 11) due to its huge data size can be recorded in item text (IT_TXT specified by item text search pointer number IT_TXT_SRPN) 236 to 238 shown in (f) of FIG. 11. Track head entry points (C_EPI) 171 to 173 shown in (d) of FIG. 11 may record only pointer information having information (a table of IT_TXT_SRPN) indicating the order of item texts (IT_TXT).

Figure 12:
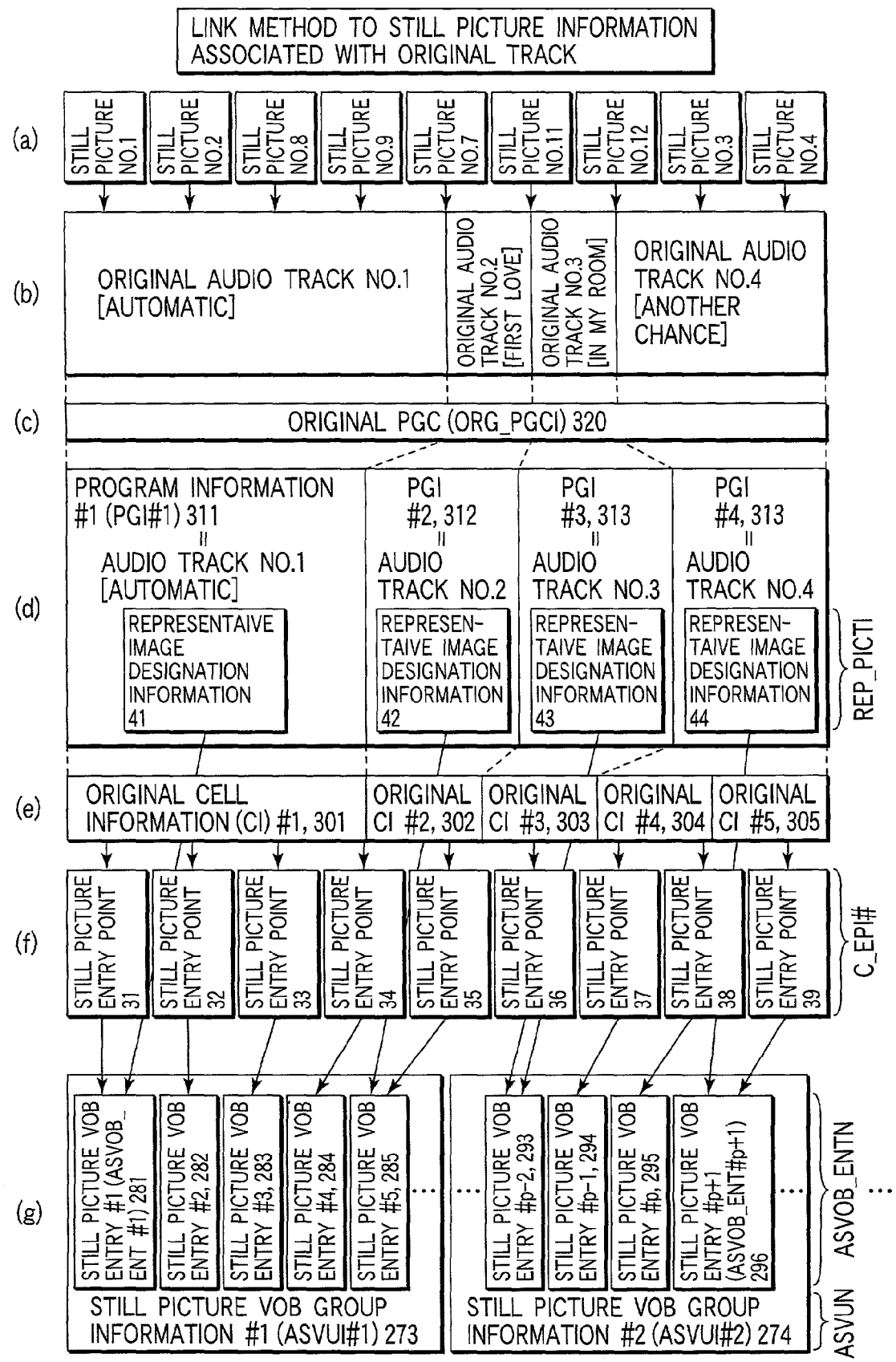
FIG. 12 is an explanatory view of a link method to still picture information which is associated with an original track according to the present invention.

FIG. 12 shows the setup state of still pictures in program information (#1/311 to #4/314).

The portion (a) of FIG. 12 shows still pictures corresponding to original audio tracks ((b) of FIG. 12), and (c) of FIG. 12 shows an original program chain. Each original audio track corresponds to program information.

The program information (#1/311 to #4/314 in (d) of FIG. 12) records information (REP_PICTI 41 to 44) that designates a representative picture indicating the corresponding audio track contents, and still picture VOB entries ASVOB_ENT #1/281 to ASVOB_ENT #p+1/296 (or ASVOB_ENTN) in (g) of FIG. 12 can be directly designated from that information. The portion (g) of FIG. 12 is an independent file, i.e., still picture VOB group information (ASVUI 273, 274; or ASVUN).

Original cell information (CI #1/301 to CI #5/305 in (d) of FIG. 12) does not have any track head entry point information (as well as still pictures to be displayed at the beginning of playback of an audio track) and consists of only a still picture entry point (C_EPI 31 to 39 in (f) of FIG. 12).

Management information includes representative image designation information (REP_PICTI 41 to 44 in (d) of FIG. 12), which designates a representative picture in units of tracks, and serves as designation information of a representative picture indicating the track contents.

The designation information of a representative picture is recorded independently of designation information of still pictures to be displayed upon playing back an audio track. For this reason, an arbitrary still picture in a VOB group at a location other than a video object (VOB) group that records still pictures to be displayed upon playing back an audio track can be set as a representative picture, thus improving the degree of freedom.

Figure 13:
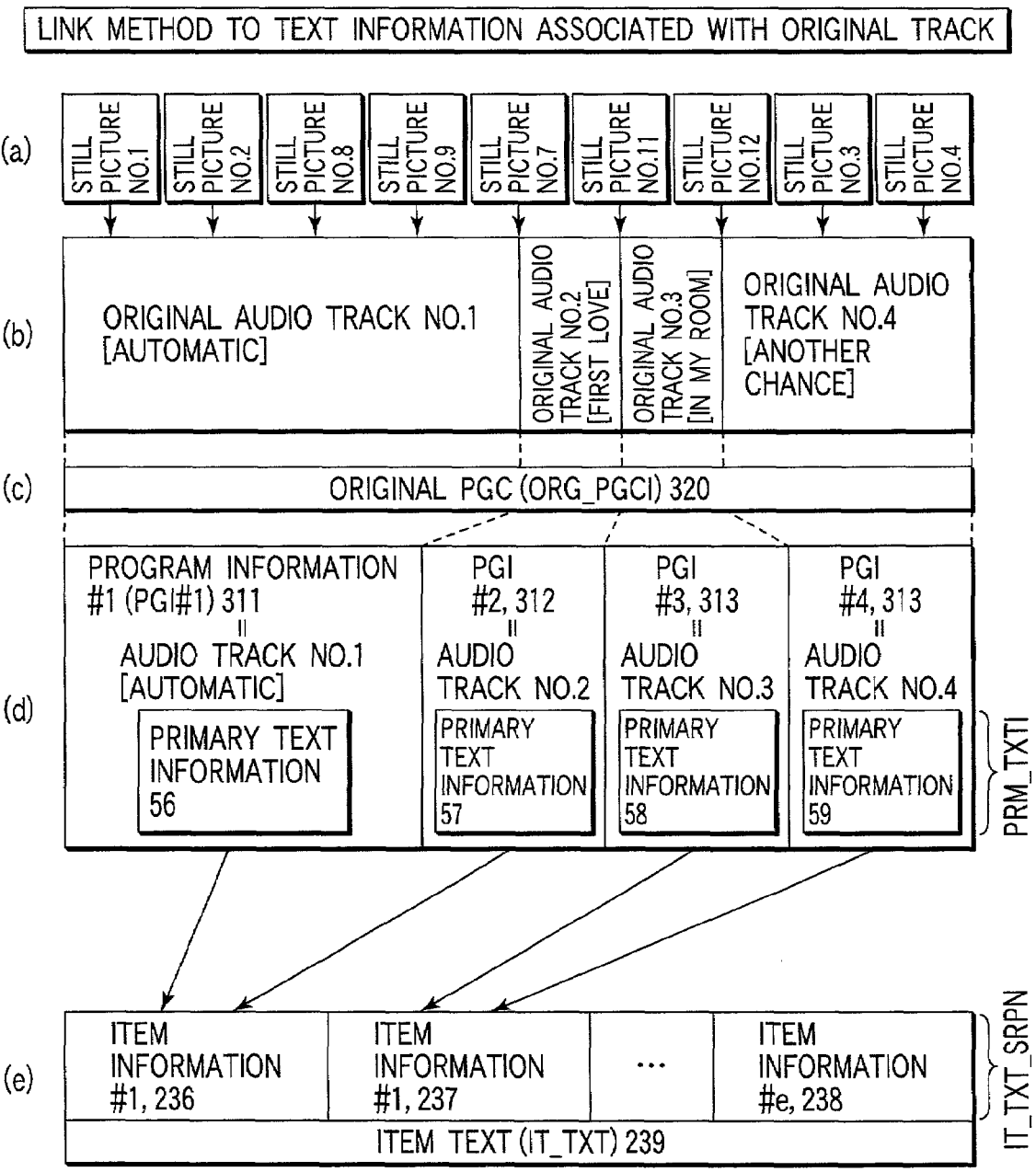
FIG. 13 is an explanatory view of a link method to text information which is associated with an original track according to the present invention.

FIG. 13 shows still another embodiment or an embodiment that is compossible with the above embodiment. The portion (d) of FIG. 13 shows the setup state of text information in program information (PGI #1/311 to PGI #4/314). "Text information unique to the corresponding audio track" in FIGS. 9A and 9B is recorded in primary text information (56 to 59; or PRM_TXTI) in program information (PGI #1/311 to PGI #4/214), as shown in (d) of FIG. 13.

Also, "additional comment text information" in FIGS. 9A and 9B corresponds to each "arrow" extending toward item text (#1/236 to #e/238; or IT_TXT 239) in (e) of FIG. 13, and records information (IT_TXT_SRPN) indicating "item text to be designated".

In the above description, information unique to an audio track shown in FIGS. 9A and 9B is recorded and managed in:

program information in case of an original track; or a track head entry point in case of a play list.

However, the present invention is not limited to such specific method, and the scope of the present invention includes a case wherein the locations of recording/managing unique information that pertains to an audio track may be reversed, or two different kinds of information may be recorded and managed in an identical location.

That is, the scope of the present invention includes a case wherein program information is present in a user-defined PGC even for a play list, and the program information in the user-defined PGC records information unique to an audio track shown in FIGS. 9A and 9B.

Figure 14:
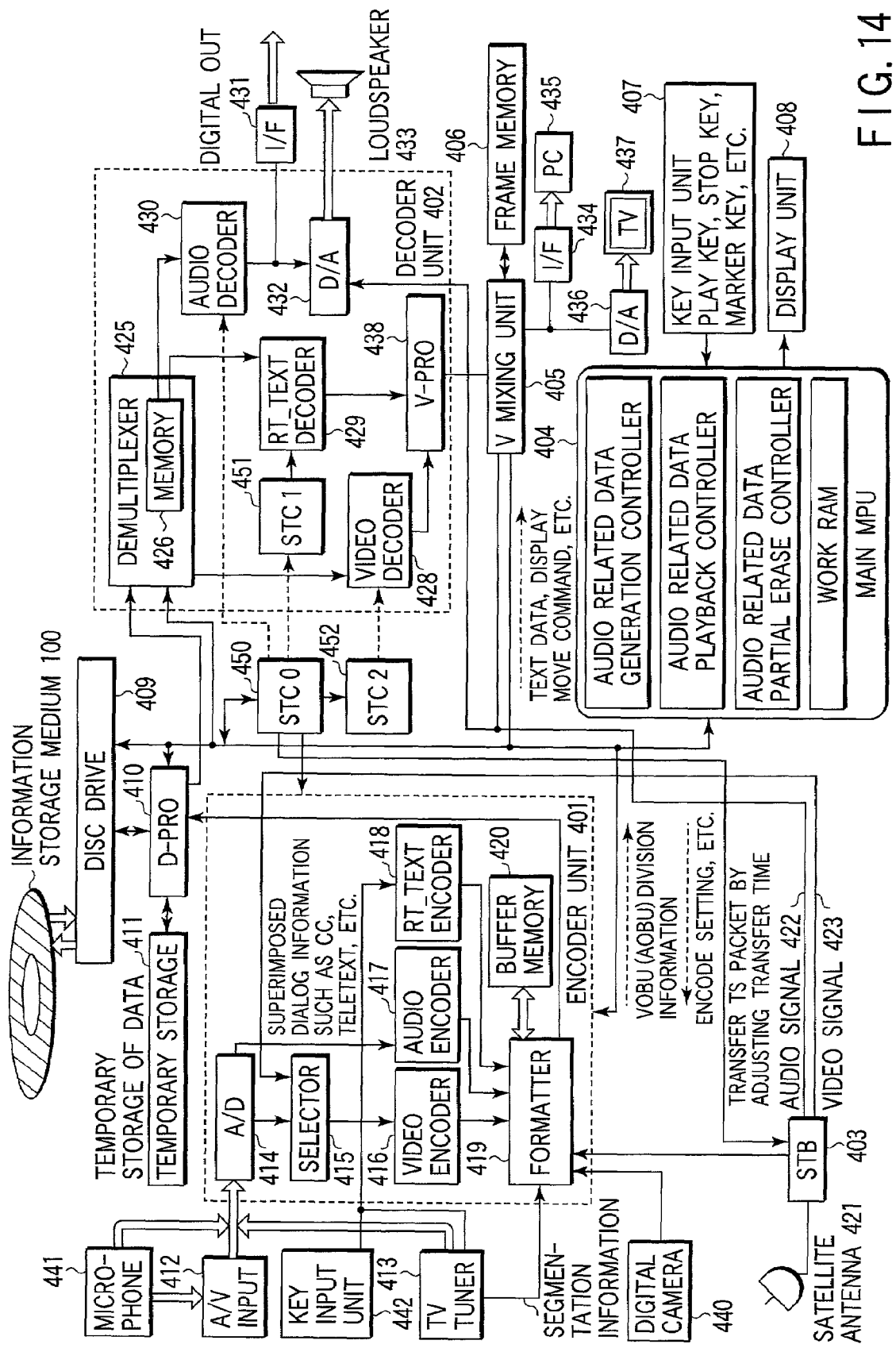
FIG. 14 is a block diagram showing an example of the block arrangement of a recording/playback apparatus (e.g., a DVD-AUDIO recorder/player) according to the present invention.

FIG. 14 shows the structure in the information recording/playback apparatus in the present invention.

Disc drive 409 records/plays back information with respect to information storage medium 100. Various kinds of object information input from various input means 440 to 442, 412, and 413 are encoded by encoder unit 401, and are then recorded on information storage medium 100 via disc drive 409. At the same time, main MPU 404 generates management information that pertains to each object information, and records the generated information on information storage medium 100 via disc drive 409.

The input means include microphone 441, A/V input unit 412, key input unit 442, TV tuner 413, and digital camera 440. Also, the input means includes set top box (STB) 403 that receives a broadcast signal. Encoder unit 401 has analog-to-digital (A/D) converter 414 that receives an A/V input, and selector 415 for arbitrarily selecting one of the output signal (video signal) from A/D converter 414 and output video signal 423 from STB 403.

Video encoder 416 encodes a video signal output from selector 415 by, e.g., MPEG to achieve compression coding, and supplies the encoded signal to formatter 419. Audio encoder 417 executes a processes such as MPEG, PCM, or the like of an audio signal from A/D converter 414, and supplies the processed signal to formatter 419. Information from key input unit 442 is input to real-time text (RT-_TEXT) encoder 418 and is then input to formatter 419 as text data. Buffer memory 420 is connected to formatter 419 and is used for time adjustment upon converting input data into a predetermined format.

The output (information converted into a predetermined format) from formatter 419 is input to digital processor (D-PRO) 410, and is then recorded on information storage medium 100 via disc drive 409 in correspondence with management information. Temporary storage 411 is connected to D-PRO 410 and serves as a buffer for data processes. D-PRO 410 appends error correction codes, modulates data, and so forth.

Management information is generated by main MPU 404. Also, management information read from information storage medium 100 is also interpreted by main MPU 404. Main MPU 404 includes an audio related data generation controller, audio related data playback controller, audio related data partial erase controller, and work RAM. Display 408 is connected to main MPU 404, and key input unit 407 is also connected to control this apparatus.

Upon playing back information on information storage medium 100, a signal obtained by reading and photoelectrically converting recorded information by, e.g., optical information reading means of disc drive 409 is input to D-PRO 410. Playback information is input to demultiplexer 425 of decoder unit 402 and is demultiplexed into video information, audio information, and text information.

The video information is input to and decoded by video decoder 428. The audio information is input to and decoded by audio decoder 430. Furthermore, the text information is input to and decoded by text decoder 429.

The output video signal from video decoder 428 and output text from text decoder 429 are input to video processor (V-PRO) 438. The video signal output from video processor 438 is converted into an analog signal by digital-to-analog (D/A) converter 436 via video (V) mixing unit 405, and the analog signal is supplied to television display 437.

Video mixing unit 405 can also composite a video signal from STB 403 with text. Frame memory 406 is connected to video mixing unit 405. The output from video mixing unit 405 can be supplied to personal computer 435 via interface 434.

Audio decoder 430 mentioned above decodes an audio signal, and the decoded output can be derived as a digital output via interface 431. The decoded output is supplied to loudspeaker 433 via D/A converter 432. D/A converter 432 can receive an audio signal from STB 403.

System clock 450 generates clocks to synchronize all units such as STB 421, decoder unit 402, encoder unit 401, main MPU 404, and the like. System clock 451 generates reference clocks used to synchronize playback information and decoder unit 402 upon playing back a disc.

Upon playback, management information recorded in information storage medium 100 is temporarily recorded in the work RAM in main MPU 404 via disc drive 409. Using the management information temporarily recorded in the work RAM, object information to be played back, which is recorded on information storage medium 100 is read, and is then decoded by decoder unit 402. After that, the decoded output is output to loudspeaker 433, television display 437, or display 408.

A method of creating a play list that pertains to audio related information as well as a user interface and the detailed structure of management data generated consequently will be explained below.

As a characteristic feature of the embodiment of the present invention, when the user creates a play list, both a list of original track #1, and play lists #1 and #2 to be created by the user (FIGS. 6A and 6B) are displayed on display 408 shown in FIG. 14 to improve user's convenience.

The method of recording audio related information on information storage medium 100 will be explained below using FIGS. 15 and 16.

Figure 15:
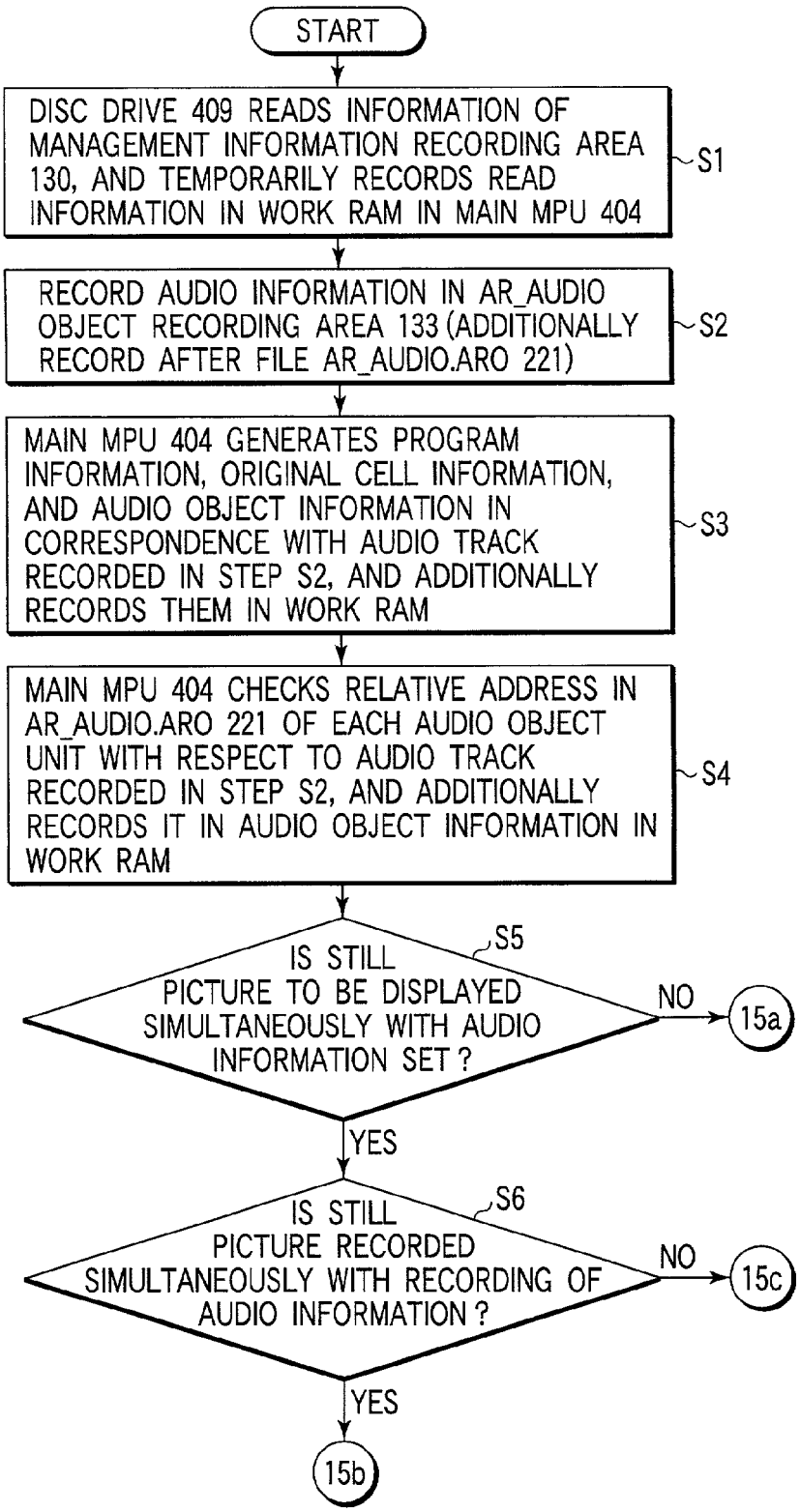
FIG. 15 is a flow chart showing an example of a recording method of audio related information on an information storage medium according to the present invention.

Most of processes in the present invention read information in management information recording area 130 recorded on information storage medium 100, and temporarily record the read information in the work RAM in main MPU 404 (step S1 in FIG. 15). After a series of processes, a process for recording management information, which is recorded in the work RAM and the contents of which have been partially changed on information storage medium 100 is executed (step S12).

Figure 16:
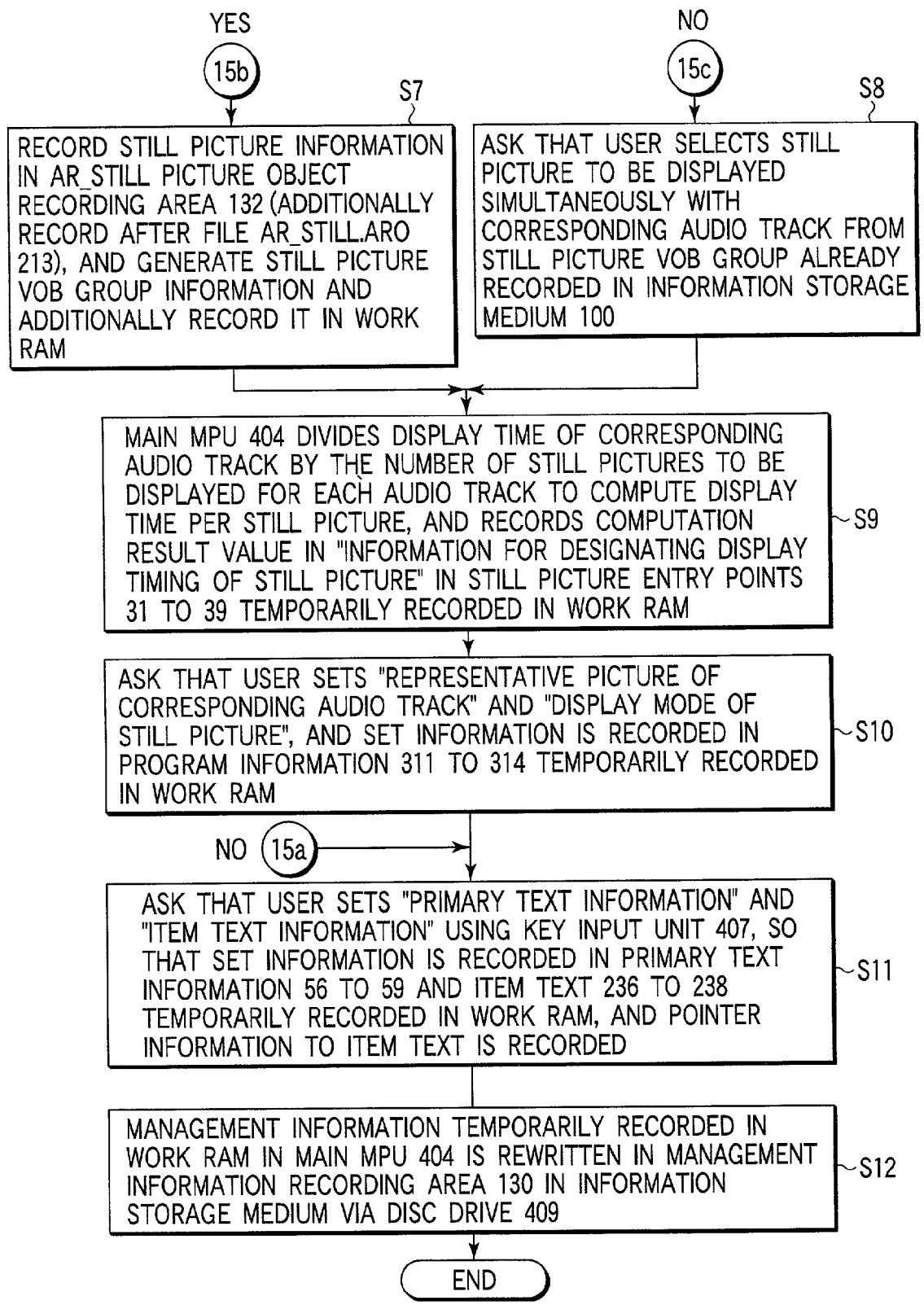
FIG. 16 is a flow chart, continued from the flow chart of FIG. 15, showing the remaining steps of FIG. 15.

In the embodiment of the present invention shown in FIGS. 15 and 16, audio information is additionally recorded after file AR_AUDIO.ARO 221 initially (step S2), and after that, a process for rewriting management information in the work RAM is done. Upon changing the management information contents, management information that pertains to audio information is added/changed in audio object information.

That is, in step S3 main MPU 404 generates program information, original cell information, and audio object information in correspondence with the audio track recorded in step S2, and additionally records them in the work RAM.

Furthermore, in step S4 the relative address of each audio object unit of the recorded audio track in AR_AUDIO.ARO 221 is checked, and is additionally recorded in audio object information in the work RAM.

The control asks the user if still pictures to be displayed simultaneously with audio information are set (step S5). If still pictures are not to be displayed simultaneously with audio (NO in step S5), the process jumps to step S11 in FIG. 16. When still pictures to be displayed simultaneously with audio are set (YES in step S5), one of the following methods is selected.

(1) If new still pictures are to be recorded simultaneously with recording of audio information (YES in step S6), new still pictures to be recorded are recorded in file AR_STILL.ARO 213. Management information of still pictures, i.e., still picture VOB group information, is generated in correspondence with the recorded pictures. That is, still picture information is recorded in AR_still picture object recording area 132 (additionally recorded after the end of file AR_STILL.ARO 213), and still picture VOB group information is generated in correspondence with that picture information and is additionally recorded in the work RAM (step S7 in FIG. 16).

(2) If still pictures already recorded on information recording medium 100 are used (NO in step S6), the user is asked or promoted to select still pictures to be displayed simultaneously with audio information (step S8 in FIG. 16). That is, the user selects still pictures to be displayed simultaneously with the corresponding audio track from still picture VOB groups already recorded in information storage medium 100.

The information contents of "information for designating the display timing of a still picture" to be set in a still picture entry point are automatically set in main MPU 404 of the information recording/playback apparatus shown in FIG. 14 by computing:

[display time per still picture]=[playback time of corresponding audio track]÷[the number of still pictures to be displayed in corresponding audio track] (the computation result value is recorded in "information for designating the display timing of a still picture" in the still picture entry point (31 to 39) temporarily recorded in the work RAM) (step S9).

The user is asked or promoted to input "information for designating the saving location of a representative picture that represents the contents of the corresponding audio track", "text information unique to the corresponding audio track", "display mode of still pictures in the corresponding audio track", and "erase inhibition flag", which are recorded in program information (311 to 314) and are set in units of audio tracks (steps S10 and S11).

More specifically, in step S10, the user sets a "representative image for the corresponding audio track" as a "display mode of still pictures", and that information is recorded in program information (311 to 314) temporarily stored in the work RAM.

In step S11, the user sets "primary text information" and "item text information" using key input unit 407, and that information is recorded in primary text information (56 to 59) and item text (236 to 238) temporarily recorded in the work RAM. Also, pointer information to item text is recorded.

When information unique to each audio track is recorded in program information (311 to 314) (step S10), a specific time range (e.g., 5 sec) after the playback start time of the corresponding audio track (not shown) is automatically recorded in "information for designating the display range of representative audio indicating the contents of the corresponding audio track" shown in FIGS. 9A and 9B. If this time range is to be changed, the user can re-set the display range of representative audio in an edit process.

With a series of processes mentioned above, management information that pertains to audio related information is completed, and is recorded on information storage medium 100 via disc drive 409 (step S12).

A method of partially erasing the contents of an original track in the present invention will be explained below. As shown by (e) and (f) of FIG. 7, when a central portion of an original track with a track name (tune name) "Another Chance" is partially erased, an audio object is broken up (or divided) into two objects like AOB #4 and AOB #5. Audio object information, original cell information #4/304, and original cell information #5/305 are broken up (or divided) into two pieces of information each accordingly. A processing method in the information recording/playback apparatus at that time will be described below using FIGS. 17 and 18.

Figure 17:
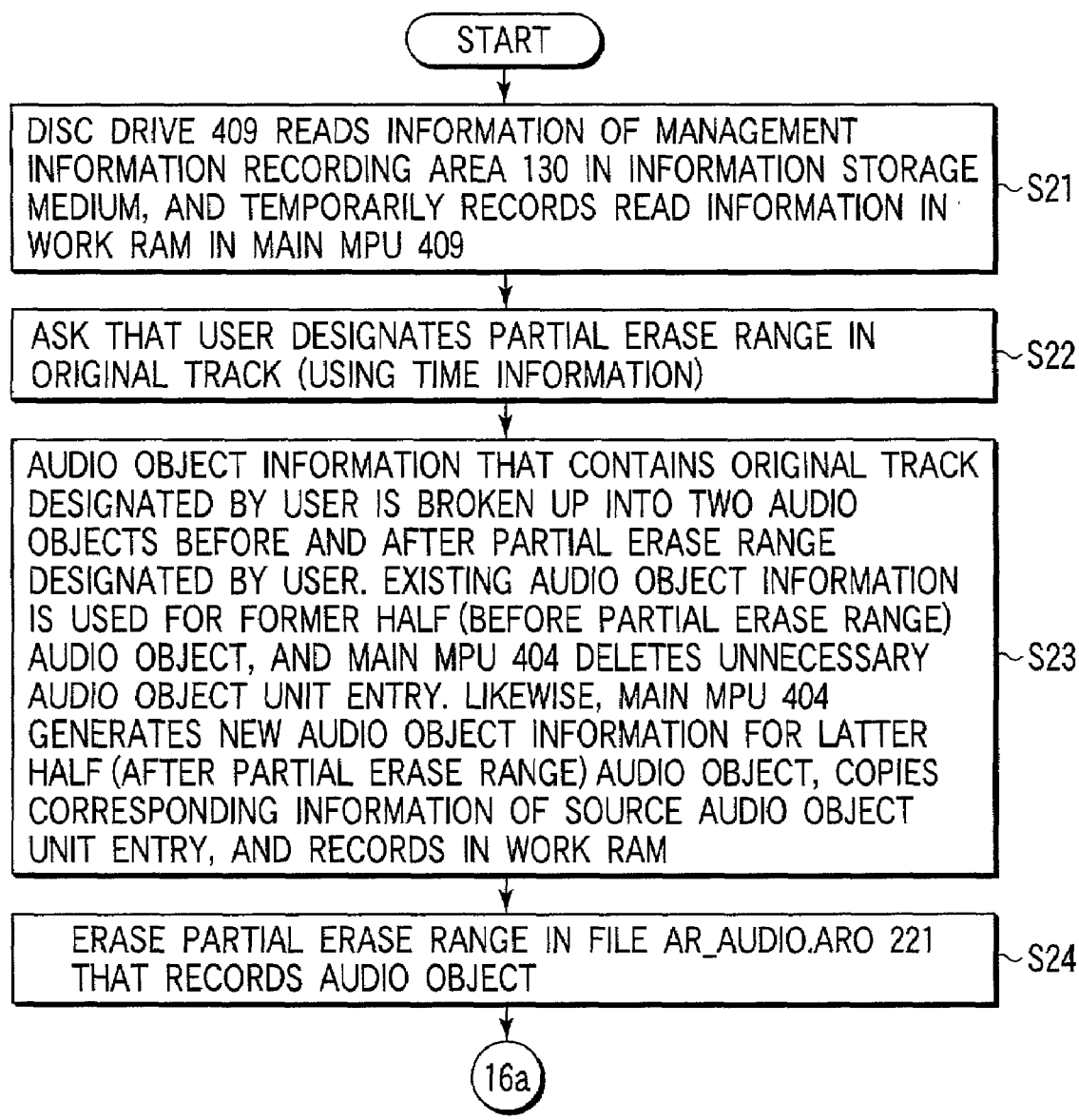
FIG. 17 is a flow chart for explaining an example of a partial erase method of an original track according to the present invention.

In step S21 of FIG. 17, disc drive 409 (FIG. 14) reads information (RTR_AMG) of management information recording area 130 in disc 100, and temporarily records the read information in the work RAM of main MPU 404.

In step S22, the user designates a partial erase range in an original track (using time information).

In step S23, audio object information that includes the original track designated by the user is broken up into two audio objects before and after the partial erase range. As the former half (before the partial erase range) audio object, existing audio object information is used, and an unnecessary audio object unit entry is deleted (by main MPU 404). Likewise, as the latter half (after the partial erase range) audio object, new audio object information is generated, corresponding information is copied from the source audio object entry, and is recorded in the work RAM.

In step S24, the partial erase range in file AR_AUDIO.ARO 221 that records audio objects is erased.

In short, when a user designates a partial erase range using time information (step S22), contents of the management information are changed accordingly (step S23), and a corresponding portion in AR_AUDIO.ARO 221 is erased (step S24).

In step S25 of FIG. 18, main MPU 404 checks, based on display mode information that pertains to still picture information recorded in program information associated with the original track, if still pictures displayed within the partial erase range designated by the user are to be displayed after partial erase.

If the corresponding still pictures are to be displayed after partial erase (YES in step S26), the display time of the audio track after partial erase is divided by the number of still pictures to compute the display time per still picture, thus updating the contents of "information for designating the display timing of a still picture" in still picture entry points 31 to 39 temporarily recorded in the work RAM (step S27).

Conversely, if the corresponding still pictures are not displayed after partial erase (NO in step S26), information of each still picture entry point included in the partial erase range designated by the user is detected from still picture entry points 31 to 39 before partial erase, which are recorded in original cell information (301 to 305) (step S28).

In step S29, the management information temporarily recorded in the work RAM is written back on management information recording area 130 in the information storage medium via disc drive 409.

How to handle still pictures displayed within the partial erase range is important. As a method of handling still pictures after partial erase, the present invention selects one of the following two methods:

(A) all still pictures before partial erase are displayed upon playing back audio information after partial erase irrespective of the partial erase range (step S27); and In this case, "information for designating the display timing of a still picture" in FIGS. 9A and 9B is re-computed and automatically rewritten.

(B) still pictures displayed within only the partial erase range are not displayed upon playback after partial erase (step S28).

At this time, a first characteristic feature in the edit method of the present invention lies in that discrimination information indicating if still pictures displayed within only the partial erase range are allowed to be displayed is recorded in advance in management information, and one of (A) and (B) is selected based on that information (step S26).

A second characteristic feature of the present invention lies in that the user can recognize the discrimination information. If the user can recognize that information, he or she can understand the selected one of (A) and (B), thus avoiding user's confusion. As the discrimination information that the user can recognize, the present invention uses display mode 7 shown in FIG. 6A.

That is, only when display mode 7 of original track 1 indicates "Slideshow+Sequential" ("display mode of still pictures in the corresponding audio track" in the program information at that time also records the same information), (B) is selected; when information other than the above information is recorded, (A) is selected.

Prior to the description of the creation method of play list contents, a preparation method of display windows shown in FIGS. 6A and 6B as a characteristic feature of the present invention will be explained below using FIG. 19.

Initially, information in management information recording area 130 recorded on information storage medium 100 is read, and is temporarily recorded in the work RAM in main MPU 404 (step S31).

The management contents which pertain to original track 1 which indicates the playback sequence in the order data were initially recorded on information storage medium 100 is recorded in original program chain information 144 or 320, and information that pertains to the original track is described in program information #1/311 to #4/314 ((g) and (h) of FIG. 7), as will be described later.

As described above, information that pertains to a track of a play list is recorded in track head entry points 171 to 173 in user-defined PGC information table 145. Using such information, main MPU 404 generates a list window that pertains to original track 1 (step S32), individually generates list windows of tracks that pertain to play lists #1 and #2 (step S33), composites these windows (step S34), and displays the composited window (step S35).

A creation processing method of the play list creation display window shown in FIGS. 6A and 6B will be explained below with reference to FIG. 19.

Disc drive 409 reads information of management information recording area 130 in the disc, and temporarily stores the read information in the work RAM in main MPU 404 (step S31). Main MPU 404 interprets information that pertains to an original track recorded on disc 100 on the basis of the information contents of the temporarily stored program information (311 to 314) to generate display window contents that pertain to original track 1 (step S32). Main MPU 404 then extracts information associated with tracks in units of play lists using information of track head entry points 171 to 173 in cell information 164 to cell information 169 that form temporarily stored user-defined PGC information table 145, thus generating display window contents which pertain to play list 2 (step S33).

The display windows generated in steps S32 and S33 are composited, and the composite window is transferred to the V mixing unit (step S34). The display window generated in main MPU 404 is displayed on display 408 via D/A converter 436.

A method of creating a play list in the present invention will be described in more detail below with reference to FIGS. 20 and 21.

Figure 20:
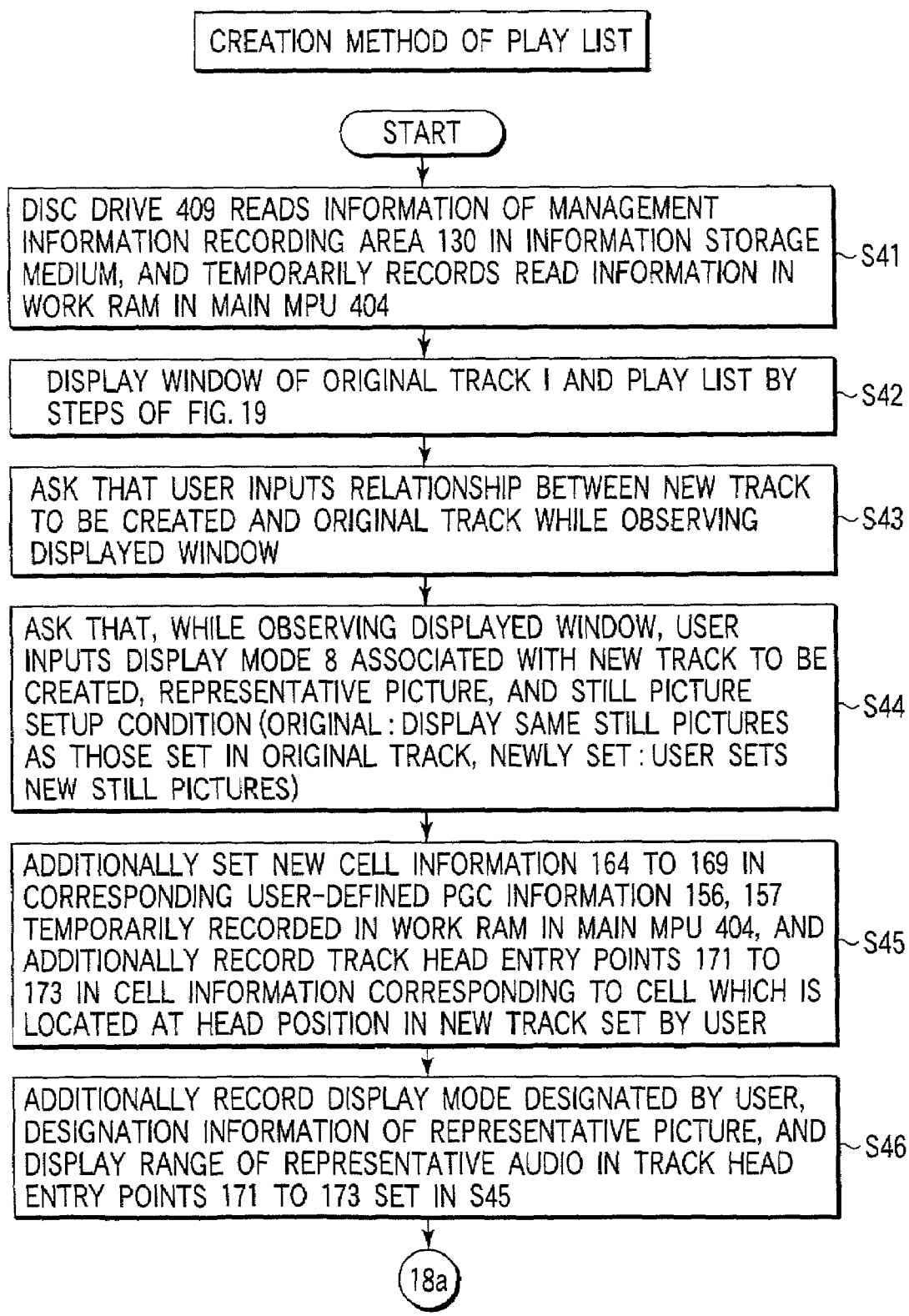
FIG. 20 is a flow chart showing an example of a play list creation method according to the present invention.

Information of management information recording area 130 is read, and is temporarily recorded in the work RAM in main MPU 404 (step S41 in FIG. 20).

Figure 19:
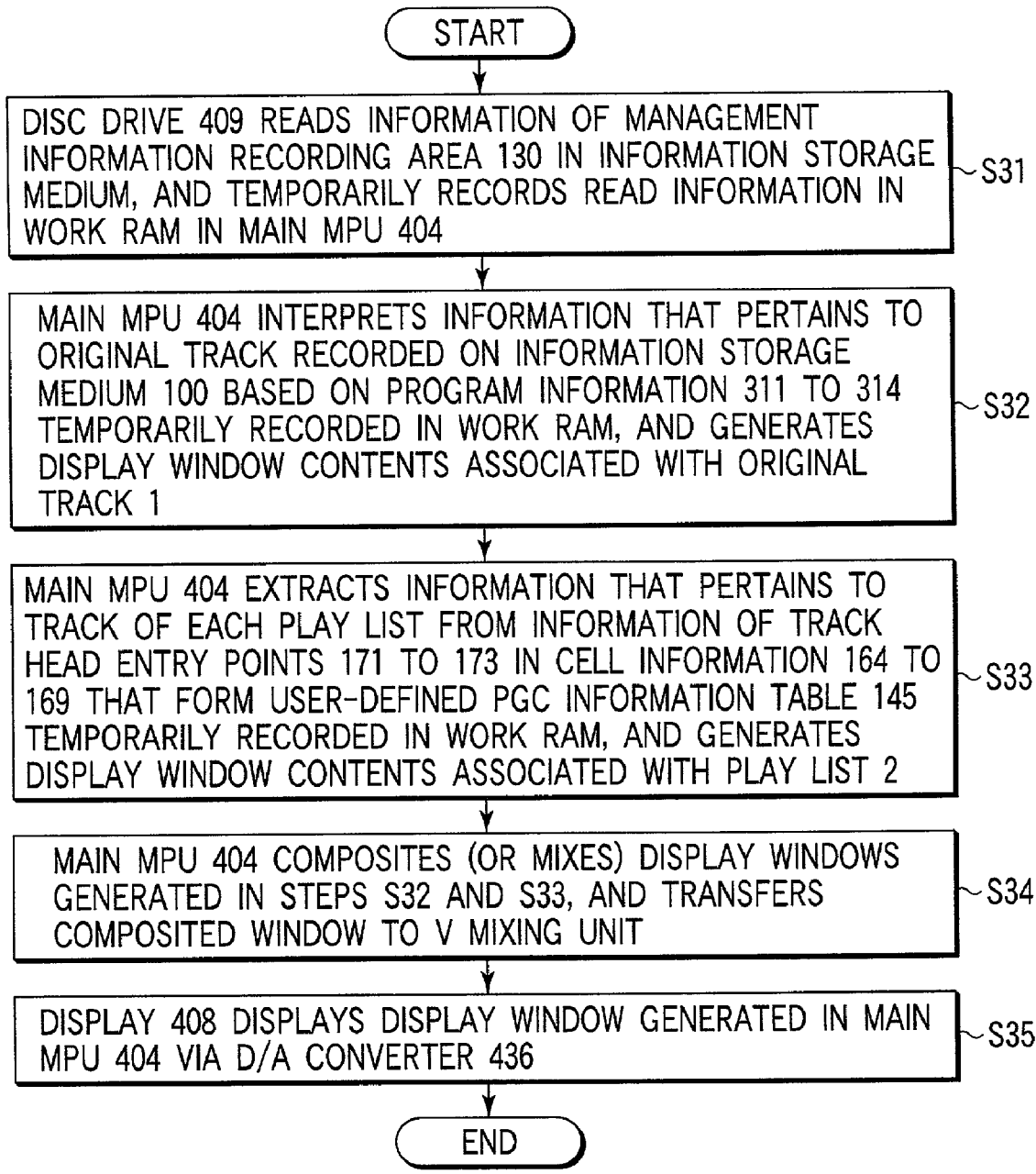
FIG. 19 is a flow chart for explaining a display process of a play list creation window according to the present invention.

The edit window (windows of original track 1 and play lists) is presented to the user by the method shown in FIG. 19 (step S42), and the user creates a play list (step S43). In this case, the user inputs the relationship between a new track to be created and the original track while observing the window.

A display mode is automatically set to match that designated by the source original track to be played back first, but the user can change it later while observing the window. At the same time, the user inputs unique information that pertains to the new track created on the play list (step S44).

That is, in this step, the user inputs display mode 8 (FIG. 6B) that pertains to the new track to be created, a representative picture, and a still picture setup condition (in case of "original", the same still pictures as those set in the original track are displayed; in case of "newly set", the user designates new still pictures), while observing the display window.

Main MPU 404 in the information recording/playback apparatus shown in FIG. 14 generates new cell information and records information in track head entry points in the cell information on the basis of the input information (step S45).

That is, in this step, new cell information 164 to cell information 169 are additionally set in corresponding user-defined PGC information 156 and user-defined PGC information 157, and track head entry points 171 to 173 are additionally recorded in cell information corresponding to a cell which is located at the head position in the new track set by the user in the work RAM.

The display mode designated by the user, designation information of a representative picture, and the display range of representative audio are additionally recorded in track head entry points 171 to 173 (step S46).

As the display range of representative audio in step S46, a specific time range (e.g., 5 sec) after the playback start time of the newly created track is automatically recorded. When the user wants to change this time range, he or she can re-set the display range of representative audio in an edit process.

If the user re-sets still pictures to be displayed simultaneously with playback with respect to the newly created track (YES in step S47 of FIG. 21), the contents of still 10 in FIG. 6B are changed from "Original" to "Newly Set" in correspondence with the user's key-in result, and the user selects still pictures (step S48). That is, the user selects still pictures to be displayed simultaneously with display of the newly created track from the existing still picture VOB group information (273 to 279).

If the user does not newly designate still pictures to be displayed (NO in step S47), it is determined whether all still pictures in the original track are to be displayed (step S49). When all still pictures of the original track are to be displayed (YES in step S49), the process goes to following (A). If all still pictures of the original track are not to be displayed (NO in step S49), the process goes to following (B).

As the method of setting still pictures upon creating a play list, the embodiment of the present invention selects one of the following two methods.

(A) All still pictures of the original track of interest are displayed upon playing back a new track in the play list irrespective of the designated ranges in original tracks by the user (step S51).

For example, when a new track is created from three original tracks, all still pictures displayed upon playing back the three original tracks are displayed upon playing back the new track.

(B) Only still pictures displayed upon playing back the designated ranges in original tracks quoted to create a new play list are displayed upon playing back a new track (step S50).

At this time, a first characteristic feature in an edit method of the present invention lies in that discrimination information indicating the method to be selected is recorded in advance in management information, and one of (A) and (B) is selected based on that information (step S49).

A second characteristic feature of the present invention lies in that the user can recognize the discrimination information. If the user can recognize that information, he or she can understand the selected one of (A) and (B), thus avoiding user's confusion.

As the discrimination information that the user can recognize, the present invention uses display mode 7 shown in FIG. 6A. More specifically, only when display mode 7 of original track 1 (corresponding to "Automatic" of the original track in new track No. 1, "First Love" of the original track in new track No. 3 in the example in FIGS. 6A and 6B) indicates "Slideshow+Sequential" ("display mode of still pictures in the corresponding audio track" in the program information at that time also records the same information), (B) is selected; when information other than the above information is recorded, (A) is selected.

After step S50 or S51, main MPU 404 divides the display time of the corresponding new track by the number of still pictures to be displayed in the new track in order to compute the display time per still picture (step S52). The computed value is recorded in "information for designating the display timing of still picture" in still picture entry points 21 to 26 and track head entry points 171 to 173. These entry points are temporarily recorded in the work RAM of MPU 404.

Then, the management information temporarily recorded in the work RAM is rewritten in management information recording area 130 of disc 100 via drive 409 (step S53).

Figure 21:
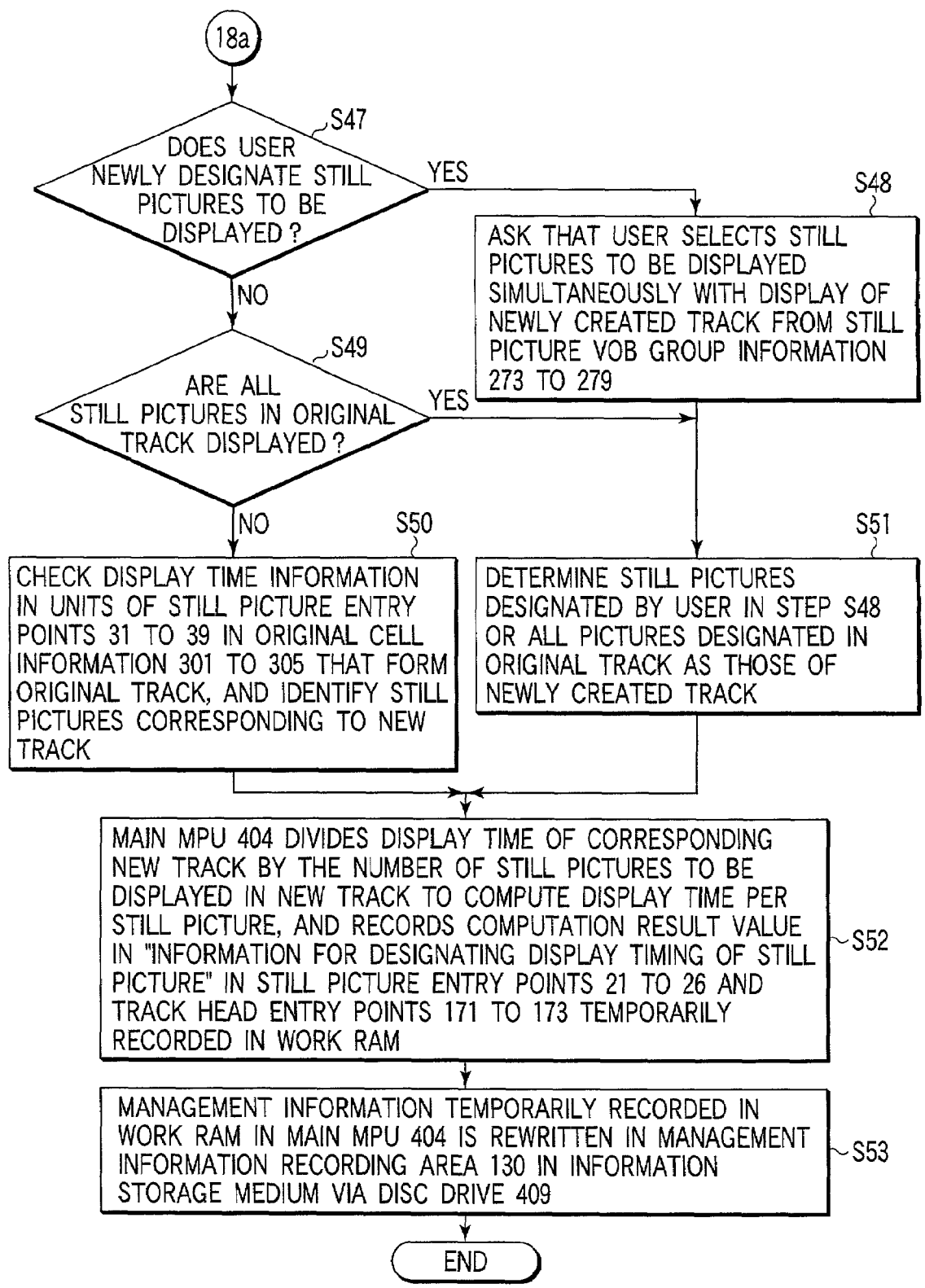
FIG. 21 is a flow chart, continued from the flow chart of FIG. 20, showing the remaining steps of FIG. 20.

Although not shown in FIGS. 20 and 21, immediately after "information for designating the display timing of a still picture" is set (step S52), "text information unique to the corresponding audio track" and "additional comment text information" in original track 1 from which audio information to be played back first upon playing back the new track is quoted are automatically transferred as those to be recorded in track head entry points corresponding to the newly created track, and text information is rewritten as needed by user's key-in operation (step S53).

Figure 22:
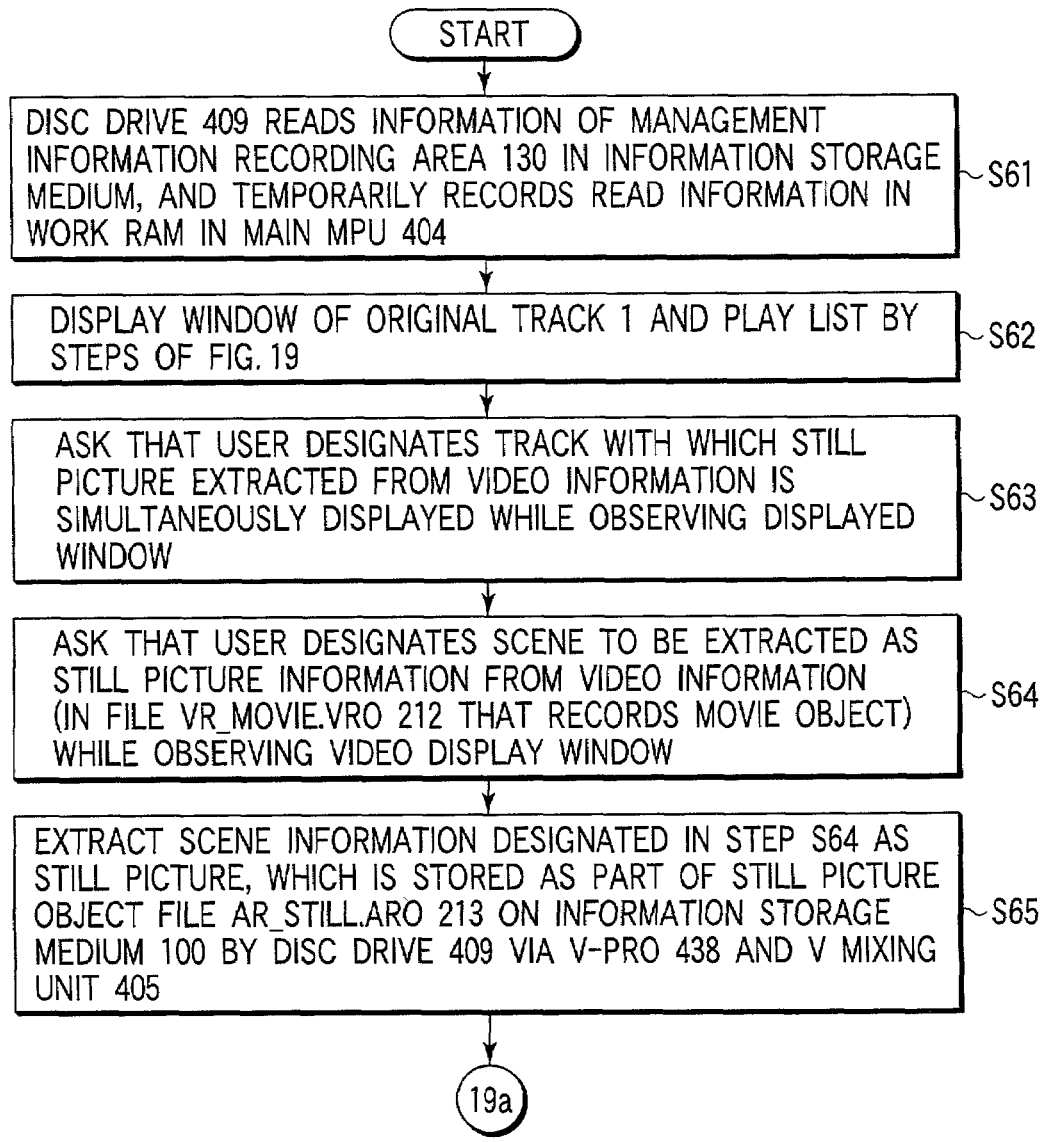
FIG. 22 is a flow chart for explaining a method of using video information as still picture information to be displayed simultaneously with audio information.
Figure 23:
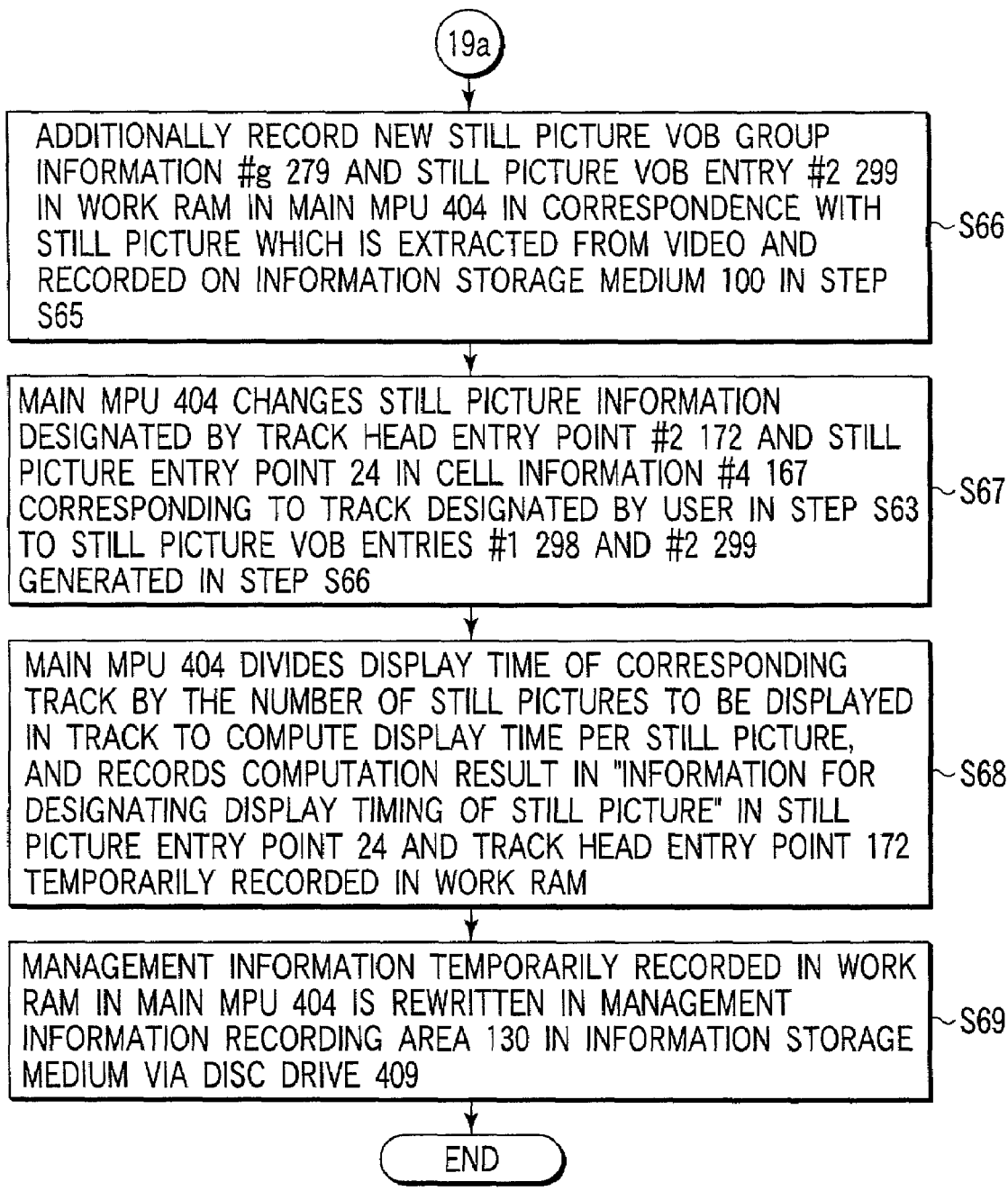
FIG. 23 is a flow chart, continued from the flow chart of FIG. 22, showing the remaining steps of FIG. 22.

FIGS. 22 and 23 show the processing sequence when video information is used as still picture information to be displayed simultaneously with audio information.

Information in management information recording area 130 is read, and is temporarily recorded in the work RAM in main MPU 404 (step S61 in FIG. 22). The windows of original track 1 and play lists are displayed by the method shown in FIG. 19 (step S62). The user designates a track for which still picture information extracted from video information is to be simultaneously displayed while observing the displayed window (step S63).

The user then designates a scene to be extracted as still picture information from video information (that in file VR_MOVIE.VRO 212 that records movie object information) while observing the displayed window (step S64).

Scene information designated in this step is extracted as a still picture, which is recorded as a part of still picture object file AR_STILL.ARO 213 on information storage medium 100 from disc drive 409 via V-PRO 438 and video mixing unit 405 (step S65).

In correspondence with the still picture extracted and recorded on the disc in this step, new still picture VOB group information #g/279 and still picture VOB entries #1/298 and #2/299 are recorded in the work RAM in main MPU 404 (step S66 in FIG. 23).

Still picture information designated by track head entry point #2/172 and still picture entry point 24 in cell information #4/167 corresponding to the track designated by the user in step S63 is changed to still picture VOB entries #1/298 and #2/299 generated in step S66 (step S67).

The display time of the corresponding track is divided by the number of still pictures to be displayed within that track to compute a display time per still picture, and the computation result is recorded in "information for designating the display timing of a still picture" in still picture entry point 24 and track head entry point 172, which are temporarily stored in the work RAM (step S68).

The management information temporarily recorded in the work RAM in main MPU 404 is rewritten in management information recording area 130 via disc drive 409 (step S69).

A characteristic feature of the present invention lies in that an arbitrary video screen image in file VR_MOVIE.VRO 212 that records video information (movie object), as shown in (h) of FIG. 10, can be used as a still picture to be displayed simultaneously with playback of audio information. An example of the method will be described below using FIGS. 10, 22, and 23.

A list of audio tracks recorded on information storage medium 100 is presented to the user, as shown in FIGS. 6A and 6B, and the user designates a track for which still pictures are to be set (step S63). The user then designates a desired screen image (scene) while displaying video information recorded in file VR_MOVIE.VRO 212 (step S64). Since the screen image (scene) designated by the user has already been decoded by decoder unit 402 in FIG. 14, that picture information is directly recorded as a still picture (I-picture) in file AR_STILL.ARO 213 (step S65), and management information that pertains to the still picture is generated (step S66). Display related information between the generated still picture and audio information is recorded in track head entry pointer #2/172 or still picture entry point 24.

A normal user sets a desired screen image (scene) but does not often set the display timing. Therefore, a characteristic feature of the information recording/playback apparatus in the present invention lies in that main MPU 404 in the information recording/playback apparatus shown in FIG. 14 automatically sets the value of "information for designating the display timing of a still picture" (FIGS. 9A and 9B) (FIG. 22, step S68 in FIG. 23).

More specifically, main MPU 404 automatically computes:

[display time per still picture]=[playback time of corresponding audio track]÷[the number of still pictures to be displayed in corresponding audio track]

In original PGC 320 that manages information of an original track, information that pertains to an original track shown in FIGS. 9A and 9B is recorded in program information (#1/311 to #4/314).

A method of playing back audio related information recorded on information storage medium 100 by the aforementioned method will be explained below using FIGS. 24 and 25.

Figure 24:
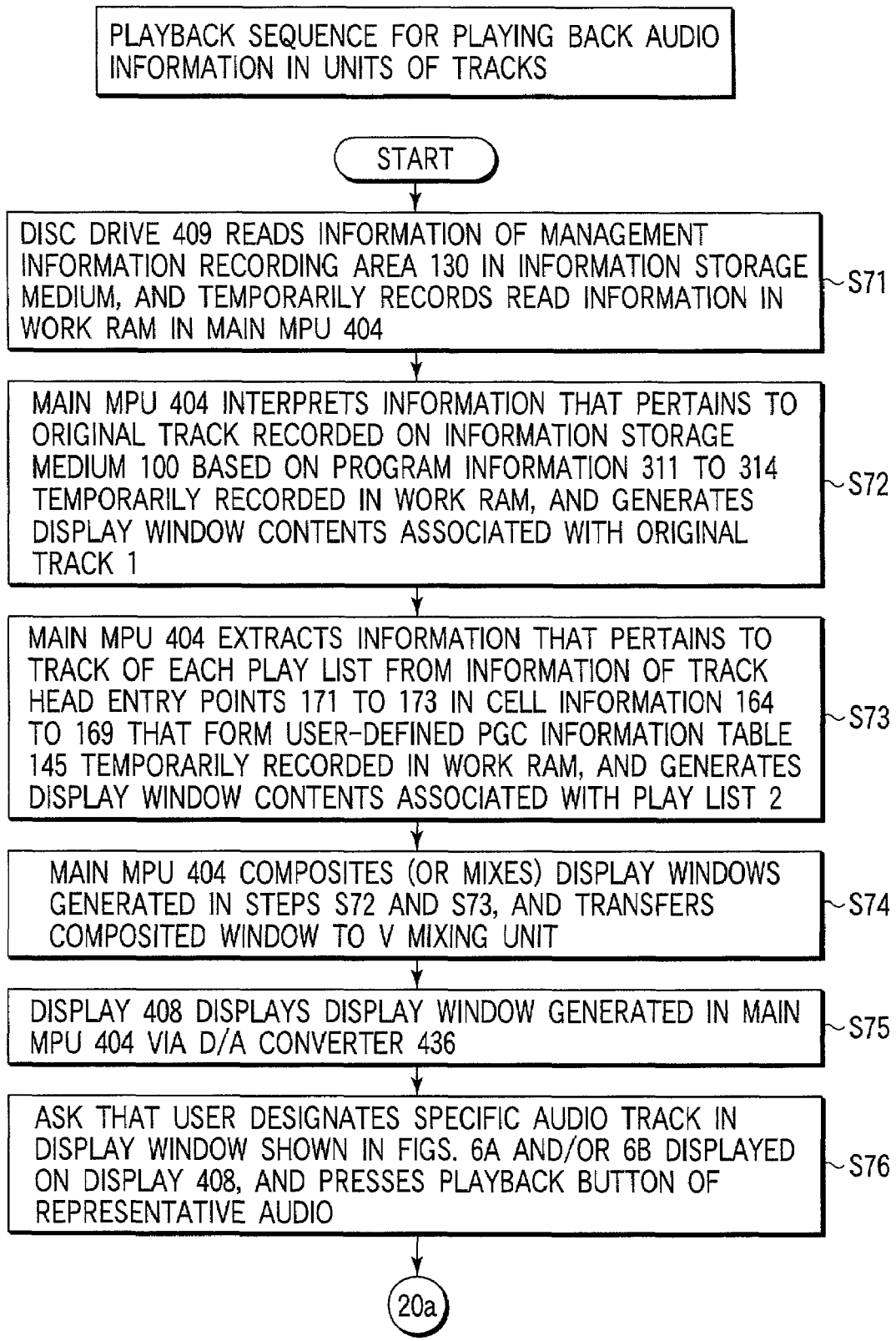
FIG. 24 is a flow chart showing a playback sequence for playing back audio information in units of tracks.

Information in management information recording area 130 is read, and is temporarily recorded in the work RAM in main MPU 404 (step S71 in FIG. 24). Information that pertains to an original track recorded on the information storage medium is interpreted on the basis of the program information (311 to 314) temporarily recorded in the work RAM to generate display window contents that pertain to original track 1 (step S72).

Information associated with tracks in units of play lists is extracted from information of track head entry points 171 to 173 in cell information 164 to cell information 169 that form user-defined PGC information table 145 temporarily recorded in the work RAM, thus generating display window contents which pertain to play list 2 (step S73).

The display windows generated in steps S72 and S73 in FIG. 24 are composited, and the composite window is transferred to the V mixing unit (step S74). The display window generated in main MPU 404 is displayed on display 408 via D/A converter 436 (step S75).

The window shown in FIGS. 6A and 6B is displayed by the method shown in FIG. 19, and the user selects a track to be played back (step S76).

Figure 25:
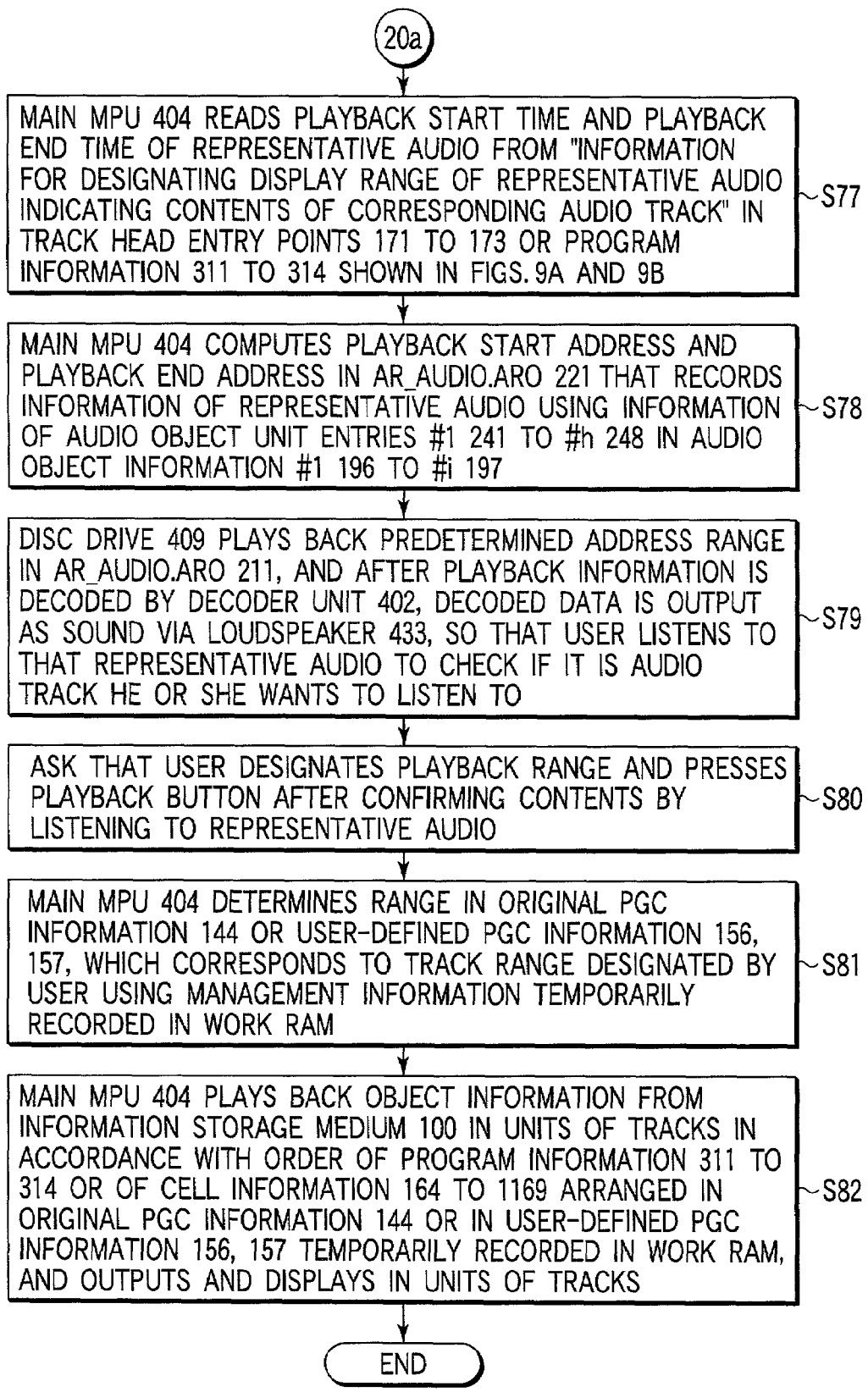
FIG. 25 is a flow chart, continued from the flow chart of FIG. 24, showing the remaining steps of FIG. 24.

In step S77 of FIG. 25, the playback start and end times of representative audio are read from the "information for designating the display range of representative audio indicating the playback contents of the corresponding audio track" in track head entry points 171 to 173 or program information 311 to program information 314.

On the other hand, in step S78 the playback start and end addresses in AR_AUDIO.ARO 221 that records representative audio information are computed using information in audio object unit entries 241 to 248 in audio object information 196 to audio object information 197.

In step S79, information in the predetermined address range is played back and is output as sound. The user listens to that representative audio to check if it is an audio track he or she wants to listen to. After confirmation, the user designates the playback range and presses the playback button (step S80).

That range in original PGC information 144 or user-defined PGC information 155 to user-defined PGC information 157, which corresponds to the track range designated by the user is discriminated from the management information temporarily stored in the work RAM (step S81).

Object information is played back and displayed in units of tracks from the disc in accordance with the order program information 311 to program information 311 or cell information 164 to cell information 169 are arranged in original PGC information 144 or user-defined PGC information 155 to user-defined PGC information 157 (step S82).

According to the method of FIGS. 24 and 25, a user can listen to representative audio before he or she selects a tune he or she wants to listen to, thus confirming in advance if it is the tune he or she really wants to listen to. That is, when the user designates an audio track to be confirmed and presses a playback button of representative audio, main MPU 404 computes the addresses to be accessed in AR_AUDIO.ARO 221 using audio object unit entries AOBU_ENT #1/241 to AOBU_ENT #h/248 (step S78) from "information for designating the display range of representative audio indicating the playback contents of the corresponding audio track" (step S77 in FIG. 25), and plays back and displays audio information from the information storage medium (step S79).

As described above, in the present invention, main MPU 404 in the information recording/playback apparatus discriminates that range in each object file, which corresponds to the range designated by the user (step S77), and plays back and displays based on the discrimination result. At this time, a characteristic feature of the present invention lies in that object information is played back in units of tracks from information storage medium in accordance with the order program information 311 to program information 311 or cell information 164 to cell information 169 are arranged in original PGC information 144 or user-defined PGC information 155 to user-defined PGC information 157.

The gist implemented by the present invention is summarized as follows.

Break information of audio tracks is recorded in PGCI. The track break information is provided with text information and a representative picture of the track. Program information is recorded in units of original tracks.

A track head entry point in cell information indicates a break of tracks. Playback is made in units of tracks in accordance with the order a plurality of pieces of program information/cell information described in the PGCI are arranged. The display timings are automatically computed in correspondence with still pictures designated by the user. A display method of simultaneously displaying an original list and play list on the screen (also applies to RTR).

Furthermore, an edit method of creating tracks on the play list using original track information. Still pictures of an original track to be pasted on a track of the play list are determined. Still pictures to be displayed after partial erase are determined. An edit method of extracting an arbitrary scene of a movie object as a still picture and displaying it simultaneously with an audio object, and so forth.

Figure 26:
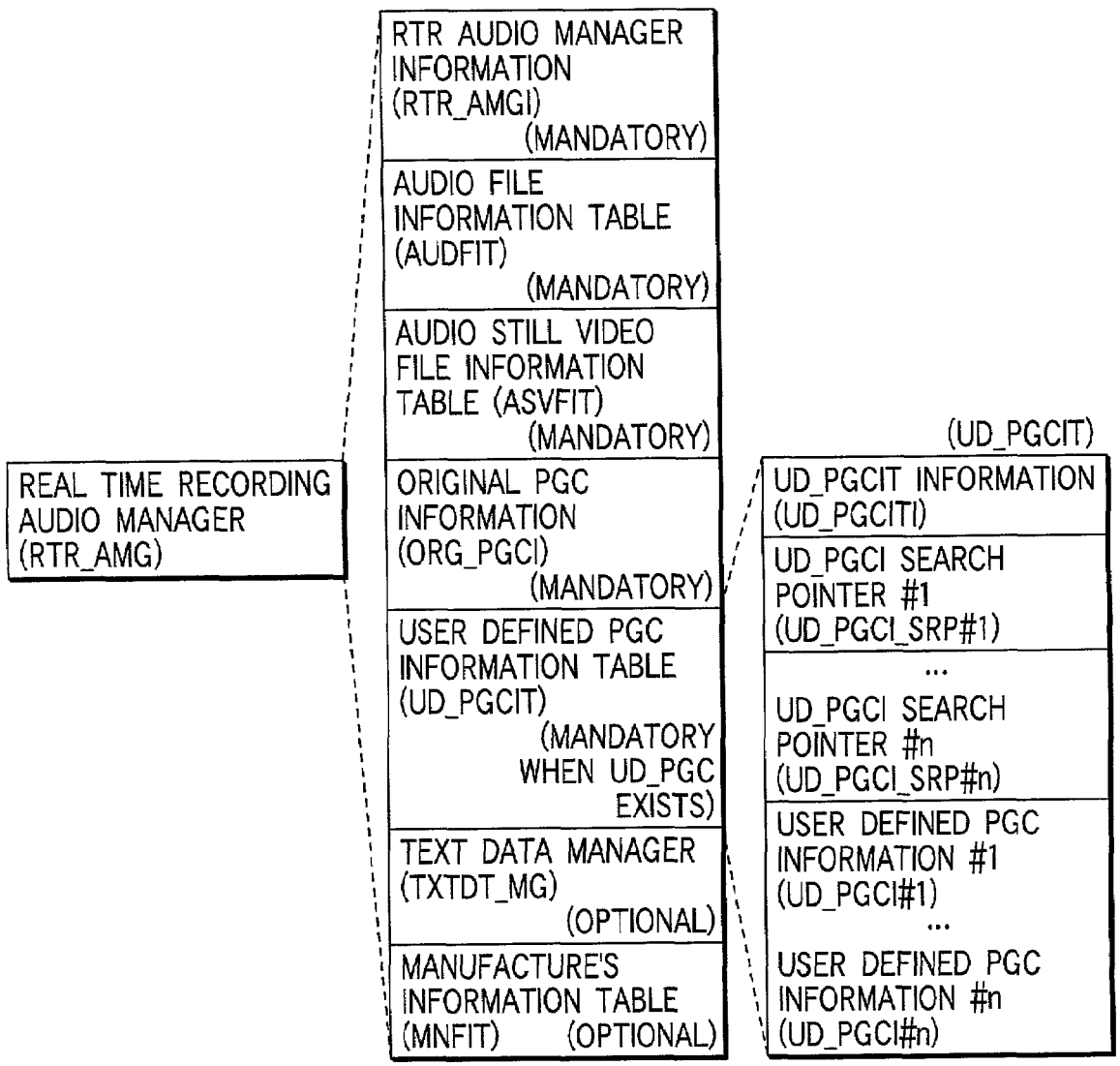
FIG. 26 shows an example of the data structure of a part (UD_PGCIT shown in FIG. 1) of a real time recording audio manager (RTR_AMG)

FIG. 26 shows an example of the data structure of a part (UD_PGCIT 145 shown in (e) of FIG. 1) of a real time recording audio manager (RTR_AMG 130 shown in (d) of FIG. 1).

As shown in FIG. 26, real time recording (RTR) audio manager RTR_AMG (130 in (d) of FIG. 1) includes RTR audio manager information RTR_AMGI, audio file information table AUDFIT, audio still video file information table ASVFIT, original program chain (PGC) information ORG_PGCI (144 in (e) of FIG. 1), user-defined PGC information table UD_PGCIT (145 in (e) of FIG. 1), text data manager TXTDT_MG (146 in (e) of FIG. 1), and manufacture's information table MNFIT (147 in (e) of FIG. 1).

User-defined PGC information table UD_PGCIT includes user-defined PGC information table information UD_PGCITI (150 in (f) of FIG. 1), one or more user-defined PGC information search pointers UD_PGCI_SRP #1 to #n (151, 152 in (f) of FIG. 1), and one or more pieces of user-defined PGC information UD_PGCI #1 to #n (156, 157 in (f) of FIG. 1).

There are two type of PGC information. One is an original PGC managed by ORG_PGCI, and the other is one or more user-defined PGCs managed by UD_PGCIT.

The original PGC describes a playback sequence of originally recorded contents (cells). The user-defined PGC describes a playback sequence which can be obtained by freely arranging (or modifying) the order of playback of cells (originally recorded contents) by a user.

Figure 27:
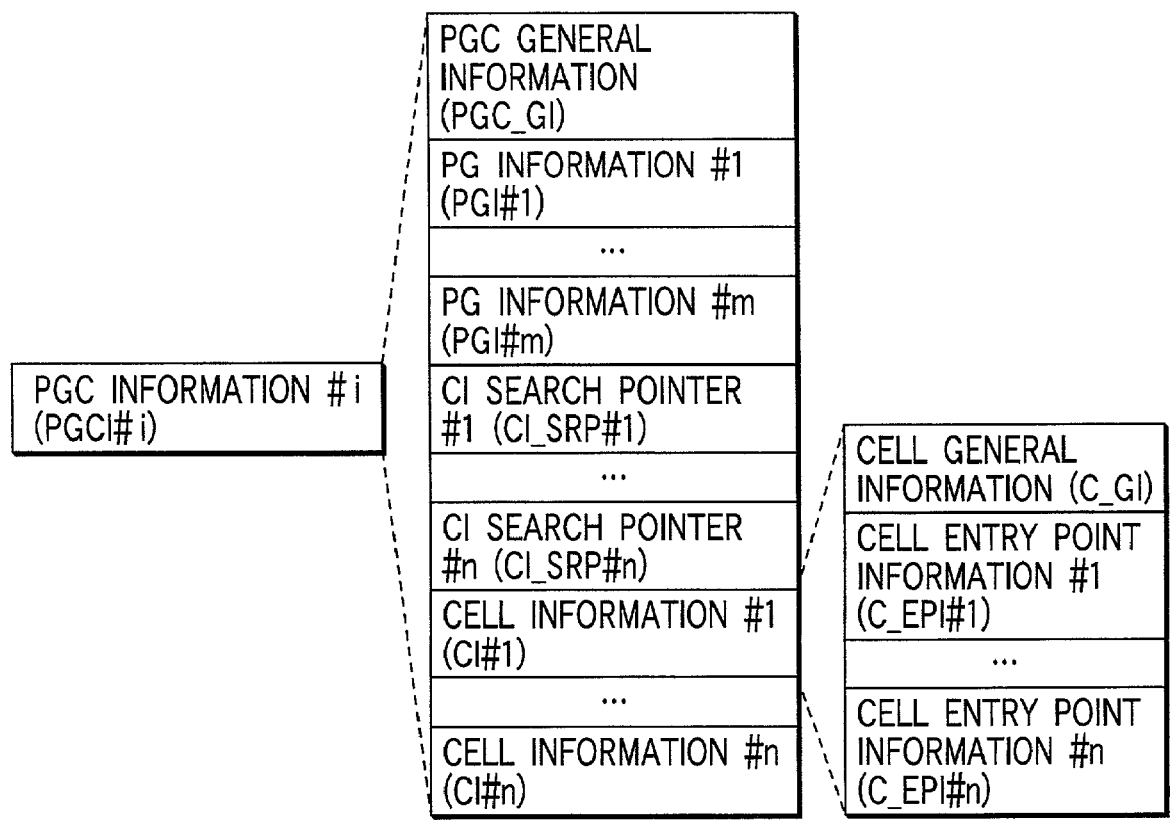
FIG. 27 shows an example of the data structure of a program chain information (PGC Information) contained in the real time recording audio manager (RTR_AMG) shown in FIG. 26.

FIG. 27 shows an example of the data structure of a program chain information (PGC Information) contained in the real time recording audio manager (RTR_AMG) shown in FIG. 26.

As shown in FIG. 27, PGC information (ORG_PGCI or one of UD_PGCIs) #i includes PGC general information PGC_GI (160 in (g) of FIG. 1; cf. FIG. 48), one or more pieces of program information PGI #1 to #n (311 to 313 in (d) of FIG. 12; cf. FIG. 49), one or more cell information search pointers CI_SRP #1 to #n (161, 162 in (g) of FIG. 1), and one or more pieces of cell information CI #1 to #n (164–169 in (g) of FIG. 1, or 164 to 169 in (d) of FIG. 7).

Each cell information CI includes cell general information C_GI and one or more pieces of cell entry point information C_EPI #1 to #n (171–173 in (h) of FIG. 1, or the entry points in (c) of FIG. 7).

Although not shown, cell general information C_GI contains information items of:

(1) C_TY describing a type of the cell (e.g., C_TY1="010b" is described for Audio Cell);

(2) PB_INF describing playback information (e.g., on/off information of dynamic range control, and a dynamic range control value) of the cell;

(3) AOBI_SRPN describing the AOBI search pointer number of the corresponding AOB of the cell;

(4) ASVUI_SRPN describing the ASVUI search pointer number of the corresponding ASVU of the cell;

(5) ASV_DMD describing the display timing mode and display order mode of the ASVU corresponding to the cell;

(6) C_EPI_Ns describing the number of cell entry points C_EPIs;

(7) C_A_S_PTM describing the presentation start time of the cell; and (8) C_A_E_PTM describing the presentation end time of the cell.

Figure 28A:
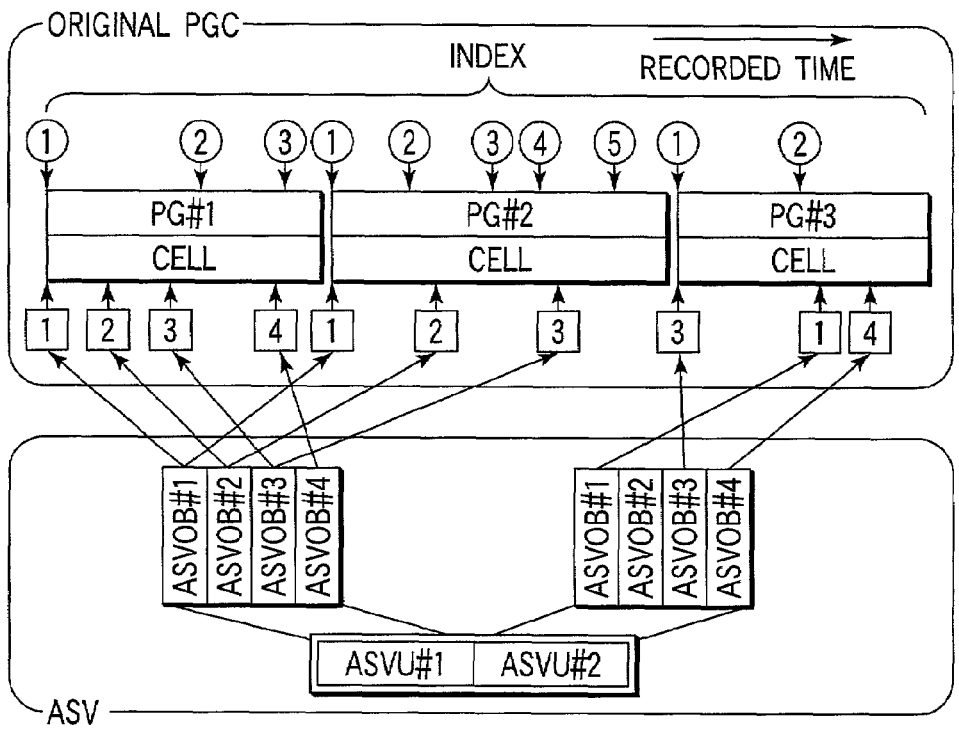
FIGS. 28A and 28B respectively show examples of entry points in an original PGC and in a user-defined PGC.
Figure 28B:
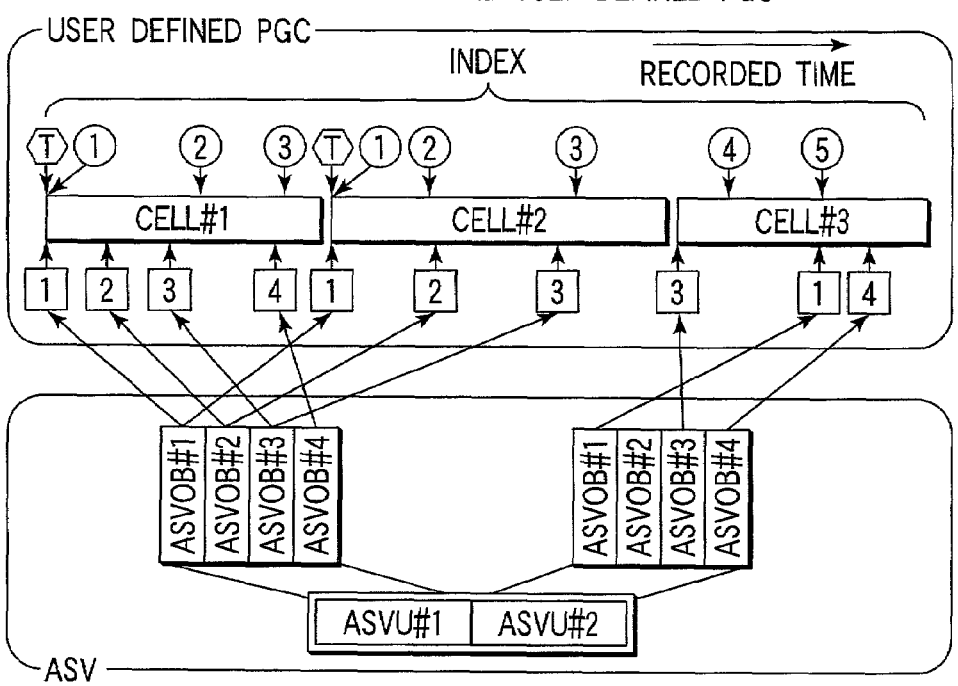

FIGS. 28A and 28B respectively show examples of entry points in an original PGC and in a user-defined PGC.

FIG. 28A shows an example of entry points in the original PGC. In FIG. 28A, there are three programs PG #1 to PG #3. Each of these programs has only one cell, In the cell of PG #1, there are seven entry points in total. Three entry points (1) to (3) of PG #1 are for an index, and four entry points [1] to [4] thereof are for a display list.

Note that the entry points for an index of PG #1 to PG #3 are indicated by the arrows over the boxes of PG #1 to PG

3, and the index number representing these entry points are indicated by the numbers enclosed in the circles. Thus, the entry points for index include the value of index number as additional information.

The arrows under the boxes of PG #1 to PG #3 indicate the entry points for a display list. When there is an audio still video (ASV) to be presented with audio data, the track has information about the number of audio still video unit (ASVU) which includes the audio still video to be presented together. Each entry point has information about the number of audio still video object (ASVOB) in the specified ASVU. Specified ASVOB is presented at the timing of the entry point.

FIG. 28A illustrates an example of slideshow/sequential mode. In case of slideshow/random or shuffle, each entry point has no information about the number of ASVOB, because the number of ASVOB to be presented shall be decided at random or by shuffle. When the ASV display mode of the track is a browsable mode, timing information of the entry points for audio still video (ASV) is all set to zero. This is because, in case of the browsable mode, a user can skip to the next or previous audio still video at any timing, and predetermined timing information is not necessary.

FIG. 28B shows an example of entry points in the user defined PGC. In case of a user defined PGC, the PGC contains no program (PG) structure and the PGC contains only a cell structure. Therefore, a user defined track is not realized by a program (PG) structure. A new entry point <T> for the user defined track is introduced in case of the user defined PGC.

In FIG. 28B, three cells are illustrated: cell #1, cell #2, and cell #3. The illustrated cell #1 and cell #2 have the new entry points <T> for the user defined track. In the example of FIG. 28B, cell #1 corresponds to one user defined track, and cell #2 and cell #3 correspond to another user defined track. The entry point for user defined track shall be set to the start point of the cell.

As for an entry point for the index and an entry point for the display list, there are the same as case (FIG. 28A) of the original PGC.

Incidentally, the numbers (1 to 5) or characters (T) with downward arrows correspond to the track head entry points in (c) of FIG. 7, and the numbers (1–4) with upward arrows correspond to the still picture entry points in (c) of FIG. 7.

FIG. 29 shows an example of contents of cell entry point information (C_EPI of type A1; C_EPI# shown in FIG. 27 or (h) of FIG. 1).

As shown in FIG. 29, C_EPI of type A1 includes information items of:

(1) EP_TY describing a type of the entry point (this EP_TY is formed of EP_TY1 and EP_TY2, and the type A1 is indicated by a combination of the contents of EP_TY1="01b" and EP_TY2="00b".);

(2) EP_PTM describing the presentation time of the entry point (all byte of this EP_PTM shall be set to "00h");

(3) PRM_TXT describing the primary text information for the entry point (PRM_TXT is divided into two sub fields: the first 64 byte field is used to describe a primary text in, e.g., ASCII character set, the last 64 byte field is used to describe a primary text in another character set defined in RTR_AMGI shown in FIG. 26, etc.);

(4) IT_TXT_SRPN describing the search pointer information (search pointer number) of item text IT_TXT whose text data corresponds to the entry point; and (5) REP_PICTI describing representative picture information (see FIG. 50).

Note that EP_TY of type A1 corresponds to EP_TY described in the first paragraph of the "information contents" of the table shown in FIG. 9A.

Note that EP_PTM of type A1 corresponds to EP_PTM described in the 8th paragraph of the "information contents" of the table shown in FIG. 9A.

Note that PRM_TXT of type A1 corresponds to PRM_TXTI described in the 5th paragraph of the "information contents" of the table shown in FIG. 9A.

Note that IT_TXT_SRPN of type A1 corresponds to IT_TXT_SRPN described in the 6th paragraph of the "information contents" of the table shown in FIG. 9A.

Also note that REP_PICTI of type A1 corresponds to REP_PICTI described in the third paragraph of the "information contents" of the table shown in FIG. 9A.

Figure 30:
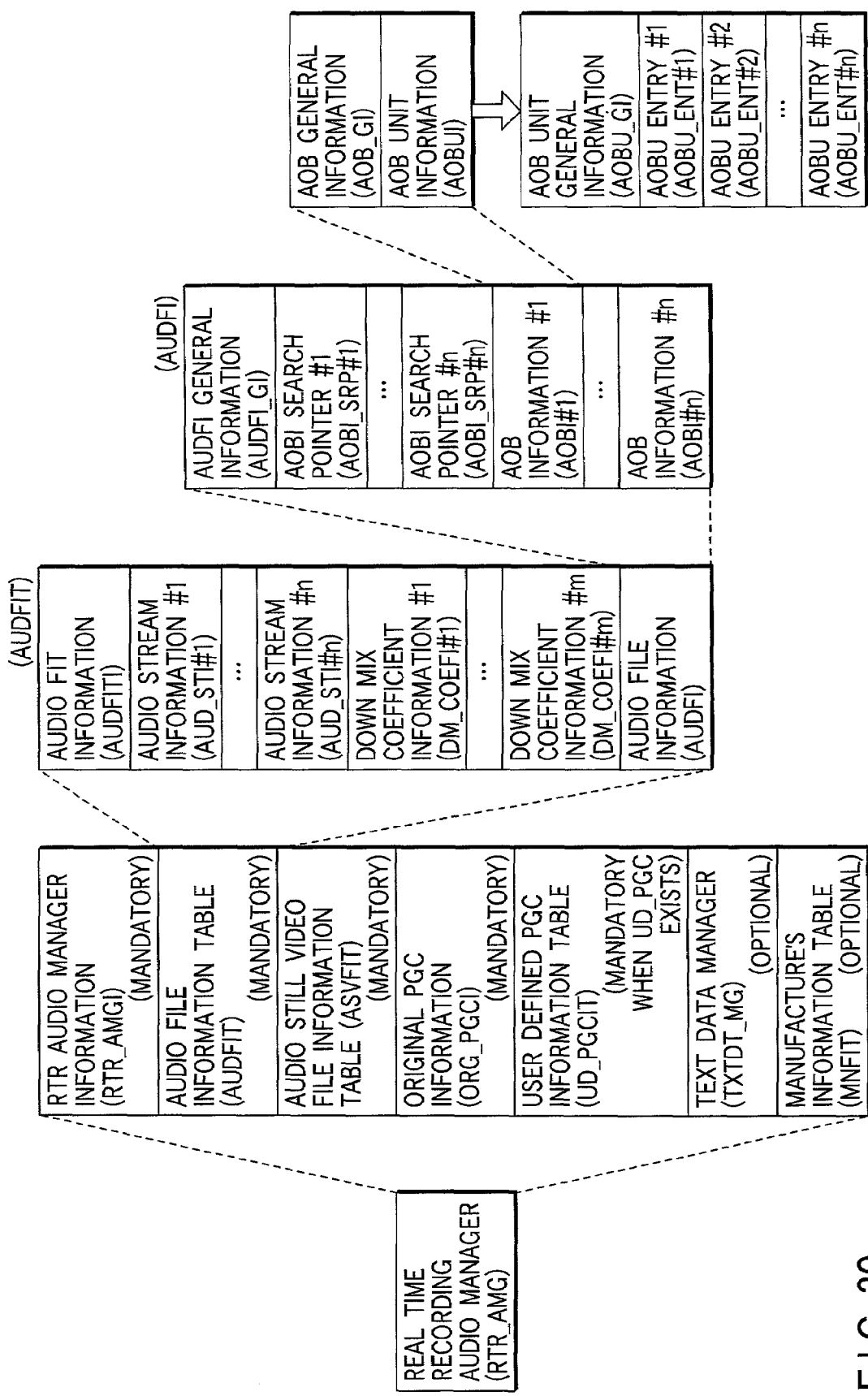
FIG. 30 shows an example of the data structure of another part (AUDFIT shown in FIG. 3) of the real time recording audio manager (RTR_AMG)

FIG. 30 shows an example of the data structure of another part (AUDFIT 143 shown in (e) of FIG. 3) of the real time recording audio manager (RTR_AMG 130 shown in (d) of FIG. 3).

As shown in FIG. 30, audio file information table AUD-FIT in RTR_AMG includes audio file information table information AUDFITI (180 in (f) of FIG. 3), one or more pieces of audio stream information AUD_STI #1 to #n (181, 182 in (f) of FIG. 3), one or more pieces of down mix coefficient information DM_COEFI #1 to #m, and audio file information AUDFI (184 in (f) of FIG. 3).

Although not shown, AUDFITI contains information items of:

(1) AUDFI_Ns describing the number of pieces of audio file information AUDFI;

(2) AUD_STI_Ns describing the number of pieces of audio stream information AUD_STI;

(3) DM_COEFI_Ns describing the number of pieces of down mix coefficient information DM_COEFI; and (4) AUDFIT_EA describing the end address of audio file information table AUDFIT with the relative block number from the first byte of the AUDFIT.

Note that AUDFI_Ns indicates the number of audio files (AR_AUDIO.ARO 221 in FIG. 2). Since the maximum number of the audio files is 1", AUDFI_Ns shall take the value "0" or "1". Also note that the maximum number of AUD_STI_Ns is "64", and the maximum number of DM_COEFI_Ns is "16".

Although not shown, each AUD_STI contains information items of:

(a) A_ATR describing the audio attribute of the AOB which refers to the AUD_STI; and (b) TXT_ART describing the text attribute (e.g., ASCII, etc.) of real time text data RT_TXTDT included in the AOB which refers to the AUD_STI.

The above A_ATR includes information items of:

(a1) Audio coding mode indicating any of Linear PCM mode, Packed PCM mode/Lossless-compressed mode, etc.;

(a2) Q of CH_GR1 describing the quantization word length (16-bit, 20-bit, 24-bit, etc.) of the channel group 1 (CH_GR1) of Linear PCM audio or the source data of Packed PCM audio;

(a3) Q of CH_GR2 describing the quantization word length (16-bit, 20-bit, 24-bit, etc.) of the channel group 2 (CH_GR2) of Linear PCM audio or the source data of Packed PCM audio;

(a4) fs of CH_GR1 describing the sampling frequency (48 kHz, 96 kHz, 192 kHz, 44.1 kHz, 88.2 kHz, 176.4 kHz, etc.) of the channel group 1 (CH_GR1) of Linear PCM audio or the source data of Packed PCM audio;

(a5) fs of CH_GR2 describing the sampling frequency (48 kHz, 96 kHz, 192 kHz, 44.1 kHz, 88.2 kHz, 176.4 kHz, etc.)

of the channel group 2 (CH_GR2) of Linear PCM audio or the source data of Packed PCM audio;

(a6) Multi-channel type describing the type of the multi-channel source of Linear PCM audio or the source data of Packed PCM audio related to:

Channel assignment including the number of channels, and

Down-mix method (for Linear PCM only); and (a7) Cannel assignment describing the assignment of each channel of Linear PCM audio data or Packed PCM audio data in the AOB.

The above real time text data (RT_TXTDT) can be recorded in, e.g., AR real-time text object recording area 134 shown in (d) of FIG. 1.

Although not shown, down mix coefficient information DM_COEFI includes down mix coefficient table DM_COEFT. Contents of DM_COEFT can be used to determine the coefficients to mix down the Linear PCM audio data from multi-channel to 2-channel. This information is used only when audio data is coded as Linear PCM.

Note that the same DM_COEFI may be shared by multiple AOBs.

As shown in FIG. 30, audio file information AUDFI includes audio file information general information AUDFI_GI (190 in (g) of FIG. 3), one or more audio object information search pointers AOBI_SRP #1 to #n (191, 192 in (g) of FIG. 3). and one or more pieces of audio object information AOBI #1 to #n (196, 197 in (g) of FIG. 3).

Although not shown, AUDFI_GI contains AOBI_SRP_Ns describing the number of AOBI_SRPs. Note here that the minimum and maximum numbers of AOBs in the audio file is "1" and "999", respectively.

The search pointer AOBI_SRP contains AOBI_SA describing the start address of the AOBI with relative block numbers from the first byte of AUDFIT.

Each audio object information AOBI contains AOB general information AOB_GI and AOB unit information AOBUI.

Although not shown, AOB_GI (corresponding to 240 in (h) of FIG. 3) contains information items of:

(1) AOB_TY describing the type of AOB, and AOB_TY includes temporary erase flag TE (TE="0b" indicates that the AOB is in normal state, and TE="1b" indicates that the AOB is in temporarily erased state. An AOB in temporarily erased state shall not be referred to by a cell in a user-defined PGC, nor be presented in a normal playback operation such as a track play.);

(2) AOB_CNT describing the contents (AUD_STI number AUD_STIN, bit-shift of CH_GR2, stereo playback mode, DMCOEFI number DMCOEFIN, DMCOEFIN validity describing whether DMCOEFIN is valid or not) of the AOB;

(3) AOB_REC_TM describing the recording time (the time when the head of audio data of the AOB was recorded) of the AOB;

(4) AOB_REC_TM_SUB describing the sub-second information for AOB_REC_TM;

(5) AOB_A_S_PTM describing the presentation starting time of the first audio frame, which is coded as presentation time stamp PTS, of the AOB (when no PTS is presented in the AOB, the presentation starting time shall be calculated in the manner of MPEG specification); and (6) AOB_A_E_PTM describing the presentation terminating time of the last audio frame of the AOB.

As shown in FIG. 30, AOBUI contains audio object unit general information AOBU_GI, and one or more AOBU entries AOBU_ENT #1 to #n (241 to 248 in (h) of FIG. 3).

Although not shown, AOBU_GI (also corresponding to 240 in (h) of FIG. 3) contains information items of:

(1) AOBU_PB_TM describing the playback time of one AOBU;

(2) AOBU_SZ describing the size of AOBU (the size is specified by the number of data packs in AOBU;

(3) L_AOBU_PB_TM describing the playback time of the last AOBU of the AOB;

(4) L_AOBU_SZ describing the size of the last AOBU in the AOB;

(5) AOBU_ENT_Ns describing the number of AOBU entries in the AOBUI; and (6) AOB_SA describing the start address of the AOB with relative logical block numbers from the first logical block of the AR_AUDIO.ARO file (221 in FIG. 2).

Note that the playback time of AOBU shall be equal to or less than 1 second and, therefore, AOBU_PB_TM describes the shortage of the AOBU playback time from 1 second.

Figure 31:
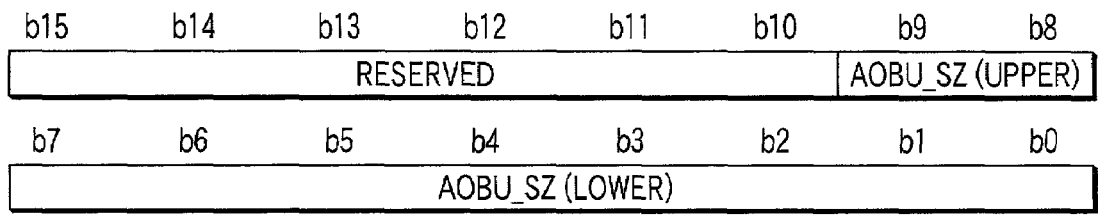
FIG. 31 shows an example of contents of an audio object unit entry (AOBU_ENT) corresponding to AOBU_ENT #n (n=integer number) shown in FIG. 30.

FIG. 31 shows an example of contents of an audio object unit entry (AOBU_ENT) corresponding to AOBU_ENT #n (n=integer number) shown in FIG. 30, or corresponding to 241 to 248 in (h) of FIG. 3.

As shown in FIG. 31, each AOBU_ENT contains AOBU_SZ describing the size of the AOBU. This AOBU size is specified by the number of data packs in the AOBU. When each pack has 2048 bytes (or 2 k bytes), the size of AOBU becomes an integer number of 2048 bytes (or an integer number of 2 k bytes).

Figure 32:
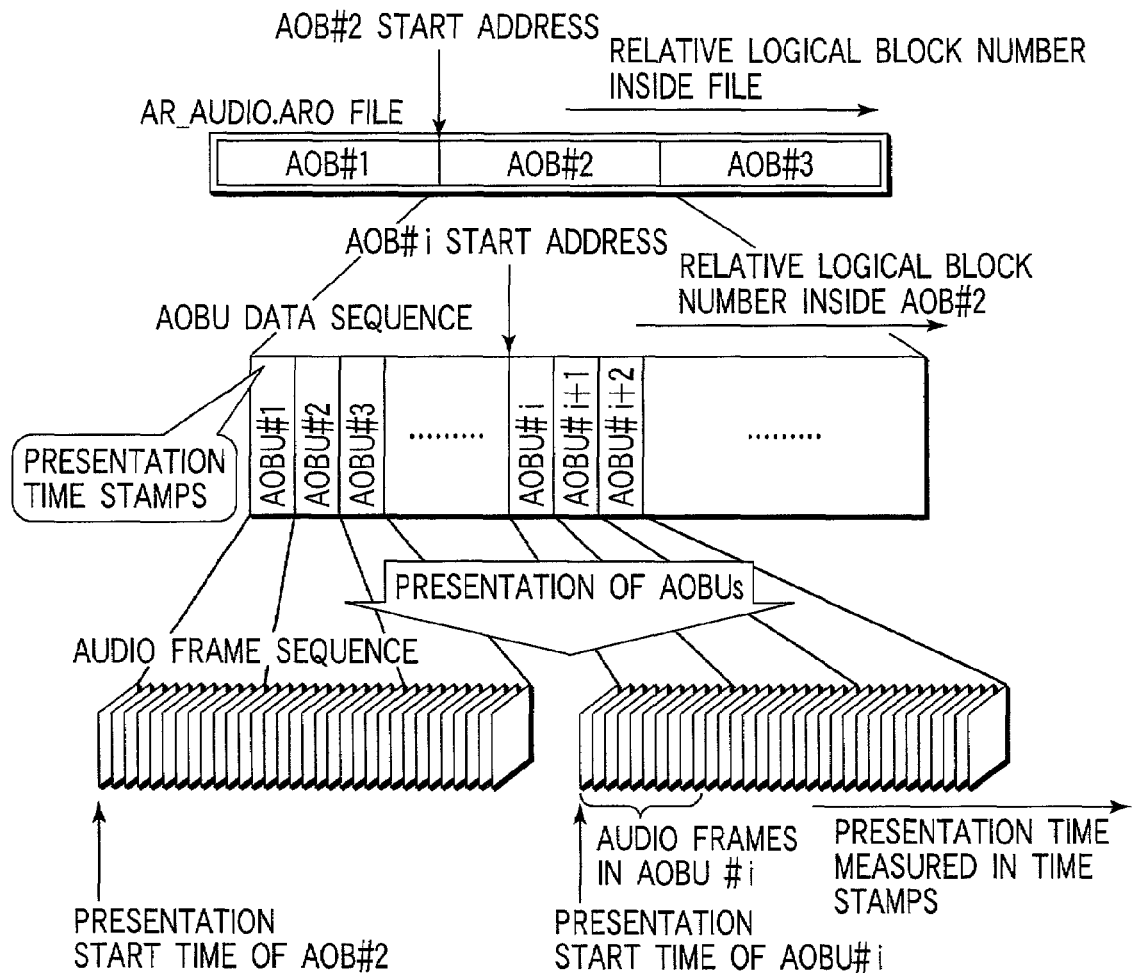
FIG. 32 illustrates a concept of AOBU accesses for presenting contents (audio frames) of audio object units AOBUs.

FIG. 32 illustrates a concept of AOBU accesses for presenting contents (audio frames) of audio object units AOBUs.

In the example of FIG. 32, three AOBs (AOB #1 to #3) are recorded in the AR_AUDIO.ARO file. The first data of each AOB is accessed by specifying the relative logical block number inside the file. Therefore, in order to access AOB #2, AOB #2 start address is described in the data field of AOBI for AOB #2. The start address for AOB #1 becomes "0" in the relative logical block number inside the file.

AOB #2 in FIG. 32 is formed of a sequence of AOBUs starting at AOBU #1. Each AOBU is formed of a sequence of packs. A pack is a unit containing the divided audio and text data for multiplexing. Inside the AR_AUDIO.ARO file, all packs shall be recorded contiguously in the sense of the relative block number inside the file. Therefore, in order to access AOBU #i in AOB #2, the start address of AOBU #i should be obtained. This is computed by adding the AOB #2 start address and the relative start address inside AOB #2. This is the basic mechanism to access AOBU using the data structure of AOBI.

Incidentally, AOBs #1, #2, #3, . . . of the AR_AUDIO.ARO file shown in FIG. 32 correspond to 196 to 197 shown in (g) of FIG. 3. AOBUs #1, #2, #3, . . . of the AOBU data sequence shown in FIG. 32 correspond to 241 to 248 shown in (h) of FIG. 3. Information item 251 shown in (I) of FIG. 3 corresponds to the audio frames in AOBU #i (i=1, 2, 3, . . . ).

Any presentation of AOB and AOBU can be specified by the presentation start time and presentation end time.

The presentation start time of AOB and AOBU is defined using time stamps described in data packs of the AOB. For instance, the first audio frame of audio packs in each AOBU has its presentation time in the PTS field of the packet header (not shown). In order to decode and present data of AOB or AOBU, the reference clock (e.g., STC1 in FIG. 14) inside the decoder (402 in FIG. 14) is set to the SCR value described in the first pack (not shown) at which the presentation begins, and then the clock is being counted automatically. Based on the clock, the presentation of an AOB or AOBU is performed.

Figure 33:
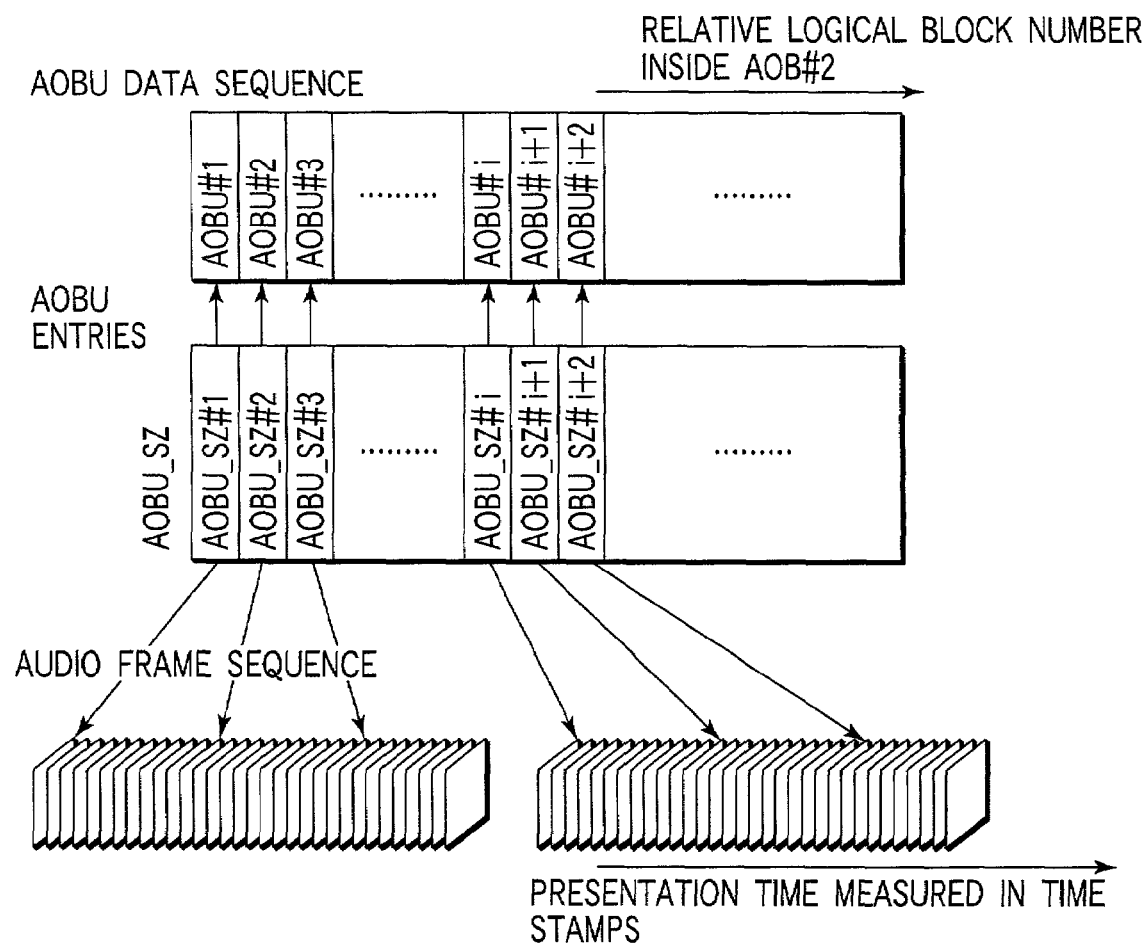
FIG. 33 illustrates a concept of AOBU entries (AOBU_ENT#)

FIG. 33 illustrates a concept of AOBU entries (AOBU_ENT#).

If coding of the audio elementary stream is in a variable bit-rate, an AOBU entry having a structure to store size information for each AOBU is prepared for every AOBU. This is because the number of data packs of an AOBU is flexible.

In the case of a constant bit-rate, an AOBU entry is not defined. AOBU entries associated with an AOB are describing in ascending order of presentation time associated with the AOBU.

In order to minimize the table size, each AOBU entry contains only the number of packs (AOBU_SZ in FIG. 33). Using this information (AOBU_SZ #i), it is possible to compute which AOBU corresponds to a given presentation time. This is because the presentation period of each AOBU except for the last AOBU is always constant.

Figure 34:
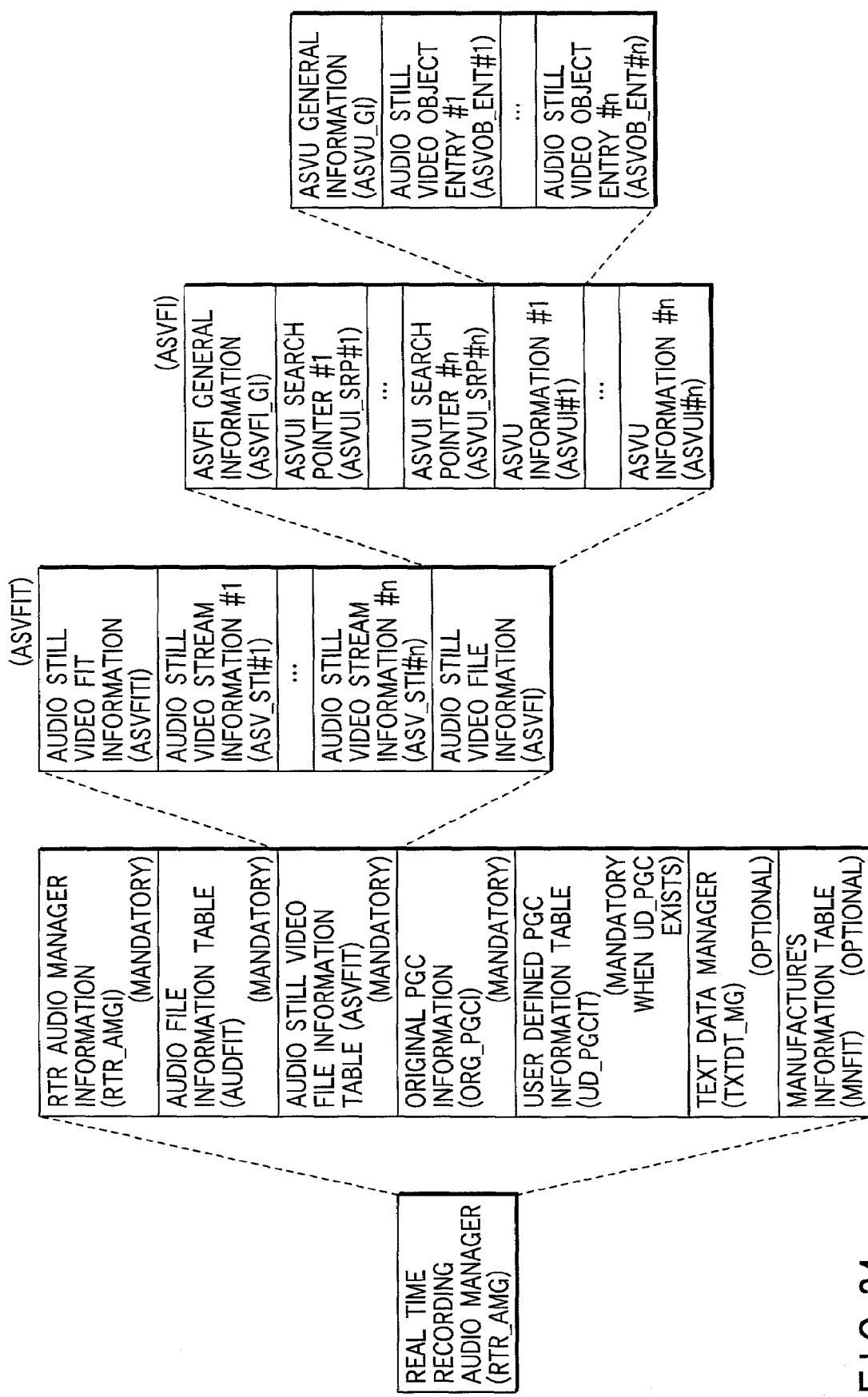
FIG. 34 shows an example of the data structure of still another part (ASVFIT shown in FIG. 4) of the real time recording audio manager (RTR_AMG)

FIG. 34 shows an example of the data structure of still another part (ASVFIT 142 shown in (e) of FIG. 4) of the real time recording audio manager (RTR_AMG 130 shown in (d) of FIG. 4).

As shown in FIG. 34, audio still video file information table ASVFIT (142 in (e) of FIG. 4) includes audio still video file information table information ASVFITI (260 in (f) of FIG. 4), audio still video stream information ASV_STI #1 to #n (261 to 262 in (f) of FIG. 4), and audio still video file information ASVFI (264 in (f) of FIG. 4).

Although not shown, ASVFITI contains information items of:

(1) ASVFI_Ns describing the number of pieces of audio still video file information ASVFI;

(2) ASV_STI_Ns describing the number of pieces of audio still video stream information ASV_STI; and (3) ASVFIT_EA describing the end address of audio still video file information table ASVFIT with the relative block number from the first byte of ASVFIT.

Each audio still video stream information ASV_STI contains video attribute V_ATR. This V_ATR describes the video attribute of one or more audio still video units (ASVU or ASVUs) which refer to the ASV_STI.

Although not shown, V_ATR contains information items of:

(a) Video compression mode indicating MPEG-1, MPEG-2, etc.;

(b) TV system indicating 525/60 (NTSC), 625/50 (PAL), etc.;

(c) Aspect ratio indicating 4:3, 16:9, etc.;

(d) Video resolution such as 720×480, 544×480, etc.

As shown in FIG. 34, audio still video file information ASVFI includes ASVFI general information ASVFI_GI (270 in (g) of FIG. 4), one or more ASVUI search pointers ASVUI_SRP #1 to #n (271 to 272 in (g) of FIG. 4), and one or more pieces of ASVU information ASVUI #1 to #n (273 to 279 in (g) of FIG. 4).

Although not shown, ASVFI_GI contains ASVUI_SRP_Ns describing the number of ASVUI search pointers ASVUI_SRPs. Note that the minimum number of ASVUs in the audio still video file is "1" and the maximum number thereof is "999".

Although not shown, each ASVUI_SRP contains ASVUI_SA describing the start address of audio still video unit information ASVUI with the relative block number from the first byte of the ASVFIT.

As shown in FIG. 34, ASVU information ASVUI contains ASVU general information ASVU_GI (280 in (h) of FIG. 4) and one or more audio still video object entries ASVOB_ENT #1 to #n (281 to 289 in (h) of FIG. 4).

Although not shown, ASVU_GI contains information items of:

(1) ASVOB_Ns describing the number of ASVOB in the ASVU;

(2) ASV_STIN describing the ASV_STI number of the ASVU (note that more than one ASVUs may share the same ASV_STI);

(3) FIRST_ASVOB_REC_TM describing the time when the first ASVOB in the ASVU was recorded;

(4) LAST_ASVOB_REC_TM describing the time when the last ASVOB in the ASVU was recorded (note that FIRST_ASVOB_REC_TM shall be earlier than LAST_ASVOB_REC_TM in the same ASVU); and (5) ASVU_SA describing the start address of ASVU with the relative logical block number from the first logical block of the AR_STILL.ARO file (213 in FIG. 2).

Although not shown, each ASVOB_ENT contains information items of:

(a) ASVOB_ENT_TY describing the type of ASVOB entry; and (b) ASVOB_SZ describing the size of ASVOB in logical blocks.

Note that ASVOB_ENT_TY includes temporary erase flag TE (where TE="00b" indicates that the ASVOB is in a normal state, and TE="01b" indicates that the ASVOB is in a temporarily erased state).

Figure 35:
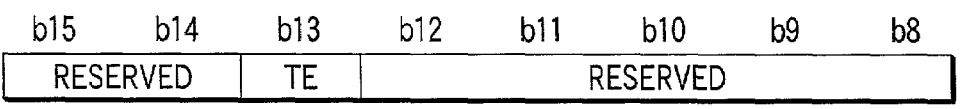
FIG. 35 shows an example of contents of an audio still video object entry (ASVOB_ENT) corresponding to ASVOB_ENT #n (n=integer number) shown in FIG. 34, or to ASVOB_ENT #1 shown in FIG. 4.

FIG. 35 shows an example of contents of an audio still video object entry (ASVOB_ENT) corresponding to ASVOB_ENT #n (n=integer number) shown in FIG. 34, or to ASVOB_ENT #1 shown in FIG. 4.

As shown in FIG. 35, ASVOB_ENT contains information items of:

(a) ASVOB_ENT_TY describing the type of ASVOB entry; and (b) ASVOB_SZ describing the size of ASVOB in logical blocks.

ASVOB_ENT_TY includes temporary erase flag TE. Here, TE="00b" indicates that the ASVOB is in a normal state, and TE="01b" indicates that the ASVOB is in a temporarily erased state.

Figure 36:
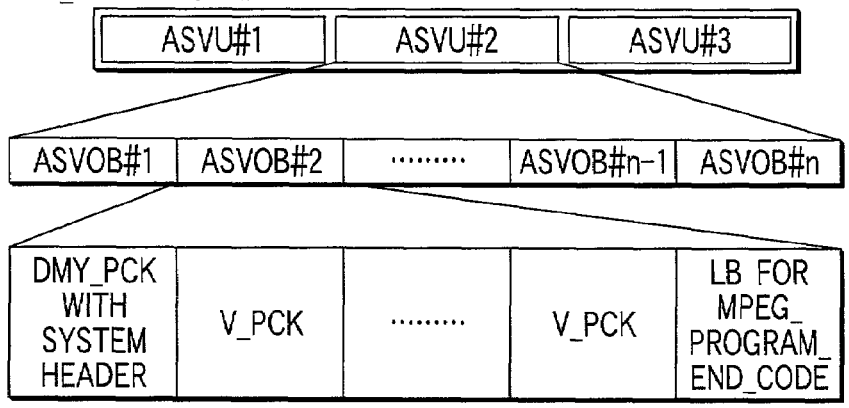
FIG. 36 shows an example of the data structure of the audio still video object (ASVOB)

FIG. 36 shows an example of the data structure of the audio still video object (ASVOB).

As shown in FIG. 36, each ASVU (here ASVU #2) of the AR_STILL.ARO file is formed of one or more ASVOBs (here ASVOB #1 to #n). Each ASVOB (here ASVOB #2) includes a dummy pack, one or more video packs V_PCKs, and a logical block for MPEG program_end_code. Only one the dummy pack shall exist at the start of ASVOB. The dummy pack contains a system header and some additional information (such as recording information consisting of ISRC code, copy control information, etc., not shown). The V_PCK complies with MPEG program stream and contains only an I-picture of MPEG video data followed by a sequence_end_code. Each ASVOB shall terminate with the logical block for MPEG_program_end_code.

Incidentally, the ASVUs shown in FIG. 36 respectively correspond to 273 to 279 in (g) of FIG. 4, and the ASVOBs shown in FIG. 36 respectively correspond to 281 to 289 in (h) of FIG. 4.

FIG. 37 illustrates a concept of ASVOB accesses. The ASVUs and ASVOBs shown in FIG. 37 respectively correspond to the ASVUs and ASVOBs shown in FIG. 36.

Audio still video ASV is still picture data to be presented together with audio data by a video capable player (abbreviated as a VCAP). Audio still video object ASVOB is composed of only one still picture without a button (a visual item for a user selection), and audio still video unit ASVU is the collection of one or more (up to "99") ASVOBs.

In order to access an ASVOB recorded in .ARO file, ASVUI is used to obtain address information with respect to the file. Each ASVUI is formed of address information of ASVOBs included in the ASVU.

FIG. 37 shows the basic concept of ASV and its ASVOB access. In FIG. 37, three ASVUs (ASVU #1 to #3) are recorded in the AR_STILL.ARO file. ASVU #2 consists of a sequence of ASVOBs starting at ASVOB #1. To access ASVOB #i in ASVU #2, the player (VCAP) obtains the start address of ASVU #2 in the AR_STILL.ARO file and the start address of ASVOB #i in ASVU #2. Then, the player sums up the two start addresses to get the start address of ASVOB #i in the AR_STILL.ARO file.

Figure 38:
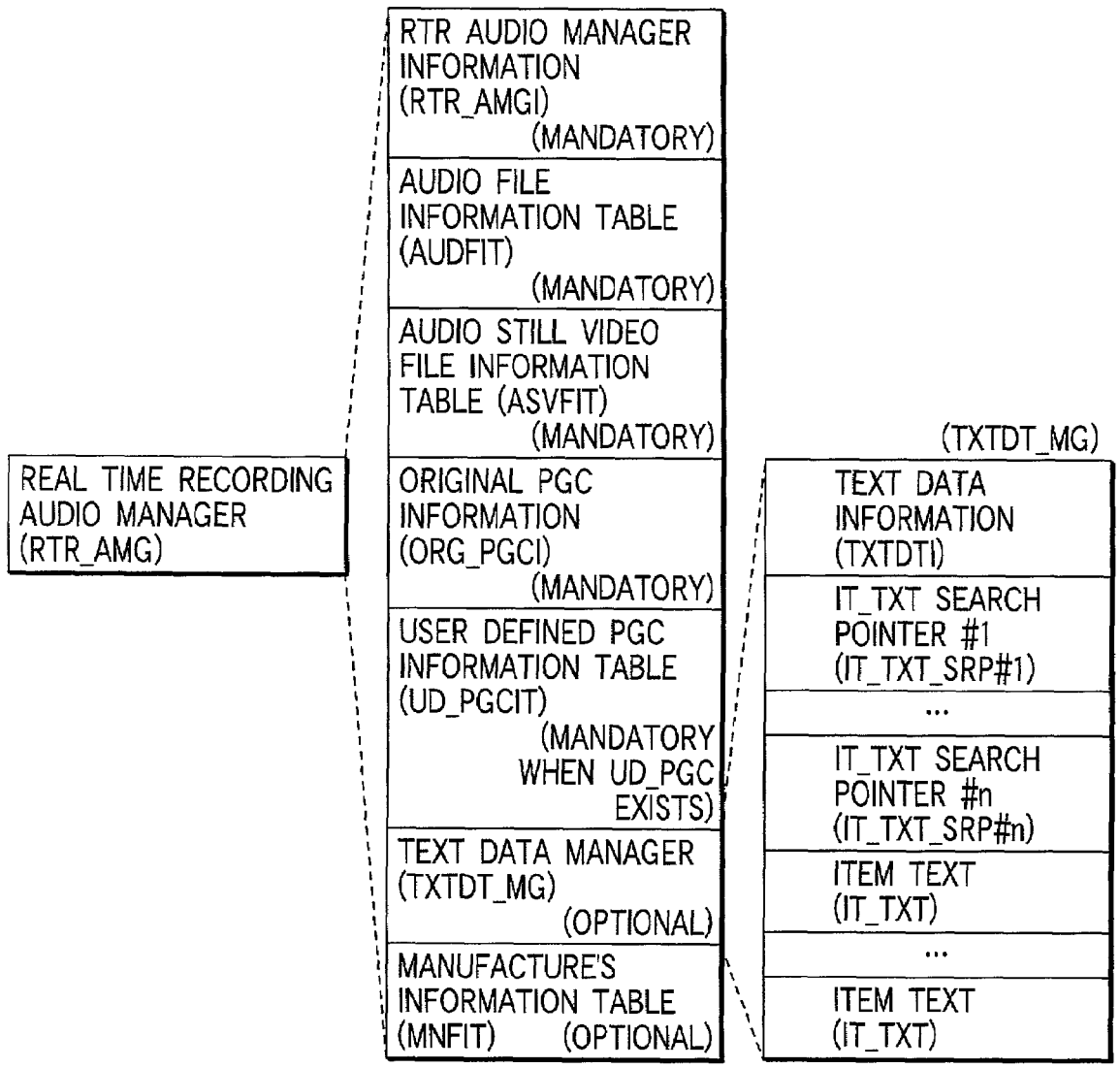
FIG. 38 shows an example of the data structure of yet another part (TXTDT_MG shown in FIG. 5) of the real time recording audio manager (RTR_AMG)

FIG. 38 shows an example of the data structure of yet another part (TXTDT_MG 146 shown in (e) of FIG. 5) of the real time recording audio manager (RTR_AMG 130 shown in (d) of FIG. 5).

As shown in FIG. 38, text data manager TXTDT_MG includes text data information TXTDTI (231 in (f) of FIG. 5), one or more item text search pointers IT_TXT_SRP #1 to #n (232 to 233 in (f) of FIG. 5), and one or more item texts IT_TXT (236 to 238 in (f) of FIG. 5).

Although not shown, TXTDTI contains information items of:

(1) CHRS describing the character set code (ASCII code, etc.) to be used in the TXTDT_MG;

(2) IT_TXT_SRP Ns describing the number of IT_TXT_SRPs; and (3) TXTDT_MG_EA describing the end address of TXTDT_MG with the relative block number from the first byte of the TXTDT_MG.

Although not shown, each IT_TXT_SRP contains information items of:

(a) IT_TXT_SA describing the start address of IT_TXT with the relative block number from the first byte of TXTDT_MG; and (b) IT_TXT_SZ describing the size of IT_TXT in bytes.

Note that IT_TXT describes an item text with the character code specified by the above-mentioned CHRS.

The embodiment of the present invention has several functions and data structures, such as Representative Picture, Disc Representative Picture, Disc Representative Name, Resume Marker, and Primary Text Information to be used in a player menu (cf. FIGS. 6A and 6B).

The resume marker keeps information about the position where the playback has been suspended by a stop operation. Utilizing this information, playback can be resumed from the exact point where it has been suspended, even if disc 100 has been once ejected from and inserted again to disc drive 409 in FIG. 14.

Each of tracks and play lists or disc 100 itself may have a representative picture. These representative pictures may be used to help a user to identify the target track, play list, or disc. Any audio still video included in disc 100 can be defined as the representative picture for the track and/or play list and as the disc representative picture of that disc.

Figure 39:
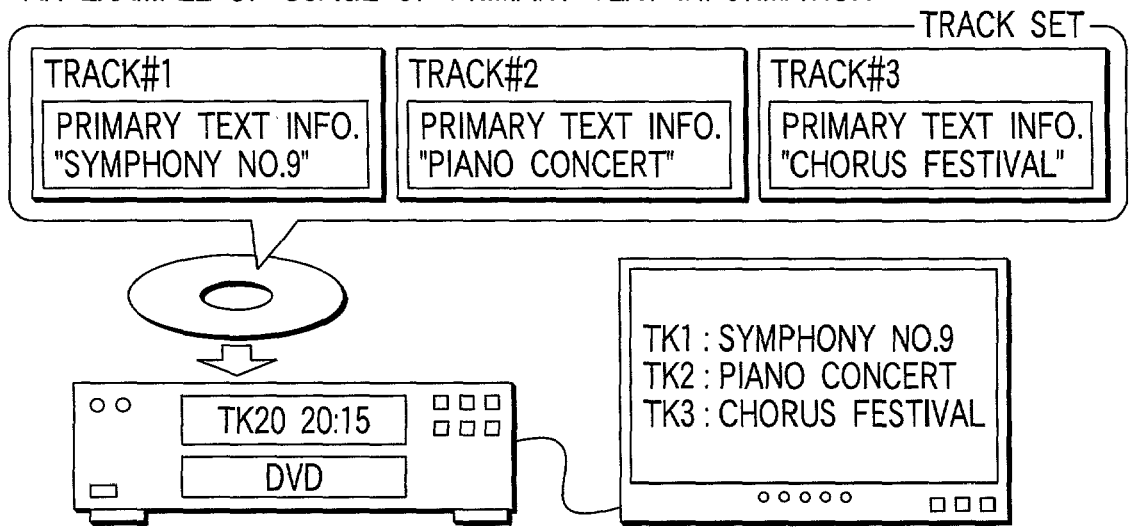
FIG. 39 illustrates an example of usage of primary text information (e.g., PRM_TXT shown in FIG. 29)

Most of those functions and data structures are defined as optional, which means that a Recorder or Player may not have a capability of handling those functions or data FIG. 39 illustrates an example of usage of primary text information (e.g., PRM_TXT shown in FIG. 29).

As shown in FIG. 39, the primary text may be described for tracks, play lists, and/or entry points for index, and may be used to identify them. Primary text information PRM_TXTI may be described in two kinds of character sets, i.e., ASCII and one or more other sets. The ASCII character set is supported as a common character set for world wide use of disc 100.

The example of texts shown by a track set or those shown by a monitor TV screen correspond to the text of track title 3 shown in FIG. 6A.

In the example of FIG. 39, a player gathers PRM_TXTI for all tracks #1 to #3 and makes a menu (displayed on the monitor TV screen shown in FIG. 39) so that a user can easily select a track to be played back. For instance, the primary text "Symphony No. 9" for track #1, "Piano Concert" for track #2, and "Chorus Festival" for track #3 can be presented in the menu. The user can select, e.g., the "Piano Concert" from the menu so that the contents of track #2 recorded on the disc are played back.

Also disc 100 may have a disc representative name (e.g., my disc, sister's disc, brother's disc) which can be used to identify the disc (e.g., my disc). For instance, a set (recorder/player) which can handle multiple discs (discs for me, for sister, and for brother) inside it may utilize this information to identify the target disc (e.g., my disc).

Figure 40:
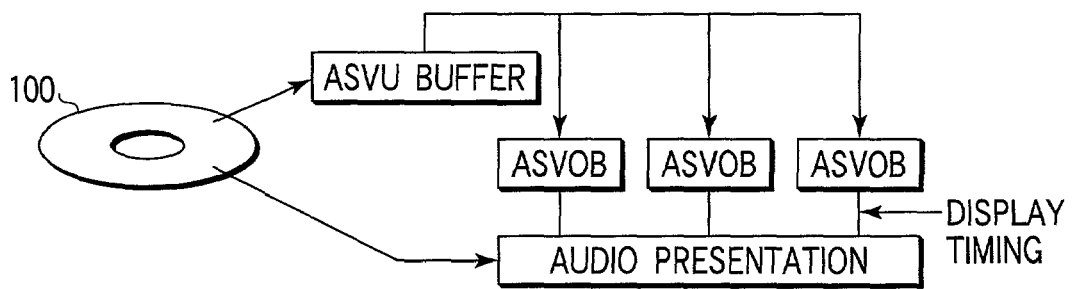
FIG. 40 is an explanatory view of a presentation of Audio and Audio Still Video (ASVOB)

FIG. 40 is an explanatory view of a presentation of Audio and Audio Still Video (ASVOB).

ASVOBs shown in FIG. 40 correspond to still pictures No. 1 to No. 9 shown in (a) of FIG. 7. The audio presentation block shown in FIG. 40 corresponds to the block of audio tracks No. 1 to No. 3 shown in (b) of FIG. 7.

Presentation of ASVs is defined with the entry point for a display list in the original PGC or user defined PGC, and audio still video objects (ASVOBS) are defined as presentation data.

Audio still video unit ASVU is the collection of one or more (up to "99") ASVOBs which are presented while one or more cells (or tracks) are played back, and ASVU is pre-loaded into a memory (ASVU buffer) before starting the presentation of the cell(s). During the loading of ASVU, audio output may be muted by the player.

One or more ASVUs can be recorded in disc 100, and the size of each ASVU shall be equal to or less than 2 M bytes.

Since all the ASVOB data in ASVU are kept in the ASVU buffer, a variety of presentation functionality are realized in relation to display order and display timing of ASVOBs. For instance, slideshow and browsable pictures can be realized by use of the ASVU buffer. The display timing of each of ASVOBs kept in the ASVU buffer can be freely determined by, e.g., main MPU 404 shown in FIG. 14.

Figure 41:
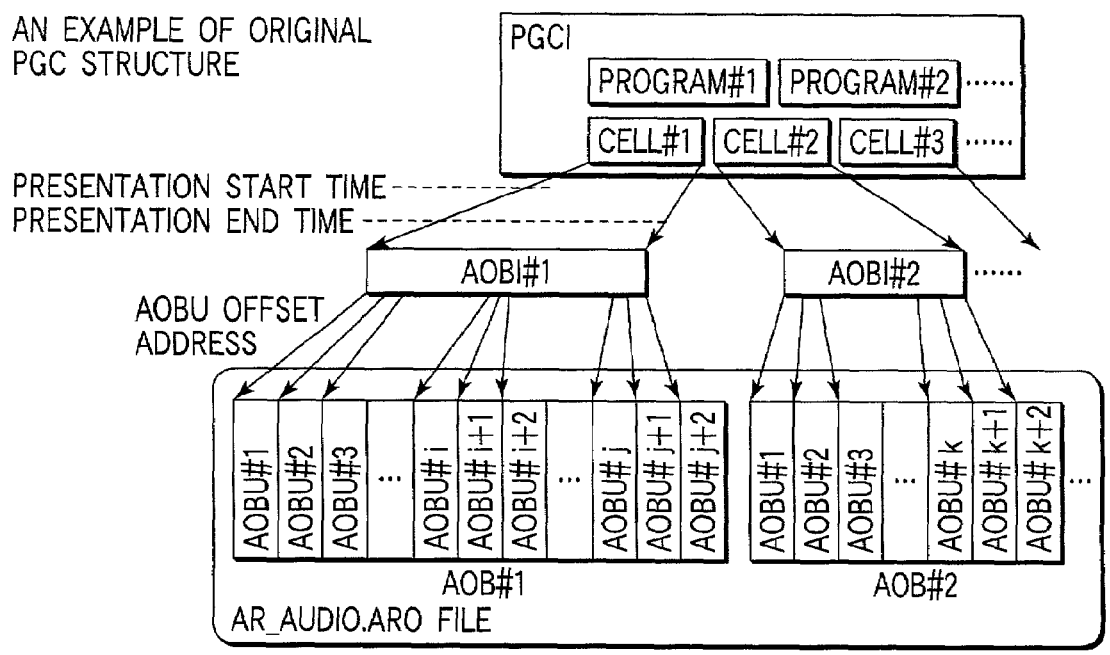
FIG. 41 shows an example of the structure of an original PGC (ORG_PGCI shown in FIG. 26)

FIG. 41 shows an example of the structure of an original PGC (ORG_PGCI shown in FIG. 26).

Programs #1, #2, . . . in PGCI of FIG. 41 correspond to program information items 311 to 314 in (g) of FIG. 7. Cells #1, #2, . . . in PGCI of FIG. 41 correspond to original cell information items 301 to 305 in (f) of FIG. 7. AOBs #1, #2, . . . in the AR_AUDIO.ARO file of FIG. 41 correspond to AOBs #1, #2, . . . in (e) of FIG. 7. AR_AUDIO.ARO file in FIG. 41 corresponds to 221 in (f) of FIG. 8.

As shown in FIG. 41, the original PGC is formed of PGCI, one or more AOBIs, and one or more AOBs. PGCI consists of a chain of program, and each program consists of either one cell or a sequence of more than one cells. Therefore, the total presentation of the original PGC is a sequence of cell presentation. The cell presentation order is the same as the order in which cell information is described in PGCI.

In order to enable presentation of each cell, cell information (CI) includes AOB number and presentation start time. The presentation start time shall be less than the presentation period of the first AOBU. Therefore, the presentation of AOB shall start from the top of AOB or from the middle of the first AOBU.

In the original PGC, each cell refers to the presentation period of a whole AOB, unless any editing such as partial deleting occurs. After any editing, cell in the original PGC may not refer to a whole AOB. This is because the AOBU boundary does not give enough cutting resolution. Desired accuracy is at least the period of a coding block. But all AOBUs except for the last AOBU in an AOB shall have the fixed presentation period. So, the AOBU which includes the cutting end portion remains in the new AOB, and the cell should refer to the segment of the AOBU.

On the contrary, AOBU which includes the cutting start position needs not to remain as a whole AOBU. Therefore, the segment of AOBU after the cutting start position is deleted is deleted, and the segment before the cutting end position remains with the new AOB.

In order to access an AOB recorded in a ARO file, AOBI is used to obtain address information with respect to the file. There are two types of AOBI, one is for coding of constant bit-rate and the other is for coding of variable bit-rate. When coding is the constant bit-rate, the size of each AOBU except for the last AOBU is constant. When coding is the variable bit-rate, the size of each AOBU is different. The presentation period of each AOBU except for the last AOBU is fixed in case of both constant bit-rate and variable bit-rate.

When an AOB is created, it is appended at the end of .ARO file and an associated cell, and possibly an associated program is appended at the end of PGCI.

Figure 42:
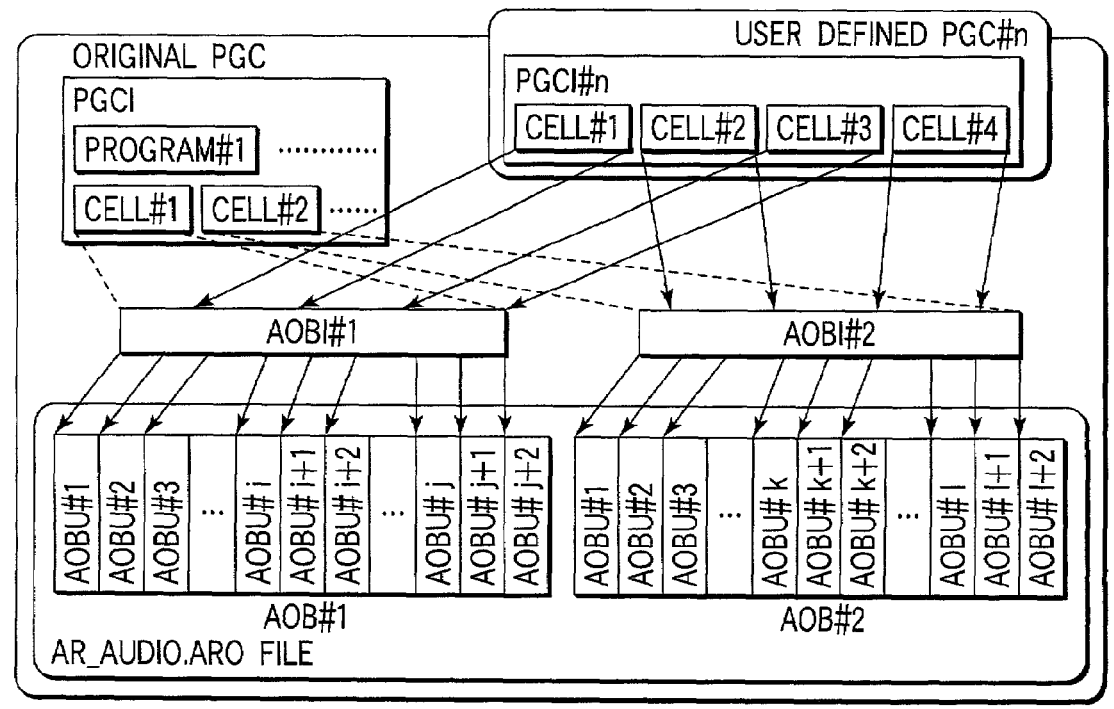
FIG. 42 shows an example of the structure of a user-defined PGC (UD_PGCIT shown in FIG. 1 or FIG. 26)

FIG. 42 shows an example of the structure of a user-defined PGC (UD_PGCIT shown in FIG. 1 or FIG. 26).

Cells in PGCI #n of user defined PGC #n shown in FIG. 42 correspond to cell information CI in (d) of FIG. 7. AOBIs shown in FIG. 42 correspond to AOBI in (e) of FIG. 7.

AS shown in FIG. 42, user defined PGC #n is created so that the cells in the PGC refer to AOBs in the original PGC. The user defined PGC #n has for cells (#1 to #4). Two of them refer to AOB #1 and other two refer to AOB #2. The downward arrows from the cells in the user defined PGC to the original PGC illustrate the presentation periods for these cells. The order of cell presentation in the user defined PGC may become totally different from the presentation of the original PGC.

FIG. 43 is a view for explaining an example of an entry point for the representative audio.

Each of tracks can have a representative audio (cf. the second paragraph in the "information contents" of the table shown in FIG. 9A) which may be used to help a user to identify the target track same as representative pictures. The representative audio for a track is one specified segment of the track. The number of representative audio for one track is "one" at maximum. In other words, each track may optionally have one representative audio.

The start position and duration of representative audio for each track are described at an entry point (the upward arrow with {R} in FIG. 43) for representative audio (cf. the second paragraph in the "information contents" of the table shown in FIG. 9A). The start position of representative audio corresponds to the timing information of this entry point. The entry point for representative audio has an additional information which specifies the duration of this representative audio.

FIG. 43 shows an example of the entry point for representative audio in the original PGC. There are three programs PG #1, PG #2, and PG #3. Only PG #2 has the entry point {R} for representative audio. This entry point {R} is described at the same entry point table as the entry points for index and for display list.

FIG. 44 shows an example of contents of cell entry point information (C_EPI of type D2; C_EPI# shown in FIG. 27 or (h) of FIG. 1).

As shown in FIG. 44, C_EPI of type D2 includes information items of:

(1) EP_TY describing a type of the entry point (this EP_TY is formed of EP_TY1 and EP_TY2, and the type D2 is indicated by a combination of the contents of EP_TY1="00b" and EP_TY2="11".);

(2) EP_PTM describing the presentation time of the entry point (this presentation time indicates the start time of representative audio);

(3) RA_DUR describing the duration of representative audio.

Incidentally, EP_TY corresponds to the entry point described in the second paragraph of the "information contents" of the table shown in FIG. 9A. Further, RA_DUR corresponds to the range between the playback start time and the playback end time described in the second paragraph of the "information contents" of the table shown in FIG. 9A.

FIG. 45 shows an example of contents of cell entry point information (C_EPI of type B1; C_EPI# shown in FIG. 27 or (h) of FIG. 1).

As shown in FIG. 45, C_EPI of type B1 includes information items of:

(1) EP_TY describing a type of the entry point (this EP_TY is formed of EP_TY1 and EP_TY2, and the type B1 is indicated by a combination of the contents of EP_TY1="01b" and EP_TY2="01b".);

(2) EP_PTM describing the presentation time of the entry point;

(3) IDXN describing the index number of the index point which is specified by the entry point; and (4) PRM_TXT describing the primary text for the entry point.

Note that when the cell belongs to the original PGC and the entry point is the first one in the program (PG), IDXN shall be "1". When this cell belongs to the user defined PGC and this entry point has the entry point for user defined track, IDXN shall be "1".

When the entry point does not satisfy the above condition, IDXN of this entry point shall be IDXN of the previous type B entry point plus one (i.e., IDXN of this entry point is incremented by 1).

Note that the previous entry point may be included in the previous cell.

Also note that PRM_TXT corresponds to the primary text information PRM_TXTI described in the 5th paragraph of the "information contents" of the table shown in FIG. 9A.

FIG. 46 shows an example of contents of cell entry point information (C_EPI of type B2; C_EPI# shown in FIG. 27 or (h) of FIG. 1).

As shown in FIG. 46, C_EPI of type B2 includes information items of:

(1) EP_TY describing a type of the entry point (this EP_TY is formed of EP_TY1 and EP_TY2, and the type B2 is indicated by a combination of the contents of EP_TY1="00b" and EP_TY2="01b".);

(2) EP_PTM describing the presentation time of the entry point; and (3) IDXN describing the index number of the index point which is specified by the entry point.

The type B2 C_EPI is obtained by deleting PRM_TXT from type B1.

FIG. 47 shows an example of contents of cell entry point information (C_EPI of type C2; C_EPI# shown in FIG. 27 or (h) of FIG. 1).

As shown in FIG. 47, C_EPI of type C2 includes information items of:

(1) EP_TY describing a type of the entry point (this EP_TY is formed of EP_TY1 and EP_TY2, and the type C2 is indicated by a combination of the contents of EP_TY1="00b" and EP_TY2="10b".);

(2) EP_PTM describing the presentation time of the entry point (the field of this EP_PTM is filled with "00h" if the display timing mode of the cell is browsable);

(3) ASVOB_ENTN describing the entry number of ASVOB of the entry point (if the display order mode of the cell is random or shuffle, the field of ASVOB_ENTN is set to "00h");

(4) HOME_DLISTN describing the entry point number which specifies the home display list (Home DLIST) in the cell (in every entry point of type C2, the value of HOME_DLISTN shall be identical; when there is no Home DLIST in this cell, "00h" is entered to HOME_DLISTN; if the display timing mode of this cell is slideshow, "00h" is entered; if the display order mode of this cell is random or shuffle, "00h" is entered; note that HOME_DLISTN shall be equal to or less than the number of entry points in this cell);

(5) S_EFFECT describing visual effect (such as cut-out/cut-in, fade-out/fade-in, dissolving, wiping, etc.) information when the display of the previous ASVOB terminates and the display of this ASVOB starts;

(6) E_EFFECT describing visual effect information when the display of the ASVOB and the presentation of the ASVU are terminated;

(7) MAX_DUR describing the maximum duration to update ASVOBs measured in "Duration=MAX_DUR× video frame" where one video frame means 1/29.27 in case of NTSC and 1/25 in case of PAL (if the display timing mode of the cell is slideshow, the field of MAX_DUR is filled with "00h"); and (8) MIN_DUR describing the minimum duration to update ASVOBs measured in "Duration=MIN_DUR×video frame".

Note that when the duration of MAX_DUR or MIN_DUR is infinite, the fields of MAX_DUR and MIN_DUR are filled with "00h".

Note that when the maximum duration time and minimum duration time are the same, the duration time for updating ASV is always fixed. When the maximum duration time and minimum duration time are different, the duration time for updating ASV is randomly changed (by a player) between the maximum duration time and the minimum duration time.

Note that the minimum duration time shall be more than 0.4 second. The maximum duration time shall be equal to or more than the minimum duration time.

Also note that EP_TY of type C2 corresponds to the entry point type information (EP_TY) described in the first paragraph of the "information contents" with respect to "still picture entry points 21 to 26" shown in FIG. 9B. EP_PTM of type C2 corresponds to the information (EP_PTM) described in the third paragraph thereof. ASVOB_ENTN of type C2 corresponds to the information (ASVOB_ENTN) described in the second paragraph thereof. MAX_DUR and MIN_DUR of type C2 correspond to the information (MAX_DUR & MIN_DUR) described in the 4th paragraph thereof.

FIG. 48 shows an example of contents of PGC general information (PGC_GI shown in FIG. 27 or (g) of FIG. 1).

As shown in FIG. 48, PGC_GI includes PG_Ns describing the number of programs; and CI_SRP_Ns describing the number of cell information search pointers CI_SRPs.

Note that in case of a user defined PGC, PG_Ns shall be set to "0". The maximum number of programs for the original PGC is "99". The maximum number of CI_SRPs is "999".

FIG. 49 shows an example of contents of program information (PGI# shown in FIG. 27).

As shown in FIG. 49, PGI includes the information items of:

(1) PG_TY describing the type of the program;

(2) C_Ns describing the number of cells in the program;

(3) PRM_TXTI describing the primary text information for the program;

(4) IT_TXT_SRPN describing the search pointer number of the item text whose text data corresponds to the program; and (5) REP_PICTI describing representative picture information (cf. FIG. 50).

Note that PG_TY includes a protect flag. When this flag is "0b", the program is not in a protected state. When this flag is "1b", the program is in a protected state.

When a program is in the protected state, all AOBs and ASVOBs referred to and utilized in the presentation of that program shall not be temporarily or permanently erased.

The protect flag shall not be set to "1b" unless all AOBs and ASVOBs referred to and utilized by the program are in normal state.

FIG. 50 shows an example of contents of representative picture information (REP_PICTI shown in FIG. 29 or FIG. 49).

As shown in FIG. 50, REP_PICTI includes information items of:

(a) ASVUN describing ASVU number (e.g., #1 of ASVU shown in (f) of FIG. 10, FIG. 28A, etc.) in which the representative picture for a track exists; and (b) ASVOB_ENTN describing the ASVOB_ENT number (e.g., #1 of ASVOB_ENT shown in (h) of FIG. 4, (g) of FIG. 12, etc.) in which the representative picture for the track exists.

Incidentally, REP_PICTI corresponds to 41 to 44 in (d) of FIG. 12. ASVUN corresponds to 273 to 274 in (g) of FIG. 12. ASVOB_ENTN corresponds to any of 281 to 296 in (g) of FIG. 12.

The effects of the present invention mentioned above are summarized as follows.

1. Since break information of audio tracks is provided to PGC (Program Chain) information that indicates the playback sequence of audio information in management information, the same data structure and data structure layers (hierarchical structure of PGC/(Program)/cell) as those of the existing Video Recording specifications can be assured in the management information.

As a result, high compatibility with the existing Video Recording specifications can be assured, and cross-reference between video information (movie object) and audio information can be made upon playback. Since break information of audio tracks is recorded in management information, recording, playback, and edit processes in units of audio tracks unique to audio information can be very easily done.

2. Since a program in original program chain information 144 as management information that pertains to an original track corresponds to the original track, and "text information that pertains to an audio track", "representative picture indicating the audio track contents", "display mode of still pictures", "erase inhibition flag", and the like, which are unique to each audio track are recorded in program information (311 to 314) as an information recording area that pertains to the program, various kinds of information of individual audio tracks can be flexibly controlled, and recording, playback, and edit processes in units of audio tracks can be very easily done.

3. Since track head entry points 171 to 173 indicating break information of audio tracks are recorded in cell information (164 to 169) in user-defined PGC information table 145 as management information that pertains to a play list, and various kinds of information such as "text information that pertains to an audio track", "representative picture indicating the audio track contents", "display mode of still pictures", "erase inhibition flag", and the like, which are unique to each audio track are provided to track head entry points 171 to 173, various kinds of information of individual audio tracks can be flexibly controlled, and recording, playback, and edit processes in units of audio tracks can be very easily done.

4. When the user designates still pictures to be displayed simultaneously with playback of an audio track, the display timings of individual still pictures upon playing back audio information are automatically computed on the basis of the playback time of the audio track and the number of designated still pictures, and are automatically recorded in management information. Hence, the display times of still pictures can be very easily set without any load on the user.

5. Since an original list and play list are simultaneously displayed on the screen (which can be applied to video recording in addition to audio recording), the user can easily create the play list.

6. When a new track is created on the play list by collecting portions of original tracks in the original list or when the contents of an original track are partially erased, if one of:

A] a process for using all still pictures displayed upon playing back the original track as those to be displayed upon playing back the new track on the play list, or also displaying all still pictures displayed before partial erase after partial erase; and B] a process for using only still pictures falling within a specific range of those displayed upon playing back the original track as those to be displayed upon playing back the new track on the play list, or not displaying still pictures displayed within the partial erase range after partial erase to be selected differs depending on edit machines (information recording/playback apparatuses), the user confuses. In addition, if an edit machine (information recording/playback apparatus) automatically selects one of processes (A) and (B) without notice of the user, the user feels disturbed.

Since discrimination information indicating process (A) or (B) to be executed is displayed in the form of display mode 7 on the screen on which the user creates a play list, the user can understand the setup method of still pictures with respect to a new track, and can be prevented from feeling disturbed, and still picture setup consistency can be maintained independently of the models of edit machines (information recording/playback apparatuses).

7. Since an arbitrary scene of a movie object is extracted as a still picture, and is registered in still picture AV file information table 142 as a still picture that can be displayed simultaneously with an audio object, an arbitrary scene of a movie object can be used as a still picture that can be displayed simultaneously with audio information. At the same time, since a plurality of pieces of still picture information can be recorded together in a given area, high-speed access to still pictures can be made, and still pictures and audio information can be continuously played back without being interrupted.

8. In the present invention, still pictures are designated in units of tracks, and designation information of a representative picture that indicates the track contents is provided to the management information independently of designation information of still pictures to be displayed upon playback of an audio track. Hence, an arbitrary still picture in a VOB group at a location other than a video object (VOB) group that records still pictures to be displayed upon playing back an audio track can be set as a representative picture, thus improving the degree of freedom.

9. Since display range information of representative audio indicating the contents of a given audio track is stored in an area that records unique information in units of audio tracks, the user need only designate an audio track to be confirmed on the display window shown in FIGS. 6A and 6B, so as to confirm if the track he or she designated is the one he or she really wants to listen to, without listening to all audio tracks, thus allowing the user to very easily search audio tracks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information storage medium comprising:
an audio recording area configured to store audio information of one or more tunes or one or more pieces of music in a unit of a given track; and
a management area configured to store management information with respect to the track of said audio information, said management area including program chain information configured to be reproduced by a reproducing apparatus to control a reproduction sequence of said audio information, said program chain information including,
cell information having entry point information, said entry point information including information describing a duration of representative audio which may be used to identify the track, and
program information different than the cell information and configured to manage the audio information of one or more tunes or one or more pieces of music, wherein
said program information further including representative picture information containing entry number information configured to describe an entry number of a still picture object in which a representative picture for the track exists.

2. A method of recording audio information on a medium which comprises:
an audio recording area configured to store audio information of one or more tunes or one or more pieces of music in a unit of a given track; and
a management area configured to store management information with respect to the track of said audio information, said management area including program chain information configured to control a reproduction sequence of said audio information, said program chain information including, cell information having entry point information, said entry point information including information describing a duration of representative audio which may be used to identify the track, and program information different than the cell information and configured to manage the audio information of one or more tunes or one or more pieces of music, wherein said program information further including representative picture information containing entry number information configured to describe an entry number of a still picture object in which a representative picture for the track exists, said method comprising:

recording the audio information in the recording area; and recording the management information including said program chain information, said cell information, said program information, and said representative picture information in the management area.

3. A method of reproducing audio information from a medium which comprises:

an audio recording area configured to store audio information of one or more tunes or one or more pieces of music in a unit of a given track; and a management area configured to store management information with respect to the track of said audio information, said management area including program chain information configured to control a reproduction sequence of said audio information, said program chain information including, cell information having entry point information, said entry point information including information describing a duration of representative audio which may be used to identify the track, and program information different than the cell information and configured to manage the audio information of one or more tunes or one or more pieces of music, wherein said program information further including representative picture information containing entry number information configured to describe an entry number of a still picture object in which a representative picture for the track exists, said method comprising:

reproducing the management information including said program chain information, said cell information, said program information, and said representative picture information from the management area in the recording area; and reproducing the audio information from the recording area.

4. An apparatus for recording audio information on a medium which comprises:

an audio recording area configured to store audio information of one or more tunes or one or more pieces of music in a unit of a given track; and a management area configured to store management information with respect to the track of said audio information, said management area including program chain information configured to control a reproduction sequence of said audio information, said program chain information including, cell information having entry point information, said entry point information including information describing a duration of representative audio which may be used to identify the track, and program information different than the cell information and configured to manage the audio information of one or more tunes or one or more pieces of music, wherein said program information further including representative picture information containing entry number information configured to describe an entry number of a still picture object in which a representative picture for the track exists, said apparatus comprising:

a first block configured to record the audio information in the recording area; and a second block configured to record the management information including said program chain information, said cell information, said program information, and said representative picture information in the management area.

5. An apparatus for reproducing audio information from a medium which comprises:

an audio recording area configured to store audio information of one or more tunes or one or more pieces of music in a unit of a given track; and a management area configured to store management information with respect to the track of said audio information, said management area including program chain information configured to control a reproduction sequence of said audio information, said program chain information including cell information having entry point information, said entry point information including information describing a duration of representative audio which may be used to identify the track, program information different than the cell information and configured to manage the audio information of one or more tunes or one or more pieces of music, wherein said program information further including representative picture information containing entry number information configured to describe an entry number of a still picture object in which a representative picture for the track exists, said apparatus comprising:

reproducing the management information including said program chain information, said cell information, said program information, and said representative picture information from the management area in the recording area; and reproducing the audio information from the recording area.

* * * * *